United States Patent
Oh

(10) Patent No.: US 11,668,989 B2
(45) Date of Patent: *Jun. 6, 2023

(54) DIFFRACTIVE DEVICES BASED ON CHOLESTERIC LIQUID CRYSTAL

(71) Applicant: Magic Leap, Inc., Plantation, FL (US)

(72) Inventor: Chulwoo Oh, Cedar Park, TX (US)

(73) Assignee: Magic Leap, Inc., Plantation, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/673,587

(22) Filed: Feb. 16, 2022

(65) Prior Publication Data
US 2022/0179257 A1 Jun. 9, 2022

Related U.S. Application Data

(60) Continuation of application No. 17/227,058, filed on Apr. 9, 2021, now Pat. No. 11,256,153, which is a
(Continued)

(51) Int. Cl.
*G02F 1/137* (2006.01)
*G02F 1/29* (2006.01)
(Continued)

(52) U.S. Cl.
CPC ..... *G02F 1/13718* (2013.01); *G02B 27/0172* (2013.01); *G02F 1/011* (2013.01);
(Continued)

(58) Field of Classification Search
CPC .................................................. G02F 1/13718
See application file for complete search history.

(56) References Cited

U.S. PATENT DOCUMENTS

| 4,693,544 A | 9/1987 | Yamasaki et al. |
| 4,991,924 A | 2/1991 | Shankar et al. |

(Continued)

FOREIGN PATENT DOCUMENTS

| CN | 1637502 | 7/2005 |
| CN | 101133348 | 2/2008 |

(Continued)

OTHER PUBLICATIONS

U.S. Appl. No. 15/926,920, Oh et al. filed Mar. 20, 2018.
(Continued)

*Primary Examiner* — Edmond C Lau
(74) *Attorney, Agent, or Firm* — Fish & Richardson P.C.

(57) ABSTRACT

Examples of diffractive devices comprise a cholesteric liquid crystal (CLC) layer comprising a plurality of chiral structures, wherein each chiral structure comprises a plurality of liquid crystal molecules that extend in a layer depth direction by at least a helical pitch and are successively rotated in a first rotation direction. Arrangements of the liquid crystal molecules of the chiral structures vary periodically in a lateral direction perpendicular to the layer depth direction to provide a diffraction grating. The diffractive devices can be configured to reflect light having a particular wavelength range and sense of circular polarization. The diffractive devices can be used in waveguides and imaging systems in augmented or virtual reality systems.

20 Claims, 40 Drawing Sheets

Related U.S. Application Data division of application No. 16/673,652, filed on Nov. 4, 2019, now Pat. No. 10,976,632, which is a continuation of application No. 15/835,108, filed on Dec. 7, 2017, now Pat. No. 10,466,561.

(60) Provisional application No. 62/431,745, filed on Dec. 8, 2016, provisional application No. 62/431,752, filed on Dec. 8, 2016.

(51) Int. Cl.
*G02F 1/1335* (2006.01)
*G02F 1/01* (2006.01)
*G02B 27/01* (2006.01)
*G06F 3/038* (2013.01)

(52) U.S. Cl.
CPC .......... *G02F 1/133504* (2013.01); *G02F 1/29* (2013.01); *G02F 1/292* (2013.01); *G06F 3/038* (2013.01); *G02B 2027/0134* (2013.01); *G02B 2027/0185* (2013.01); *G02F 2201/343* (2013.01)

(56) References Cited

U.S. PATENT DOCUMENTS

| | | |
|---|---|---|
| 5,187,372 A | 2/1993 | Clube |
| 5,544,268 A | 8/1996 | Bishel et al. |
| 5,566,982 A | 10/1996 | Lehureau et al. |
| 5,592,314 A | 1/1997 | Ogasawara et al. |
| 5,808,797 A | 9/1998 | Bloom et al. |
| 5,825,448 A | 10/1998 | Bos et al. |
| 5,915,051 A | 6/1999 | Damask et al. |
| 6,014,197 A | 1/2000 | Hikmet |
| 6,028,656 A | 2/2000 | Buhrer et al. |
| 6,040,885 A | 3/2000 | Koike et al. |
| 6,181,393 B1 | 1/2001 | Enomoto et al. |
| 6,185,015 B1 | 2/2001 | Reinhorn et al. |
| 6,188,462 B1 | 2/2001 | Lavrentovich et al. |
| 6,334,960 B1 | 1/2002 | Willson et al. |
| 6,380,767 B1 | 4/2002 | Nyu et al. |
| 6,390,845 B1 | 5/2002 | Brady |
| 6,542,671 B1 | 4/2003 | Ma et al. |
| 6,680,767 B2 | 1/2004 | Coates et al. |
| 6,690,845 B1 | 2/2004 | Yoshimura et al. |
| 6,735,224 B2 | 5/2004 | Murry et al. |
| 6,750,941 B2 | 6/2004 | Satoh et al. |
| 6,850,221 B1 | 2/2005 | Tickle |
| 6,873,087 B1 | 3/2005 | Choi et al. |
| 6,900,881 B2 | 5/2005 | Sreenivasan et al. |
| 6,982,818 B2 | 1/2006 | Riza et al. |
| D514,570 S | 2/2006 | Ohta |
| 7,023,466 B2 | 4/2006 | Favalora et al. |
| 7,070,405 B2 | 7/2006 | Sreenivasan et al. |
| 7,098,572 B2 | 8/2006 | Choi et al. |
| 7,122,482 B2 | 10/2006 | Xu et al. |
| 7,140,861 B2 | 11/2006 | Watts et al. |
| 7,206,107 B2 | 4/2007 | Levola |
| 7,341,348 B2 | 3/2008 | Eagan |
| 7,375,784 B2 | 5/2008 | Smith et al. |
| 7,471,362 B1 | 12/2008 | Jones |
| 7,519,096 B2 | 4/2009 | Bouma et al. |
| 7,573,640 B2 | 8/2009 | Nivon et al. |
| 7,692,759 B2 | 4/2010 | Escuti et al. |
| 7,705,943 B2 | 4/2010 | Kume et al. |
| 8,064,035 B2 | 11/2011 | Escuti et al. |
| 8,076,386 B2 | 12/2011 | Xu et al. |
| 8,160,411 B2 | 4/2012 | Levola et al. |
| 8,233,204 B1 | 7/2012 | Robbins et al. |
| 8,248,458 B2 | 8/2012 | Schowengerdt et al. |
| 8,264,623 B2 | 9/2012 | Marrucci |
| 8,339,566 B2 | 12/2012 | Escuti et al. |
| 8,508,848 B2 | 8/2013 | Saarikko |
| 8,757,812 B2 | 6/2014 | Melville et al. |
| 8,885,161 B2 | 11/2014 | Scheeline et al. |
| 8,885,997 B2 | 11/2014 | Nguyen et al. |
| 8,950,867 B2 | 2/2015 | Macnamara |
| 9,081,426 B2 | 7/2015 | Armstrong |
| 9,195,092 B2 | 11/2015 | Escuti et al. |
| 9,215,293 B2 | 12/2015 | Miller |
| D752,529 S | 3/2016 | Loretan et al. |
| 9,310,559 B2 | 4/2016 | Macnamara |
| 9,345,402 B2 | 5/2016 | Gao |
| 9,348,143 B2 | 5/2016 | Gao et al. |
| D758,367 S | 6/2016 | Natsume |
| D759,657 S | 7/2016 | Kujawski et al. |
| 9,417,452 B2 | 8/2016 | Schowengerdt et al. |
| 9,470,906 B2 | 10/2016 | Kaji et al. |
| 9,547,174 B2 | 1/2017 | Gao et al. |
| 9,575,366 B2 | 2/2017 | Srivastava et al. |
| 9,664,905 B2 | 5/2017 | Bohn et al. |
| 9,671,566 B2 | 6/2017 | Abovitz et al. |
| D794,288 S | 8/2017 | Beers et al. |
| 9,740,006 B2 | 8/2017 | Gao |
| 9,791,700 B2 | 10/2017 | Schowengerdt et al. |
| D805,734 S | 12/2017 | Fisher et al. |
| 9,846,967 B2 | 12/2017 | Schowengerdt et al. |
| 9,851,563 B2 | 12/2017 | Gao et al. |
| 9,857,591 B2 | 1/2018 | Welch et al. |
| 9,874,749 B2 | 1/2018 | Bradski |
| 9,933,684 B2 | 4/2018 | Brown et al. |
| 10,025,160 B2 | 7/2018 | Park et al. |
| 10,156,725 B2 | 12/2018 | TeKolste et al. |
| 10,191,288 B2 | 1/2019 | Singer et al. |
| 10,254,454 B2 | 4/2019 | Klug et al. |
| 10,260,864 B2 | 4/2019 | Edwin et al. |
| 10,261,318 B2 | 4/2019 | TeKolste et al. |
| 10,345,592 B2 | 7/2019 | Samec et al. |
| 10,466,478 B2 | 11/2019 | Klug et al. |
| 10,466,561 B2 | 11/2019 | Oh |
| 10,690,826 B2 | 6/2020 | Klug et al. |
| 10,908,423 B2 | 2/2021 | Oh |
| 10,976,632 B2 | 4/2021 | Oh |
| 11,073,695 B2 | 7/2021 | Gao et al. |
| 11,119,327 B2 | 9/2021 | Oh |
| 11,256,153 B2 | 2/2022 | Oh |
| 2002/0097962 A1 | 7/2002 | Yoshimura et al. |
| 2002/0126249 A1 | 9/2002 | Liang et al. |
| 2002/0131694 A1* | 9/2002 | So .................. G02F 1/0115 385/27 |
| 2002/0167638 A1 | 11/2002 | Byun et al. |
| 2002/0172237 A1 | 11/2002 | Murry et al. |
| 2003/0147112 A1 | 8/2003 | Mukawa |
| 2003/0161573 A1 | 8/2003 | Ishida |
| 2004/0007465 A1 | 1/2004 | Goldberg et al. |
| 2004/0022888 A1 | 2/2004 | Sreenivasan et al. |
| 2004/0120647 A1 | 6/2004 | Sakata et al. |
| 2004/0150141 A1 | 8/2004 | Chao et al. |
| 2004/0184163 A1 | 9/2004 | Nishioka et al. |
| 2004/0191429 A1 | 9/2004 | Patrick |
| 2005/0042391 A1 | 2/2005 | Ryan et al. |
| 2005/0072959 A1 | 4/2005 | Moia et al. |
| 2005/0073577 A1 | 4/2005 | Sudo et al. |
| 2005/0140880 A1 | 6/2005 | Lee et al. |
| 2005/0232530 A1 | 10/2005 | Kekas |
| 2005/0253112 A1 | 11/2005 | Kelly et al. |
| 2005/0270312 A1 | 12/2005 | Lad et al. |
| 2005/0270461 A1 | 12/2005 | Kitson et al. |
| 2005/0271325 A1 | 12/2005 | Anderson et al. |
| 2006/0017876 A1 | 1/2006 | Watts |
| 2006/0028436 A1 | 2/2006 | Armstrong |
| 2006/0055858 A1 | 3/2006 | Nakanishi et al. |
| 2006/0120247 A1 | 6/2006 | Noda et al. |
| 2006/0121358 A1 | 6/2006 | Rich et al. |
| 2006/0126179 A1 | 6/2006 | Levola |
| 2006/0146251 A1 | 7/2006 | Choi |
| 2006/0157443 A1 | 7/2006 | Mei |
| 2006/0221448 A1 | 10/2006 | Nivon et al. |
| 2006/0227283 A1 | 10/2006 | Ooi et al. |
| 2007/0031097 A1 | 2/2007 | Heikenfeld et al. |
| 2007/0081123 A1 | 4/2007 | Lewis |
| 2007/0229955 A1 | 10/2007 | Kawamura et al. |
| 2007/0273957 A1 | 11/2007 | Zalevsky et al. |

(56) References Cited

U.S. PATENT DOCUMENTS

| | | |
|---|---|---|
| 2008/0043166 A1 | 2/2008 | Liu et al. |
| 2008/0043334 A1 | 2/2008 | Itzkovitch et al. |
| 2008/0169479 A1 | 7/2008 | Xu et al. |
| 2009/0002617 A1 | 1/2009 | Jones |
| 2009/0141216 A1 | 6/2009 | Marrucci |
| 2010/0142570 A1 | 6/2010 | Konttinen et al. |
| 2010/0157400 A1 | 6/2010 | Dimov et al. |
| 2010/0177388 A1 | 7/2010 | Cohen et al. |
| 2010/0207964 A1 | 8/2010 | Kimmel et al. |
| 2010/0225856 A1 | 9/2010 | Escuti et al. |
| 2010/0225876 A1 | 9/2010 | Escuti et al. |
| 2010/0252960 A1 | 10/2010 | Iosad et al. |
| 2010/0277803 A1 | 11/2010 | Pockett et al. |
| 2010/0284090 A1 | 11/2010 | Simmonds |
| 2010/0321781 A1 | 12/2010 | Levola et al. |
| 2011/0002143 A1 | 1/2011 | Saarikko et al. |
| 2011/0024950 A1 | 2/2011 | Kruglick |
| 2011/0049761 A1 | 3/2011 | Mataki |
| 2011/0194058 A1 | 8/2011 | Amos et al. |
| 2011/0213664 A1 | 9/2011 | Osterhout et al. |
| 2011/0242461 A1 | 10/2011 | Escuti et al. |
| 2012/0021140 A1 | 1/2012 | Dijksman et al. |
| 2012/0033306 A1 | 2/2012 | Valera et al. |
| 2012/0069232 A1 | 3/2012 | Chui et al. |
| 2012/0123074 A1 | 5/2012 | Okada |
| 2012/0127062 A1 | 5/2012 | Bar-Zeev et al. |
| 2012/0162549 A1 | 6/2012 | Gao et al. |
| 2012/0206485 A1 | 8/2012 | Osterhout et al. |
| 2012/0206812 A1 | 8/2012 | Saito et al. |
| 2012/0218301 A1 | 8/2012 | Miller |
| 2012/0242918 A1 | 9/2012 | Valyukh et al. |
| 2012/0327330 A1 | 12/2012 | Takahashi et al. |
| 2013/0051730 A1 | 2/2013 | Travers et al. |
| 2013/0082922 A1 | 4/2013 | Miller |
| 2013/0093969 A1* | 4/2013 | Li ...................... G02F 1/13718 |
| | | 349/16 |
| 2013/0117377 A1 | 5/2013 | Miller |
| 2013/0125027 A1 | 5/2013 | Abovitz |
| 2013/0169909 A1 | 7/2013 | Srivastava et al. |
| 2013/0208234 A1 | 8/2013 | Lewis |
| 2013/0222384 A1 | 8/2013 | Futterer |
| 2013/0235191 A1 | 9/2013 | Miao et al. |
| 2013/0235440 A1 | 9/2013 | Takeda et al. |
| 2013/0242262 A1 | 9/2013 | Lewis |
| 2013/0242392 A1 | 9/2013 | Amirparviz et al. |
| 2013/0314765 A1 | 11/2013 | Padilla et al. |
| 2013/0314789 A1 | 11/2013 | Saarikko et al. |
| 2013/0321747 A1 | 12/2013 | Kondo et al. |
| 2013/0322810 A1 | 12/2013 | Robbins |
| 2014/0055740 A1 | 2/2014 | Spaulding et al. |
| 2014/0064655 A1 | 3/2014 | Nguyen et al. |
| 2014/0071539 A1 | 3/2014 | Gao |
| 2014/0104665 A1 | 4/2014 | Popovich et al. |
| 2014/0140653 A1 | 5/2014 | Brown et al. |
| 2014/0140654 A1 | 5/2014 | Brown et al. |
| 2014/0177023 A1 | 6/2014 | Gao et al. |
| 2014/0211322 A1 | 7/2014 | Bohn et al. |
| 2014/0218468 A1 | 8/2014 | Gao et al. |
| 2014/0232993 A1 | 8/2014 | Kim |
| 2014/0233879 A1 | 8/2014 | Gibson et al. |
| 2014/0267420 A1 | 9/2014 | Schowengerdt |
| 2014/0285429 A1 | 9/2014 | Simmons |
| 2014/0300695 A1 | 10/2014 | Smalley et al. |
| 2014/0306866 A1 | 10/2014 | Miller et al. |
| 2015/0002528 A1 | 1/2015 | Bohn et al. |
| 2015/0015879 A1 | 1/2015 | Papadopoulos et al. |
| 2015/0016777 A1 | 1/2015 | Abovitz et al. |
| 2015/0062500 A1 | 3/2015 | Park et al. |
| 2015/0103306 A1 | 4/2015 | Kaji et al. |
| 2015/0146147 A1 | 5/2015 | Choi et al. |
| 2015/0168731 A1 | 6/2015 | Robbins |
| 2015/0178939 A1 | 6/2015 | Bradski et al. |
| 2015/0205126 A1 | 7/2015 | Schowengerdt |
| 2015/0205182 A1 | 7/2015 | Leister |
| 2015/0222883 A1 | 8/2015 | Welch |
| 2015/0222884 A1 | 8/2015 | Cheng |
| 2015/0234205 A1 | 8/2015 | Schowengerdt |
| 2015/0235431 A1 | 8/2015 | Schowengerdt |
| 2015/0241705 A1 | 8/2015 | Abovitz et al. |
| 2015/0268415 A1 | 9/2015 | Schowengerdt et al. |
| 2015/0293409 A1 | 10/2015 | Usukura et al. |
| 2015/0301249 A1 | 10/2015 | Pau et al. |
| 2015/0302652 A1 | 10/2015 | Miller et al. |
| 2015/0309263 A2 | 10/2015 | Abovitz et al. |
| 2015/0326570 A1 | 11/2015 | Publicover et al. |
| 2015/0346490 A1 | 12/2015 | TeKolste et al. |
| 2015/0346495 A1 | 12/2015 | Welch et al. |
| 2016/0011419 A1 | 1/2016 | Gao |
| 2016/0018639 A1 | 1/2016 | Spitzer et al. |
| 2016/0026253 A1 | 1/2016 | Bradski et al. |
| 2016/0033698 A1 | 2/2016 | Escuti et al. |
| 2016/0033771 A1 | 2/2016 | Tremblay et al. |
| 2016/0041385 A1 | 2/2016 | Gotoh et al. |
| 2016/0041390 A1 | 2/2016 | Poon et al. |
| 2016/0055801 A1 | 2/2016 | Kim et al. |
| 2016/0077338 A1 | 3/2016 | Robbins et al. |
| 2016/0085300 A1 | 3/2016 | Robbins et al. |
| 2016/0097930 A1 | 4/2016 | Robbins et al. |
| 2016/0116739 A1* | 4/2016 | TeKolste .............. G02B 6/0026 |
| | | 385/36 |
| 2016/0116979 A1 | 4/2016 | Border |
| 2016/0131947 A1 | 5/2016 | Park et al. |
| 2016/0167422 A1 | 6/2016 | Brehm et al. |
| 2016/0170268 A1 | 6/2016 | Song et al. |
| 2016/0187554 A1 | 6/2016 | Lee et al. |
| 2016/0209560 A1 | 7/2016 | Tabirian et al. |
| 2016/0209648 A1 | 7/2016 | Haddick et al. |
| 2016/0270656 A1 | 9/2016 | Samec et al. |
| 2016/0282808 A1 | 9/2016 | Smalley |
| 2016/0290657 A1 | 10/2016 | Lomicka et al. |
| 2016/0320536 A1 | 11/2016 | Simmonds et al. |
| 2016/0349517 A1 | 12/2016 | Miyasaka et al. |
| 2016/0370583 A1 | 12/2016 | Saarikko et al. |
| 2017/0007182 A1 | 1/2017 | Samec et al. |
| 2017/0010466 A1 | 1/2017 | Klug et al. |
| 2017/0010488 A1 | 1/2017 | Klug et al. |
| 2017/0082858 A1 | 3/2017 | Klug et al. |
| 2017/0131595 A1 | 5/2017 | Yim et al. |
| 2017/0322419 A1 | 11/2017 | TeKolste et al. |
| 2017/0373459 A1 | 12/2017 | Weng et al. |
| 2018/0004289 A1 | 1/2018 | Wilson et al. |
| 2018/0046859 A1 | 2/2018 | Jarvenpaa |
| 2018/0113309 A1 | 4/2018 | Robbins et al. |
| 2018/0113310 A1 | 4/2018 | Rolland et al. |
| 2018/0143438 A1 | 5/2018 | Oh |
| 2018/0143470 A1 | 5/2018 | Oh et al. |
| 2018/0143485 A1 | 5/2018 | Oh |
| 2018/0143509 A1 | 5/2018 | Oh |
| 2018/0164627 A1 | 6/2018 | Oh |
| 2018/0164645 A1 | 6/2018 | Oh |
| 2018/0188528 A1 | 7/2018 | Browy |
| 2018/0188542 A1 | 7/2018 | Waldern et al. |
| 2018/0217395 A1 | 8/2018 | Lin et al. |
| 2018/0239147 A1 | 8/2018 | Schowengerdt |
| 2018/0239177 A1 | 8/2018 | Oh |
| 2018/0275350 A1 | 9/2018 | Oh |
| 2018/0275409 A1 | 9/2018 | Gao |
| 2018/0321496 A1 | 11/2018 | Bohn |
| 2019/0033684 A1 | 1/2019 | Favalora et al. |
| 2019/0086674 A1 | 3/2019 | Sinay et al. |
| 2019/0121142 A1 | 4/2019 | Tekolste |
| 2019/0227211 A1 | 7/2019 | Klug et al. |
| 2019/0243141 A1 | 8/2019 | Tekolste |
| 2019/0243142 A1 | 8/2019 | Tekolste |
| 2020/0174304 A1 | 6/2020 | Oh |
| 2020/0319465 A1 | 10/2020 | Oh |
| 2021/0294146 A1 | 9/2021 | Oh |
| 2022/0082833 A1 | 3/2022 | Gao et al. |

FOREIGN PATENT DOCUMENTS

| | | |
|---|---|---|
| CN | 101655606 | 2/2010 |
| CN | 102683803 | 9/2012 |
| CN | 103823267 | 5/2014 |

(56) References Cited

FOREIGN PATENT DOCUMENTS

| | | |
|---|---|---|
| CN | 104145208 | 11/2014 |
| CN | 104536088 | 4/2015 |
| CN | 105849621 | 8/2016 |
| CN | 106125194 | 11/2016 |
| CN | 106133569 | 11/2016 |
| EP | 0132077 | 1/1985 |
| EP | 0415735 | 3/1991 |
| EP | 0549283 | 6/1993 |
| EP | 2065750 | 6/2009 |
| EP | 2664430 | 11/2013 |
| JP | 62-269174 | 11/1987 |
| JP | 1991-084516 | 4/1991 |
| JP | H07-270614 | 10/1995 |
| JP | 2000-075405 | 3/2000 |
| JP | 2002-504239 | 2/2002 |
| JP | 2005-196117 | 7/2005 |
| JP | 2005-316304 | 11/2005 |
| JP | 2005-316314 | 11/2005 |
| JP | 2007-219106 | 8/2007 |
| JP | 2007-304227 | 11/2007 |
| JP | 2008-058776 | 3/2008 |
| JP | 2008-209710 | 9/2008 |
| JP | 2010-102215 | 5/2010 |
| JP | 2010-525394 | 7/2010 |
| JP | 2010-271565 | 12/2010 |
| JP | 2013-200467 | 10/2013 |
| JP | 2014-132328 | 7/2014 |
| JP | 2014-528597 | 10/2014 |
| JP | 2014-224846 | 12/2014 |
| JP | 2015-089638 | 5/2015 |
| JP | 2015-118273 | 6/2015 |
| JP | 2015-213226 | 11/2015 |
| JP | 2017-522601 | 8/2017 |
| WO | WO 1998/057236 | 12/1998 |
| WO | WO 2005/024469 | 3/2005 |
| WO | WO 2006/064301 | 6/2006 |
| WO | WO 2006/092758 | 9/2006 |
| WO | WO 2006/106501 | 10/2006 |
| WO | WO 2008/130555 | 10/2008 |
| WO | WO 2008/130561 | 10/2008 |
| WO | WO 2010/067114 | 6/2010 |
| WO | WO 2013/054115 | 4/2013 |
| WO | WO 2014/016403 | 1/2014 |
| WO | WO 2014/036537 | 3/2014 |
| WO | WO 2014/080155 | 5/2014 |
| WO | WO 2014/091204 | 6/2014 |
| WO | WO 2014/156167 | 10/2014 |
| WO | WO 2014/172252 | 10/2014 |
| WO | WO 2014/188149 | 11/2014 |
| WO | WO 2015/012280 | 1/2015 |
| WO | WO 2015/081313 | 6/2015 |
| WO | WO 2016/019123 | 2/2016 |
| WO | WO 2016/054092 | 4/2016 |
| WO | WO 2016/082031 | 6/2016 |
| WO | WO 2016/113533 | 7/2016 |
| WO | WO 2016/194961 | 12/2016 |
| WO | WO 2016/205249 | 12/2016 |
| WO | WO 2016/205256 | 12/2016 |
| WO | WO 2017/134412 | 8/2017 |
| WO | WO 2018/093730 | 5/2018 |
| WO | WO 2018/094079 | 5/2018 |
| WO | WO 2018/094093 | 5/2018 |
| WO | WO 2018/094096 | 5/2018 |
| WO | WO 2018/106963 | 6/2018 |
| WO | WO 2018/112101 | 6/2018 |
| WO | WO 2018/156779 | 8/2018 |
| WO | WO 2018/156784 | 8/2018 |
| WO | WO 2018/175343 | 9/2018 |
| WO | WO 2018/175488 | 9/2018 |
| WO | WO 2019/060741 | 3/2019 |
| WO | WO 2020/069026 | 4/2020 |

OTHER PUBLICATIONS

Aieta et al., "Multiwavelength achromatic metasurfaces by dispersive phase compensation," Science, 2015, 347(6228):1342-1345, 8 pages.

Arbabi et al., "Dielectric metasurfaces for complete control of phase and polarization with subwavelength spatial resolution and high transmission," Nature Nanotechnology, Aug. 2015, 10:937-943, 8 pages.

ARToolKit: https://web.archive.org/web/20051013062315/http://www.hitl.washington.edu:80/artoolkit/documentation/hardware.htm, archived Oct. 13, 2005, 3 pages.

Azuma, "Predictive Tracking for Augmented Realty," TR95-007, Department of Computer Science, UNC-Chapel Hill, NC, Feb. 1995, 262 pages.

Azuma, "A Survey of Augmented Reality," Teleoperators and Virtual Environments 6, 4 (Aug. 1997), pp. 355-385. https://web.archive.org/web/20010604100006/http://www.cs.unc.edu/~azuma/ARpresence.pdf.

Bimber, et al., "Spatial Augmented Reality—Merging Rea! and Virtual Worlds," 2005, https://web.media.mit.edu/~raskar/book/BirnberRaskarAugmentedRealityBook.pdf, 393 pages.

Chigrinov, V.: Photoaligning and Photopatterning Technology: Applications in Displays and Photonics, Proceedings of SPIE, Emerging Liquid Crystal Technologies I, vol. 9769, Mar. 7, 2016, in 11 pages.

Choi et al., "Determination of Surface Nematic Liquid Crystal Anchoring Strength Using Nano-scale Surface Grooves," Optical Society of America, May 2013, 21(10): 10 pages.

Crawford, et al.: "Liquid-crystal diffraction gratings using polarization holography alignment techniques," Journal of Applied Physics 98, 123102, 2005, 11 pages.

Cunningham et al., "A plastic colorimetric resonant optical biosensor 1m multiparallel detection of label-free biochemical interactions," Sensors and Actuators B, Jul. 2002, 85(3):219-226.

Dierking, I.: "Chiral Liquid Crystals: Structures, Pilases. Effects." Symmetry, (Jun. 2014) 6(2):444-472.

Escuti, "P 39.4: Polarization-Independent Modulation & Simplified Spectropolarimetry Using LC Polarization Gratings," Paper, Presented at Proceedings of paper #39.4, posters P-209, P-167, SID Symposium Digest. 2006, 1 page.

Escuti, M. et al., "39.4: Polarization-independent switclling with high contrast from a liquid crystal polarization grating", SID Symposium Digest, vol. 37, pp. 1443-1446, Jun. 2006, in 5 pages.

Escuti, M. et al., Polarization-Independent LC Microdisplays Using Liquid Crystal Polarization Gratings: A Viable Solution, ILCC presentation, Jul. 1, 2008, in 15 pages.

Gear et al., "Engineered Liquid Crystal Anchoring Energies with nanopatterned Surfaces," Optical Society of America. Jan. 2015, 23:807-814, 8 pages.

International Preliminary Report on Patentability for PCT Application No. PCT/US18/23178, dated Sep. 24, 2019 (MLEAP.099WO3), 10 pages.

International Preliminary Report on Patentability for PCT Application No. PCT/US2017/062083, dated May 21, 2019 (MLEAP.082WO), 9 pages.

International Preliminary Report on Patentability for PCT Application No. PCT/US2017/065182, dated Jun. 11, 2019 (MLEAP.099WO1), 5 pages.

International Search Report and Written Opinion for PCT Application No. PCT/US18/019257, dated Jul. 2, 2018 (MLEAP.057WO2), 10 pages.

International Search Report and Written Opinion for PCT Application No. PCT/US18/23178, dated Aug. 3, 2018 (MLEAP.099WO3), 13 pages.

International Search Report and Written Opinion for PCT Application No. PCT/US2017/062063, dated Jan. 25, 2018 (MLEAP.085WO), 10 pages.

International Search Report and Written Opinion for PCT Application No. PCT/US2017/062083, dated Mar. 19, 2018 (MLEAP.082WO), 14 pages.

International Search Report and Written Opinion for PCT Application No. PCT/US2017/065182, dated Apr. 6, 2018 (MLEAP.099WO1), 9 pages.

(56) References Cited

OTHER PUBLICATIONS

International Search Report and Written Opinion for PCT Application No. PCT/US2018/019250, dated Jun. 29, 2018 (MLEAP.057WO1), 14 pages.
International Search Report and Written Opinion for PCT Application No. PCT/US2018/023425, dated Jun. 22, 2018 (MLEAP.109WO), 18 pages.
Invitation to Pay Additional Fees And, Where Applicable, Protest Fee for PCT Application No. PCT/US2017/065182, dated Feb. 14, 2018, 3 pages.
Invitation to Pay Additional Fees And, Where Applicable, Protest Fee for PCT Application No. PCT/US2018/019250, dated May 2, 2018 (MLEAP.057WO1), 2 pages.
Invitation to Pay Additional Fees And, Where Applicable, Protest Fee for PCT Application No. PCT/US2018/019257, dated May 3, 2018 (MLEAP.057WO2), 2 pages.
Invitation to Pay Additional Fees And. Where Applicable, Protest Fee for PCT Application No. PCT/US18/23178, dated Jun. 4, 2018 (MLEAP.099WO3), 2 pages.
Invitation to Pay Additional Fees for PCT Application No. PCT/US2017/062083, dated Jan. 19, 2018 (MLEAP.082WO), 2 pages.
Jacob, "Eye Tracking in Advanced Interface Design," Human-Computer Interaction Lab Naval Research Laboratory, Washington, D.C. / paper/ in Virtual Environments and Advanced Interface Design, ed. by W. Barfield and T.A. Furness, pp. 258-288, Oxford University Press, New York (1995).
Kim et al., "Paper: Wide-angle, nonmechanical beam steering using thin liquid crystal polarization gratings," Paper, Presented at Proceedings of SPIE Optical Engineering + Applications, San Diego, California, Aug. 10-14, 2008, 7093:709302-1709302-12.
Kim, J. et al., "Wide-angle, nonmechanical beam steering with high throughput utilizing polarization gratings", Applied Optics, vol. 50, No. 17, Jun. 10, 2011, in 4 pages.
Komanduri, et al., "Multi-twist retarders: broadband retardation control using self-aligning reactive liquid crystal layers," Optical Society of America, Optics Express 404, vol. 21, No. 1, Jan. 14, 2013.
Komanduri, R et al., "Polarization Independent Projection Systems using n1in Film Polymer Polarization Gratings and Standard Liquid Crystal Microdisplays", SID-Display week presentation, Jun. 3, 2009, in 12 pages.
Komanduri, R. et al., 18:3: Late-News Paper: Polarization Independent Liquid Crystal Microdisplays, SID Digest, vol. 39, No. 1, pp. 236-239, May 2008, in 4 pages.
Komanduri, R. et al., "34.4L: Late-News Paper: Polarization Independent Projection Systems using Thin Film Polymer Polarization Gratings and Standard Liquid Crystal Microdisplays", SID Digest, vol. 40, No. 1, Jun. 2009, in 4 pages.
Komanduri, R. et al., "Elastic Continuum Analysis of the Liquid Crystal Polarization Grating", Physical review. E, Statistical, nonlinear, and soft matter physics, May 25, 2007, in 8 pages.
Komanduri, R. et al., "Polarization-independent modulation for projection displays using small-period LC polarization gratings", Journal of the Society for information display, vol. 15, No. 8, pp. 589-594, Aug. 2007, in 7 pages.
Kurioz, Y. et al.: "P-128: Orientation of a Reactive Mesogen on Photosensitive Surface," Society for Information Display (SID) Symposium Digest of Technical Papers, May 2007, in 3 pages.
Lee, et al.. Negative dispersion of birefringence in two-dimensionally self-organized smectic liquid crystal and monomer thin film, Optics Letters, vol. 39, No. 17, Sep. 1, 2014.
Lim, Y. et al., "Anisotropic Nano-Imprinting Technique tor Fabricating a Patterned Optical Film of a Liquid Crystalline Polymer", Journal of Nanoscience and Nanotechnology, vol. 8, pp. 4775-4778, Oct. 2008, in 4 pages.
Lin et al., "Dielectric gradient metasurface optical elements", Science, Jul. 2014, 345(6194):298-302.
Lin et al., Supplementary Materials for Dielectric gradient metasurface optical elements. Science, vol. 345, Issue 6194, Jul. 18, 2014, in 22 pages.
Lin et al., "Molecular-Scale soft imprint lithography for alignment layers in liquid crystal devices," Nano Letters, May 2007, 7(6): 1613-1621.
Lub J. et al.: "Formation of Optical Films by Photo-Polymerisation of Liquid Crystalline Acrylates and Application of These Films in Liquid Crystal Display Technology," Mol Cryst Liq Cryst., (May 2005) 429(1 ):77-99.
metamaterials.duke.edu [online], "Metamaterials," available on or before May 11, 2015, via Internet Archive: Wayback Machine URL <http://web.archive.org/web/20150511045547/http://metamaterials.duke.edu/research/metamaterials>, retrieved on Aug. 12, 2016, URL <http://metamaterials.duke.edu/research/metamaterials>, 3 pages.
Nikolova et al., "Diffraction Efficiency and Selectivity of Polarization Holographic Recording", Optica Acta: Int'l J Optics (1984) 31 (5):579-588.
Office Action in Chinese Appln. No. 201880032816.9, dated Jan. 12, 2022, 18 pages (with English translation).
Office Action in Japanese Appln. No. 2019-551398, dated Feb. 24, 2022, 13 pages (with English translation).
Oh C. et al.: "Achromatic Diffraction from Polarization Gratings with High Efficiency", Opt Lett. (Oct. 2008) 33(20):2287-2289 & Erratum Opt Lett. (Dec. 2009) 34(23):3637.
Oh C., Thesis: "Broadband Polarization Gratings for Efficient Liquid Crystal Display, Beam Steering, Spectropolarimetry, and Fresnel Zone Plate", N.C. State University, Electrical Engineering (2009) in 190 pages.
Oh, C. et al., "Numerical analysis of polarization gratings using the finite-difference time-domain method", Physical review A, vol. 76, Oct. 12, 2007, in 8 pages.
Oh, C. et al., "Polarization-Independent Modulation using Standard LCDs and Polymer PGs", 2008, in 6 pages.
Oh, C. et al., 16.2: Polarization-Independent Modulation Using Standard Liquid Crystal Microdisplays and Polymer Polarization Gratings, IDRC, 2008, in 4 pages.
Scheeline, et al., "Stacked Mutually Rotated Diffraction Gratings as Enablers of Portable Visible Spectrometry," Appl. Spectrosc. 70, 766-777, May 11, 2016.
Tanriverdi and Jacob, "Interacting With Eye Movements in Virtual Environments," Department of Electrical Engineering and Computer Science, Tufts University, Medford, MA—paper/Proc. ACM CHI 2000 Human Factors in Computing Systems Conlerence, pp. 265-272, Addison-Wesley/ACM Press (2000).
Weng et al., "Polarization volume grating with high efficiency and large diffraction angle," Optics Express, Aug. 2016, 24(16):17746-17759.
Wikipedia Blind spot (vision), archived Jun. 9, 2016, in 2 pages. URL: https://web.archive.org/web/20160609224858/https:en.wikipedia.org/wiki/Blind_spot(vision).
Yang et al., "Negative dispersion of birefringence of smectic liquid crystal-polymer compostie: dependence on the constituent molecules and temperature," Optical Society of America, Optics Express 2466, Feb. 2015, 23(3)2466-2471.
Yu et al., "Flat optics with designer metasurfaces", Nature Materials, Feb. 2014, 13:139-150.
Yu et al., "Light Propagation with Phase Discontinuities: Generalized Laws of Reflection and Refraction," Science, Oct. 2011, 334(333): 6 pages.
Chiu et al., "P-33: Large Area Self-aligning of Liquid Crystal Molecules induced by Nanoimprinting Lithography and a Multiple Function Film Made Therein," Paper, Presented at Proceedings of the Second Americas Display Engineering and Applications Conference, ADEAC 2005, Portland, OR, Sep. 20-22, 2020, 323-325.
Oh et al., "Polarization-Independent Modulation Using Standard Liquid Crystal Microdisplays and Polymer Polarization Gratings," NC State University; International Display Research Conference, 2008, 28:298-301, 16 pages.

* cited by examiner

DIFFRACTIVE DEVICES BASED ON CHOLESTERIC LIQUID CRYSTAL

CROSS-REFERENCE TO RELATED APPLICATIONS

This application is a continuation of U.S. patent application Ser. No. 17/227,058, filed Apr. 9, 2021, entitled DIFFRACTIVE DEVICES BASED ON CHOLESTERIC LIQUID CRYSTAL, which is a divisional of U.S. patent application Ser. No. 16/673,652, filed Nov. 4, 2019, entitled DIFFRACTIVE DEVICES BASED ON CHOLESTERIC LIQUID CRYSTAL, now U.S. Pat. No. 10,976,632, which is a continuation of U.S. patent application Ser. No. 15/835,108, filed Dec. 7, 2017, entitled DIFFRACTIVE DEVICES BASED ON CHOLESTERIC LIQUID CRYSTAL, now U.S. Pat. No. 10,466,561, which claims the benefit of priority to U.S. Provisional Patent Application No. 62/431,752, filed Dec. 8, 2016, entitled "DIFFRACTIVE DEVICES BASED ON CHOLESTERIC LIQUID CRYSTAL," and to U.S. Provisional Patent Application No. 62/431,745, filed Dec. 8, 2016, entitled "DIFFRACTIVE DEVICES BASED ON CHOLESTERIC LIQUID CRYSTAL;" the contents of all of which are hereby incorporated by reference herein in their entireties.

BACKGROUND

Field

The present disclosure relates to display systems and, more particularly, to augmented reality display systems comprising diffractive devices based on cholesteric liquid crystal.

Description of the Related Art

Modern computing and display technologies have facilitated the development of systems for so called "virtual reality" or "augmented reality" experiences, wherein digitally reproduced images or portions thereof are presented to a user in a manner wherein they seem to be, or may be perceived as, real. A virtual reality, or "VR", scenario typically involves presentation of digital or virtual image information without transparency to other actual real-world visual input; an augmented reality, or "AR", scenario typically involves presentation of digital or virtual image information as an augmentation to visualization of the actual world around the user. A mixed reality, or "MR", scenario is a type of AR scenario and typically involves virtual objects that are integrated into, and responsive to, the natural world. For example, in an MR scenario, AR image content may be blocked by or otherwise be perceived as interacting with objects in the real world.

Referring to FIG. 1, an augmented reality scene 1 is depicted wherein a user of an AR technology sees a real-world park-like setting 1100 featuring people, trees, buildings in the background, and a concrete platform 1120. In addition to these items, the user of the AR technology also perceives that he "sees" "virtual content" such as a robot statue 1110 standing upon the real-world platform 1120, and a cartoon-like avatar character 1130 flying by which seems to be a personification of a bumble bee, even though these elements 1130, 1110 do not exist in the real world. Because the human visual perception system is complex, it is challenging to produce an AR technology that facilitates a comfortable, natural-feeling, rich presentation of virtual image elements amongst other virtual or real-world imagery elements.

Systems and methods disclosed herein address various challenges related to AR and VR technology.

SUMMARY

In an aspect, a diffraction grating comprises a cholesteric liquid crystal (CLC) layer comprising a plurality of chiral structures, wherein each chiral structure comprises a plurality of liquid crystal molecules that extend in a layer depth direction by at least a helical pitch and are successively rotated in a first rotation direction. The helical pitch is a length in the layer depth direction corresponding to a net rotation angle of the liquid crystal molecules of the chiral structures by one full rotation in the first rotation direction. The arrangements of the liquid crystal molecules of the chiral structures vary periodically in a lateral direction perpendicular to the layer depth direction.

In another aspect, a head-mounted display device (HMD) is configured to project light to an eye of a user to display augmented reality image content. The HMD comprises a head-mounted display device comprising a frame configured to be supported on a head of the user. The HMD comprises a display disposed on the frame, where at least a portion of the display comprises one or more waveguides. The one or more waveguides are transparent and are disposed at a location in front of the user's eye when the user wears the head-mounted display device such that the transparent portion transmits light from a portion of an environment in front of the user to the user's eye to provide a view of the portion of the environment in front of the user. The display further comprising one or more light sources and at least one diffraction grating configured to couple light from the light sources into the one or more waveguides or to couple light out of the one or more waveguides, wherein the at least one diffraction grating comprises a diffraction grating according to aspects described elsewhere in the specification.

In another aspect, a wave-guiding device comprises one or more cholesteric liquid crystal (CLC) layers each comprising a plurality of chiral structures, wherein each chiral structure comprises a plurality of liquid crystal molecules that extend in a layer depth direction and are successively rotated in a first rotation direction, and wherein arrangements of the liquid crystal molecules of the chiral structures vary periodically in a lateral direction perpendicular to the layer depth direction such that the one or more CLC layers are configured to Bragg-reflect incident light. One or more waveguides are formed over the one or more CLC layers and are configured to optically couple Bragg-reflected light such that the Bragg-reflected light travels in a lateral direction perpendicular to the layer depth direction by total internal reflection (TIR). The one or more CLC layers and the one or more waveguides are configured to be in the same optical path.

In another aspect, a wavelength-selective cholesteric liquid crystal reflector (CLCR) comprises one or more cholesteric liquid crystal (CLC) layers each comprising a plurality of chiral structures, wherein each chiral structure comprises a plurality of liquid crystal molecules that extend in a layer depth direction and are successively rotated in a first rotation direction. Arrangements of the liquid crystal molecules of the chiral structures vary periodically in a lateral direction perpendicular to the layer depth direction such that the one or more CLC layers are configured to substantially Bragg-reflect a first incident light having a first wavelength while substantially transmitting a second incident light having a second wavelength.

In another aspect, a head mounted display (HMD) configured to be worn on a head of a user comprises a frame comprising a pair of ear stems; a pair of optical elements supported by the frame such that each of the pair of optical elements is capable of being disposed forward of an eye of the user; a forward-facing imager mounted to one of the pair of ear stems; and a cholesteric liquid crystal (CLC) off-axis mirror comprising one or more cholesteric liquid crystal (CLC) layers each comprising a plurality of chiral structures. Each chiral structure comprises a plurality of liquid crystal molecules that extend in a layer depth direction and are successively rotated in a first rotation direction, wherein arrangements of the liquid crystal molecules of the chiral structures vary periodically in a lateral direction perpendicular to the layer depth direction such that the one or more CLC layers are configured to Bragg-reflect incident light. The cholesteric liquid crystal (CLC) off-axis mirror is disposed in or on one of the pair of optical elements and configured to reflect infrared light toward the forward-facing imager that is configured to receive the infrared light reflected by the reflective element.

In another aspect, a wave-guiding device comprises one or more cholesteric liquid crystal (CLC) layers each comprising a plurality of chiral structures, wherein each chiral structure comprises a plurality of liquid crystal molecules that extend in a layer depth direction and are successively rotated in a first rotation direction, wherein arrangements of the liquid crystal molecules of the chiral structures vary periodically in a lateral direction perpendicular to the layer depth direction such that the one or more CLC layers are configured to Bragg-reflect incident light. The wave-guiding device additionally includes one or more waveguides formed over the one or more CLC layers and configured to optically couple Bragg-reflected light from the one or more CLC layers such that the Bragg-reflected light travels in a lateral direction perpendicular to the layer depth direction by total internal reflection (TIR). The wave-guiding device is configured to have a field of view (FOV), within which a diffraction efficiency is greater than 25%, which exceeds 20°.

In yet another aspect, a display device comprises a waveguide and an incoupling optical element formed on the waveguide. The incoupling optical element is configured to incouple light incident thereon into a first side of the waveguide, wherein the incoupling optical element and the waveguide are configured such that light in-coupled into the waveguide propagates in the wave guide in an in-plane direction of the waveguide by total internal reflection (TIR). The display device additionally comprises an outcoupling optical element formed on the waveguide and configured to outcouple light incident thereon from the waveguide. The light out-coupling element comprises a cholesteric liquid crystal (CLC) layer comprising a plurality of chiral structures, wherein each of the chiral structures comprises a plurality of liquid crystal molecules that extend in a layer depth direction of the CLC layer and are successively rotated in a first rotation direction, wherein arrangements of the liquid crystal molecules of the chiral structures vary periodically in a lateral direction perpendicular to the layer depth direction such that the one or more CLC layers are configured to Bragg-reflect light incident thereon from the waveguide towards the first side.

Details of one or more implementations of the subject matter described in this specification are set forth in the accompanying drawings and the description below. Other features, aspects, and advantages will become apparent from the description, the drawings, and the claims. Neither this summary nor the following detailed description purports to define or limit the scope of the inventive subject matter.

Throughout the drawings, reference numbers may be re-used to indicate correspondence between referenced elements. The drawings are provided to illustrate example embodiments described herein and are not intended to limit the scope of the disclosure.

DETAILED DESCRIPTION

AR systems may display virtual content to a user, or viewer, while still allowing the user to see the world around them. Preferably, this content is displayed on a head-mounted display, e.g., as part of eyewear, that projects image information to the user's eyes. In addition, the display may also transmit light from the surrounding environment to the user's eyes, to allow a view of that surrounding environment. As used herein, it will be appreciated that a "head-mounted" display is a display that may be mounted on the head of a viewer.

Figure 2:
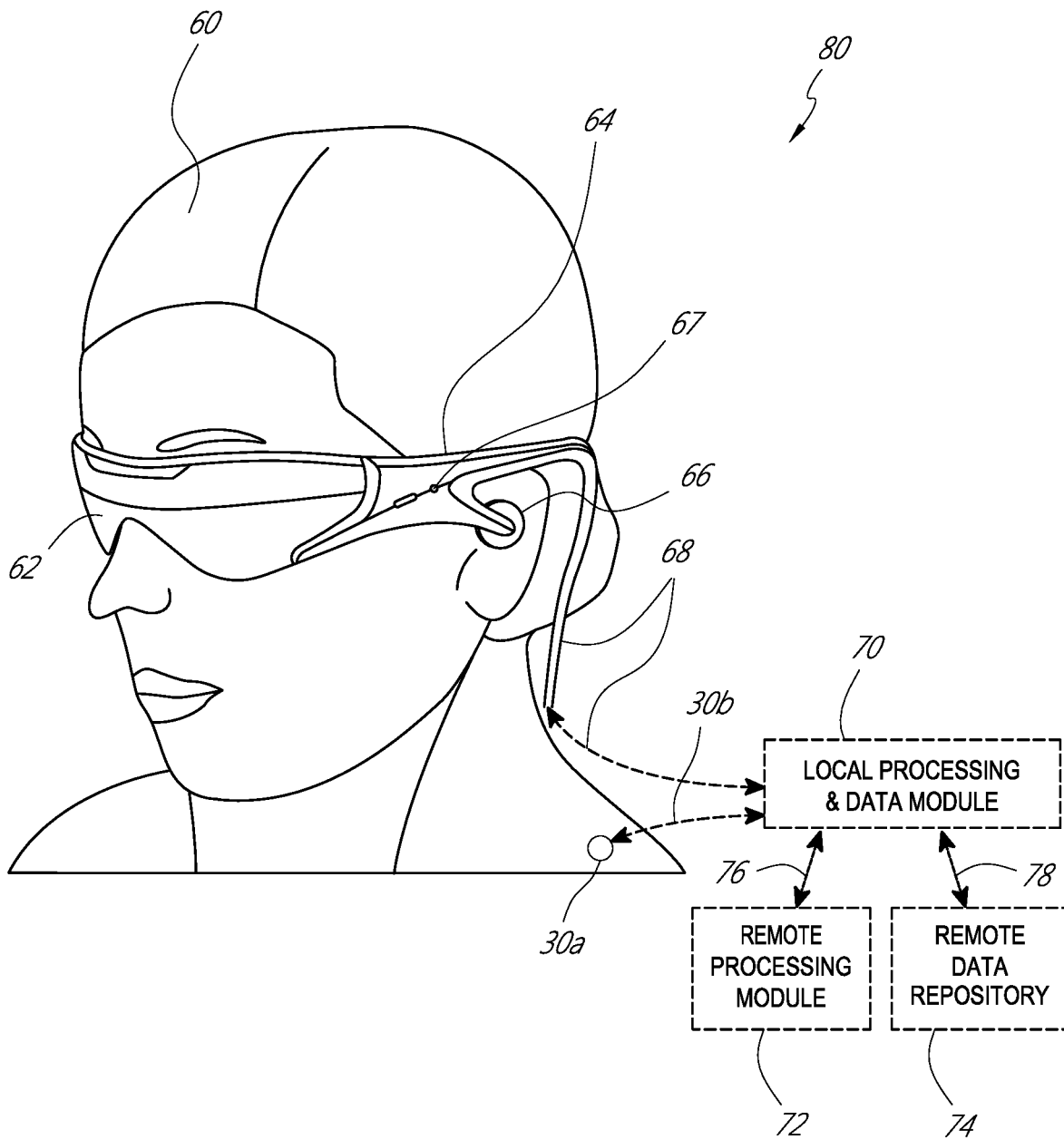
FIG. 2 illustrates an example of wearable display system.

FIG. 2 illustrates an example of wearable display system 80. The display system 80 includes a display 62, and various mechanical and electronic modules and systems to support the functioning of that display 62. The display 62 may be coupled to a frame 64, which is wearable by a display system user or viewer 60 and which is configured to position the display 62 in front of the eyes of the user 60. The display 62 may be considered eyewear in some embodiments. In some embodiments, a speaker 66 is coupled to the frame 64 and positioned adjacent the ear canal of the user 60 (in some embodiments, another speaker, not shown, is positioned adjacent the other ear canal of the user to provide for stereo/shapeable sound control). In some embodiments, the display system may also include one or more microphones 67 or other devices to detect sound. In some embodiments, the microphone is configured to allow the user to provide inputs or commands to the system 80 (e.g., the selection of voice menu commands, natural language questions, etc.), and/or may allow audio communication with other persons (e.g., with other users of similar display systems The microphone may further be configured as a peripheral sensor to continuously collect audio data (e.g., to passively collect from the user and/or environment). Such audio data may include user sounds such as heavy breathing, or environmental sounds, such as a loud bang indicative of a nearby event. The display system may also include a peripheral sensor 30a, which may be separate from the frame 64 and attached to the body of the user 60 (e.g., on the head, torso, an extremity, etc. of the user 60). The peripheral sensor 30a may be configured to acquire data characterizing the physiological state of the user 60 in some embodiments, as described further herein. For example, the sensor 30a may be an electrode.

With continued reference to FIG. 2, the display 62 is operatively coupled by communications link 68, such as by a wired lead or wireless connectivity, to a local data processing module 70 which may be mounted in a variety of configurations, such as fixedly attached to the frame 64, fixedly attached to a helmet or hat worn by the user, embedded in headphones, or otherwise removably attached to the user 60 (e.g., in a backpack-style configuration, in a belt-coupling style configuration). Similarly, the sensor 30a may be operatively coupled by communications link 30b, e.g., a wired lead or wireless connectivity, to the local processor and data module 70. The local processing and data module 70 may comprise a hardware processor, as well as digital memory, such as non-volatile memory (e.g., flash memory or hard disk drives), both of which may be utilized to assist in the processing, caching, and storage of data. The data include data a) captured from sensors (which may be, e.g., operatively coupled to the frame 64 or otherwise attached to the user 60), such as image capture devices (such as cameras), microphones, inertial measurement units, accelerometers, compasses, GPS units, radio devices, gyros, and/or other sensors disclosed herein; and/or b) acquired and/or processed using remote processing module 72 and/or remote data repository 74 (including data relating to virtual content), possibly for passage to the display 62 after such processing or retrieval. The local processing and data module 70 may be operatively coupled by communication links 76, 78, such as via a wired or wireless communication links, to the remote processing module 72 and remote data repository 74 such that these remote modules 72, 74 are operatively coupled to each other and available as resources to the local processing and data module 70. In some embodiments, the local processing and data module 70 may include one or more of the image capture devices, microphones, inertial measurement units, accelerometers, compasses, GPS units, radio devices, and/or gyros. In some other embodiments, one or more of these sensors may be attached to the frame 64, or may be standalone structures that communicate with the local processing and data module 70 by wired or wireless communication pathways.

With continued reference to FIG. 2, in some embodiments, the remote processing module 72 may comprise one or more processors configured to analyze and process data and/or image information. In some embodiments, the remote data repository 74 may comprise a digital data storage facility, which may be available through the internet or other networking configuration in a "cloud" resource configuration. In some embodiments, the remote data repository 74 may include one or more remote servers, which provide information, e.g., information for generating augmented reality content, to the local processing and data module 70 and/or the remote processing module 72. In some embodiments, all data is stored and all computations are performed in the local processing and data module, allowing fully autonomous use from a remote module.

Figure 3:
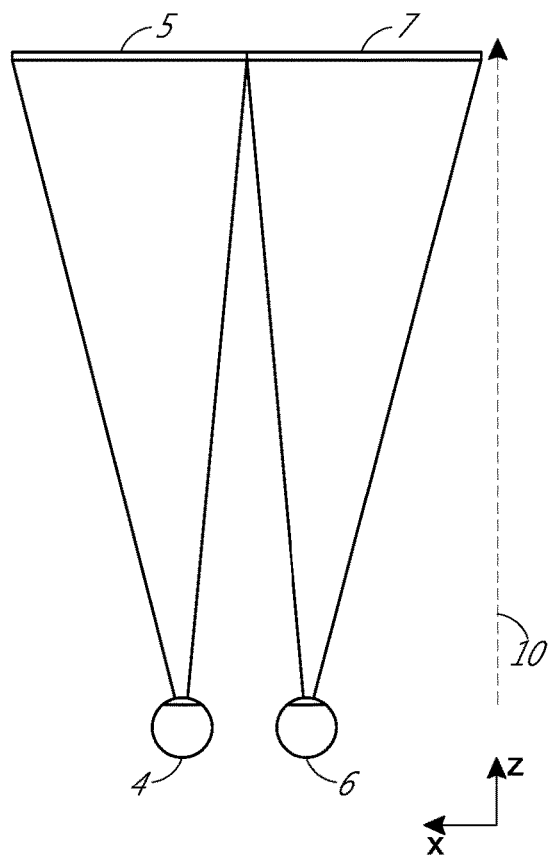
FIG. 3 illustrates a conventional display system for simulating three-dimensional imagery for a user.

The perception of an image as being "three-dimensional" or "3-D" may be achieved by providing slightly different presentations of the image to each eye of the viewer. FIG. 3 illustrates a conventional display system for simulating three-dimensional imagery for a user. Two distinct images 5, 7—one for each eye 4, 6—are outputted to the user. The images 5, 7 are spaced from the eyes 4, 6 by a distance 10 along an optical or z-axis parallel to the line of sight of the viewer. The images 5, 7 are flat and the eyes 4, 6 may focus on the images by assuming a single accommodated state. Such systems rely on the human visual system to combine the images 5, 7 to provide a perception of depth and/or scale for the combined image.

It will be appreciated, however, that the human visual system is more complicated and providing a realistic perception of depth is more challenging. For example, many viewers of conventional "3-D" display systems find such systems to be uncomfortable or may not perceive a sense of depth at all. Without being limited by theory, it is believed that viewers of an object may perceive the object as being "three-dimensional" due to a combination of vergence and accommodation. Vergence movements (i.e., rotation of the eyes so that the pupils move toward or away from each other to converge the lines of sight of the eyes to fixate upon an object) of the two eyes relative to each other are closely associated with focusing (or "accommodation") of the lenses and pupils of the eyes. Under normal conditions, changing the focus of the lenses of the eyes, or accommodating the eyes, to change focus from one object to another object at a different distance will automatically cause a matching change in vergence to the same distance, under a relationship known as the "accommodation-vergence reflex," as well as pupil dilation or constriction. Likewise, a change in vergence will trigger a matching change in accommodation of lens shape and pupil size, under normal conditions. As noted herein, many stereoscopic or "3-D" display systems display a scene using slightly different presentations (and, so, slightly different images) to each eye such that a three-dimensional perspective is perceived by the human visual system. Such systems are uncomfortable for many viewers, however, since they, among other things, simply provide a different presentation of a scene, but with the eyes viewing all the image information at a single accommodated state, and work against the "accommodation-vergence reflex." Display systems that provide a better match between accommodation and vergence may form more realistic and comfortable simulations of three-dimensional imagery contributing to increased duration of wear and in turn compliance to diagnostic and therapy protocols.

Figure 4:
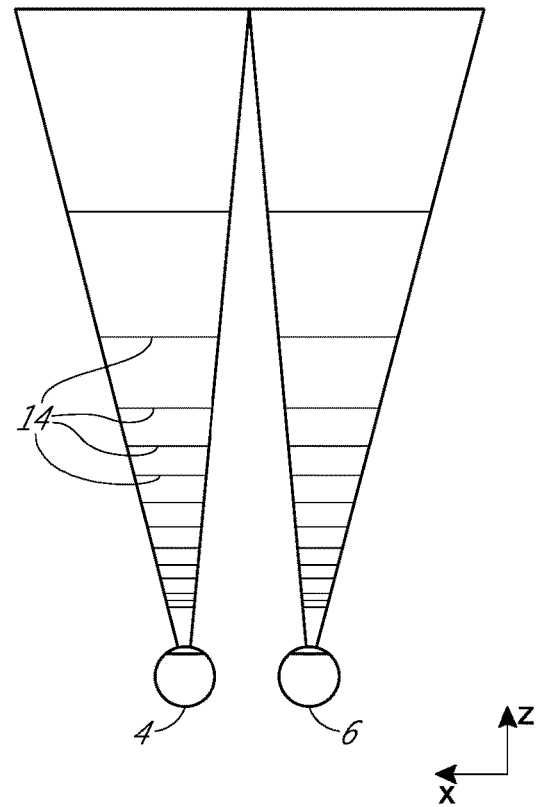
FIG. 4 illustrates aspects of an approach for simulating three-dimensional imagery using multiple depth planes.

FIG. 4 illustrates aspects of an approach for simulating three-dimensional imagery using multiple depth planes. With reference to FIG. 4, objects at various distances from eyes 4, 6 on the z-axis are accommodated by the eyes 4, 6 so that those objects are in focus. The eyes (4 and 6) assume particular accommodated states to bring into focus objects at different distances along the z-axis. Consequently, a particular accommodated state may be said to be associated with a particular one of depth planes 14, with has an associated focal distance, such that objects or parts of objects in a particular depth plane are in focus when the eye is in the accommodated state for that depth plane. In some embodiments, three-dimensional imagery may be simulated by providing different presentations of an image for each of the eyes 4, 6, and also by providing different presentations of the image corresponding to each of the depth planes. While shown as being separate for clarity of illustration, it will be appreciated that the fields of view of the eyes 4, 6 may overlap, for example, as distance along the z-axis increases. In addition, while shown as flat for ease of illustration, it will be appreciated that the contours of a depth plane may be curved in physical space, such that all features in a depth plane are in focus with the eye in a particular accommodated state.

Figure 5A:
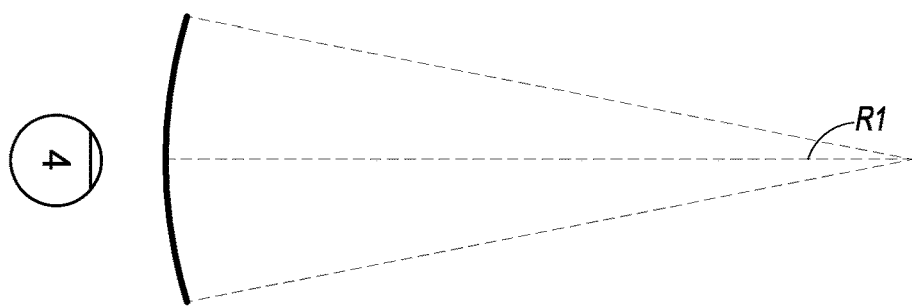
FIGS. 5A-5C illustrate relationships between radius of curvature and focal radius.
Figure 5B:
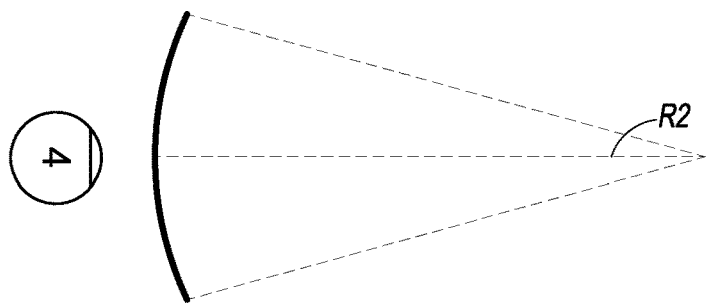
Figure 5C:
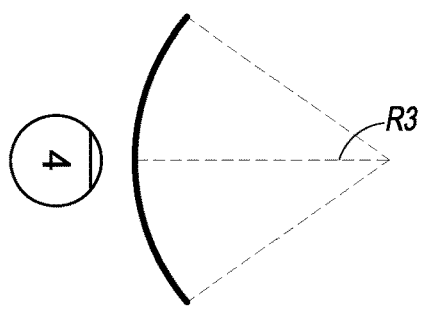

The distance between an object and the eye 4 or 6 may also change the amount of divergence of light from that object, as viewed by that eye. FIGS. 5A-5C illustrates relationships between distance and the divergence of light rays. The distance between the object and the eye 4 is represented by, in order of decreasing distance, R1, R2, and R3. As shown in FIGS. 5A-5C, the light rays become more divergent as distance to the object decreases. As distance increases, the light rays become more collimated. Stated another way, it may be said that the light field produced by a point (the object or a part of the object) has a spherical wavefront curvature, which is a function of how far away the point is from the eye of the user. The curvature increases with decreasing distance between the object and the eye 4. Consequently, at different depth planes, the degree of divergence of light rays is also different, with the degree of divergence increasing with decreasing distance between depth planes and the viewer's eye 4. While only a single eye 4 is illustrated for clarity of illustration in FIGS. 5A-5C and other figures herein, it will be appreciated that the discussions regarding eye 4 may be applied to both eyes 4 and 6 of a viewer.

Without being limited by theory, it is believed that the human eye typically can interpret a finite number of depth planes to provide depth perception. Consequently, a highly believable simulation of perceived depth may be achieved by providing, to the eye, different presentations of an image corresponding to each of these limited number of depth planes. The different presentations may be separately focused by the viewer's eyes, thereby helping to provide the user with depth cues based on the accommodation of the eye required to bring into focus different image features for the scene located on different depth plane and/or based on observing different image features on different depth planes being out of focus.

Figure 6:
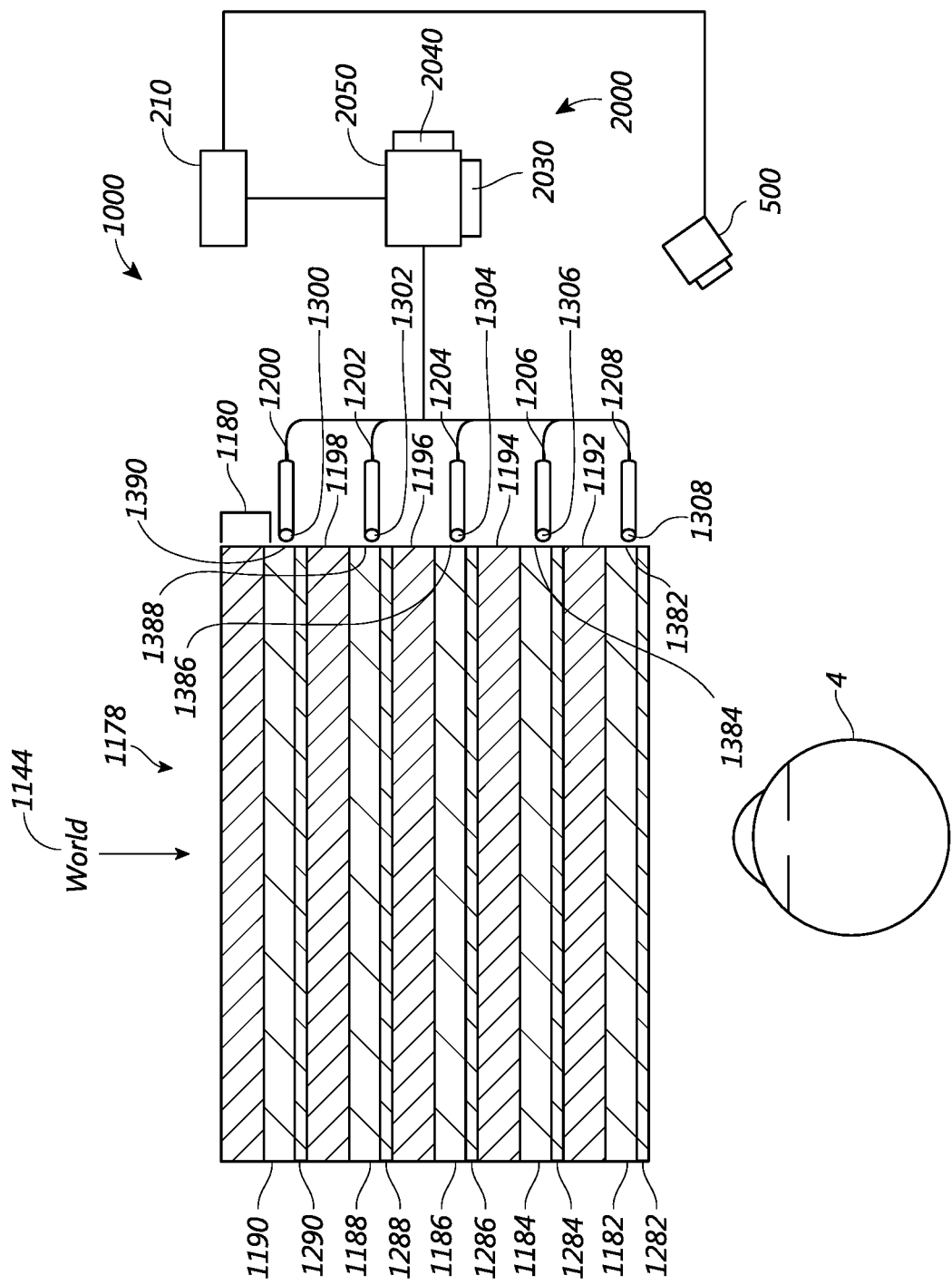
FIG. 6 illustrates an example of a waveguide stack for outputting image information to a user.

FIG. 6 illustrates an example of a waveguide stack for outputting image information to a user. A display system 1000 includes a stack of waveguides, or stacked waveguide assembly, 1178 that may be utilized to provide three-dimensional perception to the eye/brain using a plurality of waveguides 1182, 1184, 1186, 1188, 1190. In some embodiments, the display system 1000 is the system 80 of FIG. 2, with FIG. 6 schematically showing some parts of that system 80 in greater detail. For example, the waveguide assembly 1178 may be part of the display 62 of FIG. 2. It will be appreciated that the display system 1000 may be considered a light field display in some embodiments.

With continued reference to FIG. 6, the waveguide assembly 1178 may also include a plurality of features 1198, 1196, 1194, 1192 between the waveguides. In some embodiments, the features 1198, 1196, 1194, 1192 may be one or more lenses. The waveguides 1182, 1184, 1186, 1188, 1190 and/or the plurality of lenses 1198, 1196, 1194, 1192 may be configured to send image information to the eye with various levels of wavefront curvature or light ray divergence. Each waveguide level may be associated with a particular depth plane and may be configured to output image information corresponding to that depth plane. Image injection devices 1200, 1202, 1204, 1206, 1208 may function as a source of light for the waveguides and may be utilized to inject image information into the waveguides 1182, 1184, 1186, 1188, 1190, each of which may be configured, as described herein, to distribute incoming light across each respective waveguide, for output toward the eye 4. Light exits an output surface 1300, 1302, 1304, 1306, 1308 of the image injection devices 1200, 1202, 1204, 1206, 1208 and is injected into a corresponding input surface 1382, 1384, 1386, 1388, 1390 of the waveguides 1182, 1184, 1186, 1188, 1190. In some embodiments, the each of the input surfaces 1382, 1384, 1386, 1388, 1390 may be an edge of a corresponding waveguide, or may be part of a major surface of the corresponding waveguide (that is, one of the waveguide surfaces directly facing the world 1144 or the viewer's eye 4). In some embodiments, a single beam of light (e.g. a collimated beam) may be injected into each waveguide to output an entire field of cloned collimated beams that are directed toward the eye 4 at particular angles (and amounts of divergence) corresponding to the depth plane associated with a particular waveguide. In some embodiments, a single one of the image injection devices 1200, 1202, 1204, 1206, 1208 may be associated with and inject light into a plurality (e.g., three) of the waveguides 1182, 1184, 1186, 1188, 1190.

In some embodiments, the image injection devices 1200, 1202, 1204, 1206, 1208 are discrete displays that each produce image information for injection into a corresponding waveguide 1182, 1184, 1186, 1188, 1190, respectively. In some other embodiments, the image injection devices 1200, 1202, 1204, 1206, 1208 are the output ends of a single multiplexed display which may, e.g., pipe image information via one or more optical conduits (such as fiber optic cables) to each of the image injection devices 1200, 1202, 1204, 1206, 1208. It will be appreciated that the image information provided by the image injection devices 1200, 1202, 1204, 1206, 1208 may include light of different wavelengths, or colors (e.g., different component colors, as discussed herein).

In some embodiments, the light injected into the waveguides 1182, 1184, 1186, 1188, 1190 is provided by a light projector system 2000, which comprises a light module 2040, which may include a light emitter, such as a light emitting diode (LED). The light from the light module 2040 may be directed to and modified by a light modulator 2030, e.g., a spatial light modulator, via a beam splitter 2050. The light modulator 2030 may be configured to change the perceived intensity of the light injected into the waveguides 1182, 1184, 1186, 1188, 1190. Examples of spatial light modulators include liquid crystal displays (LCD) including a liquid crystal on silicon (LCOS) displays.

In some embodiments, the display system 1000 may be a scanning fiber display comprising one or more scanning fibers configured to project light in various patterns (e.g., raster scan, spiral scan, Lissajous patterns, etc.) into one or more waveguides 1182, 1184, 1186, 1188, 1190 and ultimately to the eye 4 of the viewer. In some embodiments, the illustrated image injection devices 1200, 1202, 1204, 1206, 1208 may schematically represent a single scanning fiber or a bundles of scanning fibers configured to inject light into one or a plurality of the waveguides 1182, 1184, 1186, 1188, 1190. In some other embodiments, the illustrated image injection devices 1200, 1202, 1204, 1206, 1208 may schematically represent a plurality of scanning fibers or a plurality of bundles of scanning, fibers each of which are configured to inject light into an associated one of the waveguides 1182, 1184, 1186, 1188, 1190. It will be appreciated that the one or more optical fibers may be configured to transmit light from the light module 2040 to the one or more waveguides 1182, 1184, 1186, 1188, 1190. It will be appreciated that one or more intervening optical structures may be provided between the scanning fiber, or fibers, and the one or more waveguides 1182, 1184, 1186, 1188, 1190 to, e.g., redirect light exiting the scanning fiber into the one or more waveguides 1182, 1184, 1186, 1188, 1190.

Figure 1:
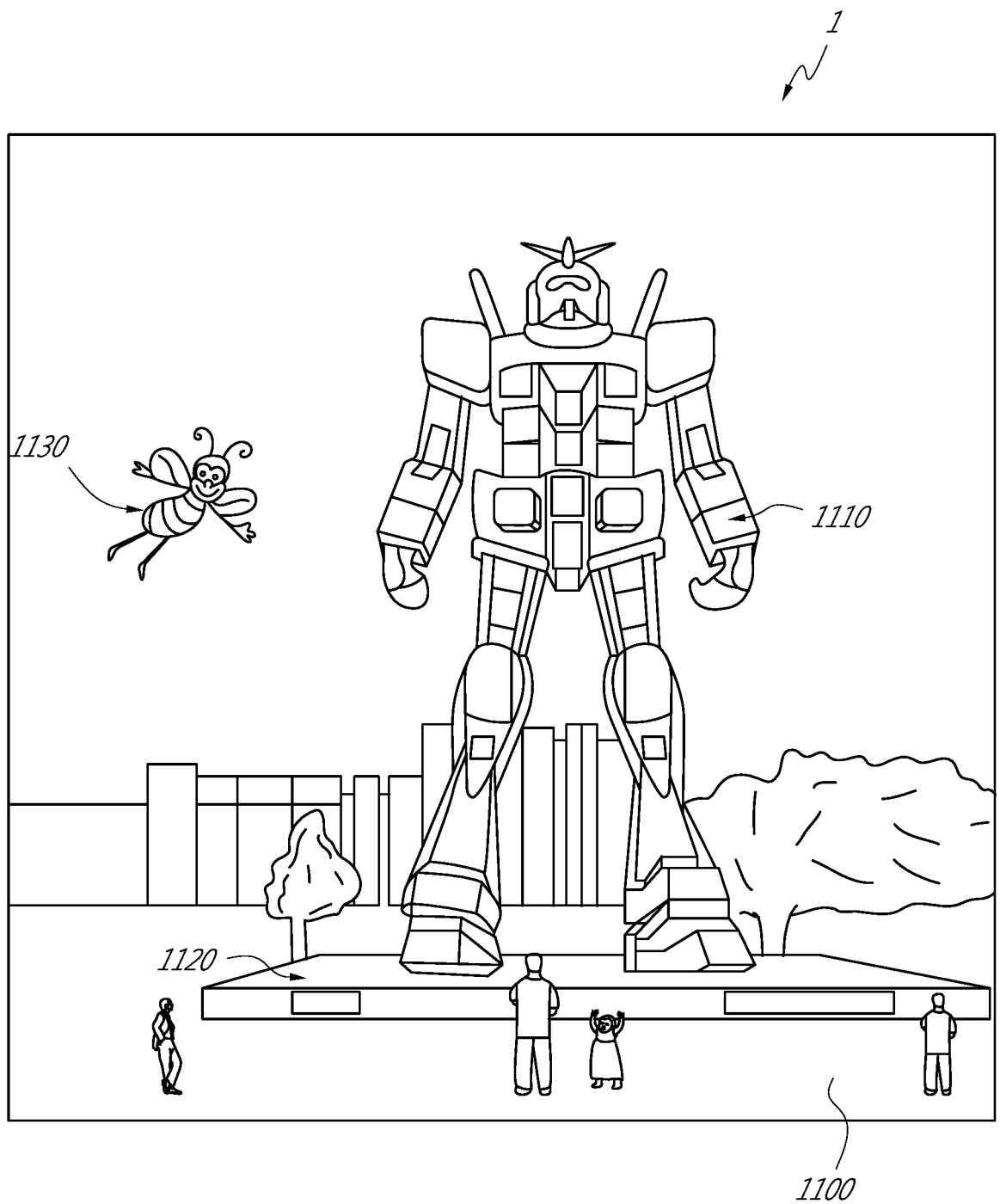
FIG. 1 illustrates a user's view of augmented reality (AR) through an AR device.

A controller 1210 controls the operation of one or more of the stacked waveguide assembly 1178, including operation of the image injection devices 1200, 1202, 1204, 1206, 1208, the light source 2040, and the light modulator 2030. In some embodiments, the controller 1210 is part of the local data processing module 70. The controller 1210 includes programming (e.g., instructions in a non-transitory medium) that regulates the timing and provision of image information to the waveguides 1182, 1184, 1186, 1188, 1190 according to, e.g., any of the various schemes disclosed herein. In some embodiments, the controller may be a single integral device, or a distributed system connected by wired or wireless communication channels. The controller 1210 may be part of the processing modules 70 or 72 (FIG. 1) in some embodiments.

With continued reference to FIG. 6, the waveguides 1182, 1184, 1186, 1188, 1190 may be configured to propagate light within each respective waveguide by total internal reflection (TIR). The waveguides 1182, 1184, 1186, 1188, 1190 may each be planar or have another shape (e.g., curved), with major top and bottom surfaces and edges extending between those major top and bottom surfaces. In the illustrated configuration, the waveguides 1182, 1184, 1186, 1188, 1190 may each include outcoupling optical elements 1282, 1284, 1286, 1288, 1290 that are configured to extract light out of a waveguide by redirecting the light, propagating within each respective waveguide, out of the waveguide to output image information to the eye 4. Extracted light may also be referred to as outcoupled light and the outcoupling optical elements light may also be referred to light extracting optical elements. An extracted beam of light is outputted by the waveguide at locations at which the light propagating in the waveguide strikes a light extracting optical element. The outcoupling optical elements 1282, 1284, 1286, 1288, 1290 may, for example, be gratings, including diffractive optical features, as discussed further herein. While illustrated disposed at the bottom major surfaces of the waveguides 1182, 1184, 1186, 1188, 1190 for ease of description and drawing clarity, in some embodiments, the outcoupling optical elements 1282, 1284, 1286, 1288, 1290 may be disposed at the top and/or bottom major surfaces, and/or may be disposed directly in the volume of the waveguides 1182, 1184, 1186, 1188, 1190, as discussed further herein. In some embodiments, the outcoupling optical elements 1282, 1284, 1286, 1288, 1290 may be formed in a layer of material that is attached to a transparent substrate to form the waveguides 1182, 1184, 1186, 1188, 1190. In some other embodiments, the waveguides 1182, 1184, 1186, 1188, 1190 may be a monolithic piece of material and the outcoupling optical elements 1282, 1284, 1286, 1288, 1290 may be formed on a surface and/or in the interior of that piece of material.

With continued reference to FIG. 6, as discussed herein, each waveguide 1182, 1184, 1186, 1188, 1190 is configured to output light to form an image corresponding to a particular depth plane. For example, the waveguide 1182 nearest the eye may be configured to deliver collimated light, as injected into such waveguide 1182, to the eye 4. The collimated light may be representative of the optical infinity focal plane. The next waveguide up 1184 may be configured to send out collimated light which passes through the first lens 1192 (e.g., a negative lens) before it can reach the eye 4; such first lens 1192 may be configured to create a slight convex wavefront curvature so that the eye/brain interprets light coming from that next waveguide up 1184 as coming from a first focal plane closer inward toward the eye 4 from optical infinity. Similarly, the third up waveguide 1186 passes its output light through both the first 1192 and second 1194 lenses before reaching the eye 4; the combined optical power of the first 1192 and second 1194 lenses may be configured to create another incremental amount of wavefront curvature so that the eye/brain interprets light coming from the third waveguide 1186 as coming from a second focal plane that is even closer inward toward the person from optical infinity than was light from the next waveguide up 1184.

The other waveguide layers 1188, 1190 and lenses 1196, 1198 are similarly configured, with the highest waveguide 1190 in the stack sending its output through all of the lenses between it and the eye for an aggregate focal power representative of the closest focal plane to the person. To compensate for the stack of lenses 1198, 1196, 1194, 1192 when viewing/interpreting light coming from the world 1144 on the other side of the stacked waveguide assembly 1178, a compensating lens layer 1180 may be disposed at the top of the stack to compensate for the aggregate power of the lens stack 1198, 1196, 1194, 1192 below. Such a configuration provides as many perceived focal planes as there are available waveguide/lens pairings. Both the outcoupling optical elements of the waveguides and the focusing aspects of the lenses may be static (i.e., not dynamic or electro-active). In some alternative embodiments, either or both may be dynamic using electro-active features.

In some embodiments, two or more of the waveguides 1182, 1184, 1186, 1188, 1190 may have the same associated depth plane. For example, multiple waveguides 1182, 1184, 1186, 1188, 1190 may be configured to output images set to the same depth plane, or multiple subsets of the waveguides 1182, 1184, 1186, 1188, 1190 may be configured to output images set to the same plurality of depth planes, with one set for each depth plane. This can provide advantages for forming a tiled image to provide an expanded field of view at those depth planes.

With continued reference to FIG. 6, the outcoupling optical elements 1282, 1284, 1286, 1288, 1290 may be configured to both redirect light out of their respective waveguides and to output this light with the appropriate amount of divergence or collimation for a particular depth plane associated with the waveguide. As a result, waveguides having different associated depth planes may have different configurations of outcoupling optical elements 1282, 1284, 1286, 1288, 1290, which output light with a different amount of divergence depending on the associated depth plane. In some embodiments, the light extracting optical elements 1282, 1284, 1286, 1288, 1290 may be volumetric or surface features, which may be configured to output light at specific angles. For example, the light extracting optical elements 1282, 1284, 1286, 1288, 1290 may be volume holograms, surface holograms, and/or diffraction gratings. In some embodiments, the features 1198, 1196, 1194, 1192 may not be lenses; rather, they may simply be spacers (e.g., cladding layers and/or structures for forming air gaps).

In some embodiments, the outcoupling optical elements 1282, 1284, 1286, 1288, 1290 are diffractive features that form a diffraction pattern, or "diffractive optical element" (also referred to herein as a "DOE"). Preferably, the DOE's have a sufficiently low diffraction efficiency (a ratio of diffracted beam intensity to the incident beam intensity) so that only a portion of the light of the beam is deflected away toward the eye 4 with each intersection of the DOE, while the rest continues to move through a waveguide via total internal reflection. The light carrying the image information is thus divided into a number of related exit beams that exit the waveguide at a multiplicity of locations and the result is a fairly uniform pattern of exit emission toward the eye 4 for this particular collimated beam bouncing around within a waveguide.

In some embodiments, one or more DOEs may be switchable between "on" states in which they actively diffract, and "off" states in which they do not significantly diffract. For instance, a switchable DOE may comprise a layer of polymer dispersed liquid crystal, in which microdroplets comprise a diffraction pattern in a host medium, and the refractive index of the microdroplets may be switched to substantially match the refractive index of the host material (in which case the pattern does not appreciably diffract incident light) or the microdroplet may be switched to an index that does not match that of the host medium (in which case the pattern actively diffracts incident light).

In some embodiments, a camera assembly 500 (e.g., a digital camera, including visible light and infrared light cameras) may be provided to capture images of the eye 4 and/or tissue around the eye 4 to, e.g., detect user inputs and/or to monitor the physiological state of the user. As used herein, a camera may be any image capture device. In some embodiments, the camera assembly 500 may include an image capture device and a light source to project light (e.g., infrared light) to the eye, which may then be reflected by the eye and detected by the image capture device. In some embodiments, the camera assembly 500 may be attached to the frame 64 (FIG. 2) and may be in electrical communication with the processing modules 70 and/or 72, which may process image information from the camera assembly 500 to make various determinations regarding, e.g., the physiological state of the user, as discussed herein. It will be appreciated that information regarding the physiological state of user may be used to determine the behavioral or emotional state of the user. Examples of such information include movements of the user and/or facial expressions of the user. The behavioral or emotional state of the user may then be triangulated with collected environmental and/or virtual content data so as to determine relationships between the behavioral or emotional state, physiological state, and environmental or virtual content data. In some embodiments, one camera assembly 500 may be utilized for each eye, to separately monitor each eye.

Figure 7:
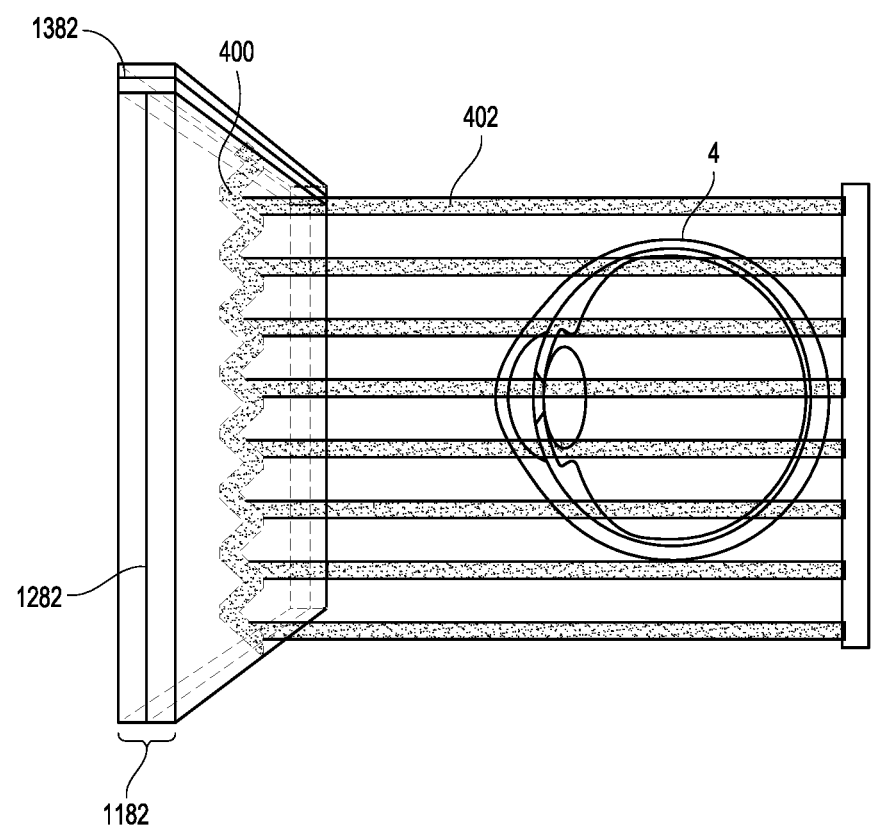
FIG. 7 illustrates an example of exit beams outputted by a waveguide.

With reference now to FIG. 7, an example of exit beams outputted by a waveguide is shown. One waveguide is illustrated, but it will be appreciated that other waveguides in the waveguide assembly 1178 (FIG. 6) may function similarly, where the waveguide assembly 1178 includes multiple waveguides. Light 400 is injected into the waveguide 1182 at the input surface 1382 of the waveguide 1182 and propagates within the waveguide 1182 by TIR. At points where the light 400 impinges on the DOE 1282, a portion of the light exits the waveguide as exit beams 402. The exit beams 402 are illustrated as substantially parallel but, as discussed herein, they may also be redirected to propagate to the eye 4 at an angle (e.g., forming divergent exit beams), depending on the depth plane associated with the waveguide 1182. It will be appreciated that substantially parallel exit beams may be indicative of a waveguide with outcoupling optical elements that outcouple light to form images that appear to be set on a depth plane at a large distance (e.g., optical infinity) from the eye 4. Other waveguides or other sets of outcoupling optical elements may output an exit beam pattern that is more divergent, which would require the eye 4 to accommodate to a closer distance to bring it into focus on the retina and would be interpreted by the brain as light from a distance closer to the eye 4 than optical infinity.

Figure 8:
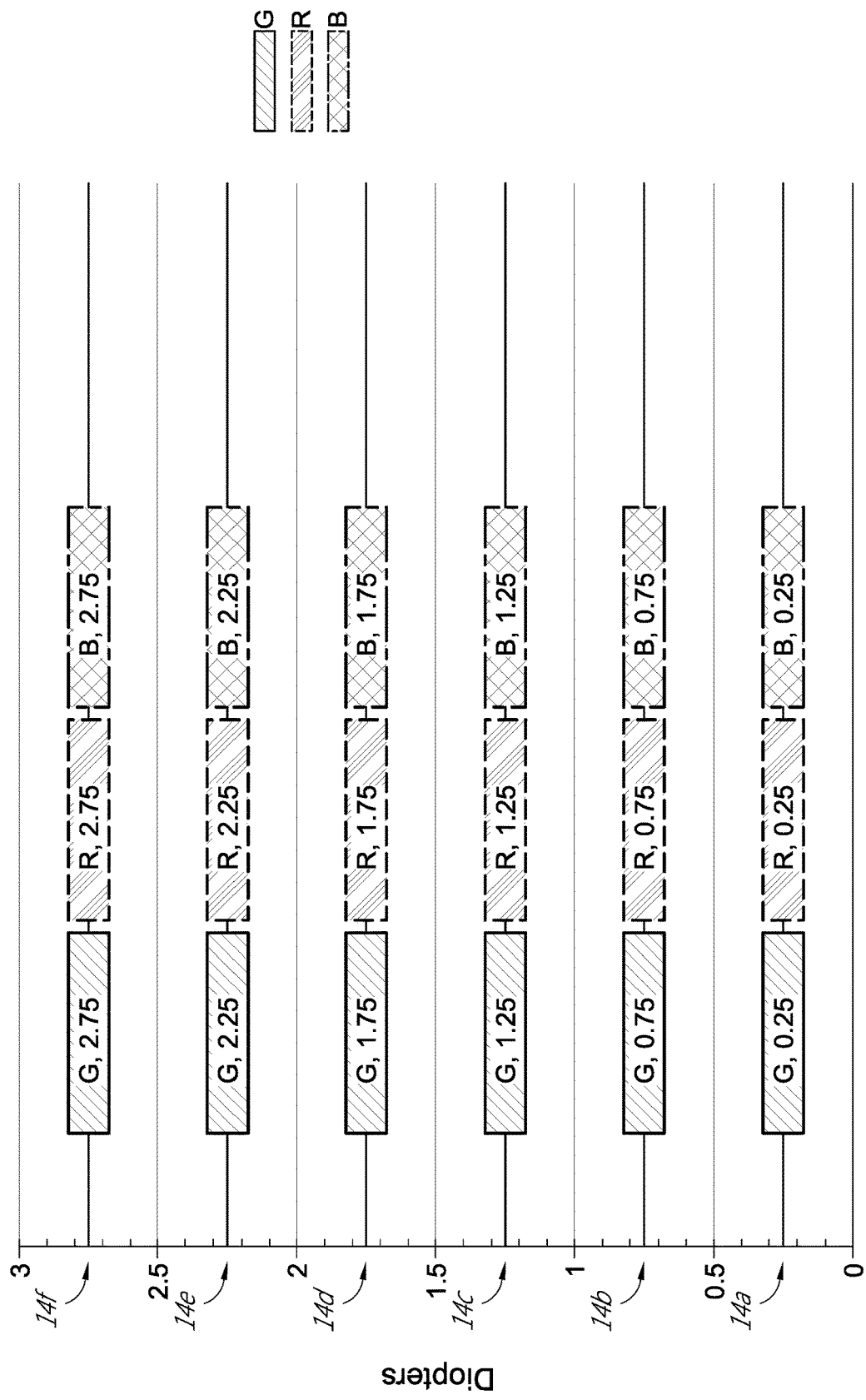
FIG. 8 illustrates an example of a stacked waveguide assembly in which each depth plane includes images formed using multiple different component colors.

In some embodiments, a full color image may be formed at each depth plane by overlaying images in each of the component colors, e.g., three or more component colors. FIG. 8 illustrates an example of a stacked waveguide assembly in which each depth plane includes images formed using multiple different component colors. The illustrated embodiment shows depth planes 14a-14f, although more or fewer depths are also contemplated. Each depth plane may have three component color images associated with it: a first image of a first color, G; a second image of a second color, R; and a third image of a third color, B. Different depth planes are indicated in the figure by different numbers for diopters (dpt) following the letters G, R, and B. Just as examples, the numbers following each of these letters indicate diopters (1/m), or inverse distance of the depth plane from a viewer, and each box in the figures represents an individual component color image. In some embodiments, to account for differences in the eye's focusing of light of different wavelengths, the exact placement of the depth planes for different component colors may vary. For example, different component color images for a given depth plane may be placed on depth planes corresponding to different distances from the user. Such an arrangement may increase visual acuity and user comfort and/or may decrease chromatic aberrations.

In some embodiments, light of each component color may be outputted by a single dedicated waveguide and, consequently, each depth plane may have multiple waveguides associated with it. In such embodiments, each box in the figures including the letters G, R, or B may be understood to represent an individual waveguide, and three waveguides may be provided per depth plane where three component color images are provided per depth plane. While the waveguides associated with each depth plane are shown adjacent to one another in this drawing for ease of description, it will be appreciated that, in a physical device, the waveguides may all be arranged in a stack with one waveguide per level. In some other embodiments, multiple component colors may be outputted by the same waveguide, such that, e.g., only a single waveguide may be provided per depth plane.

With continued reference to FIG. 8, in some embodiments, G is the color green, R is the color red, and B is the color blue. In some other embodiments, other colors associated with other wavelengths of light, including magenta and cyan, may be used in addition to or may replace one or more of red, green, or blue. In some embodiments, features 198, 196, 194, and 192 may be active or passive optical filters configured to block or selectively light from the ambient environment to the viewer's eyes.

It will be appreciated that references to a given color of light throughout this disclosure will be understood to encompass light of one or more wavelengths within a range of wavelengths of light that are perceived by a viewer as being of that given color. For example, red light may include light of one or more wavelengths in the range of about 620-780 nm, green light may include light of one or more wavelengths in the range of about 492-577 nm, and blue light may include light of one or more wavelengths in the range of about 435-493 nm.

In some embodiments, the light source 2040 (FIG. 6) may be configured to emit light of one or more wavelengths outside the visual perception range of the viewer, for example, infrared and/or ultraviolet wavelengths. In addition, the incoupling, outcoupling, and other light redirecting structures of the waveguides of the display 1000 may be configured to direct and emit this light out of the display towards the user's eye 4, e.g., for imaging and/or user stimulation applications.

Figure 9A:
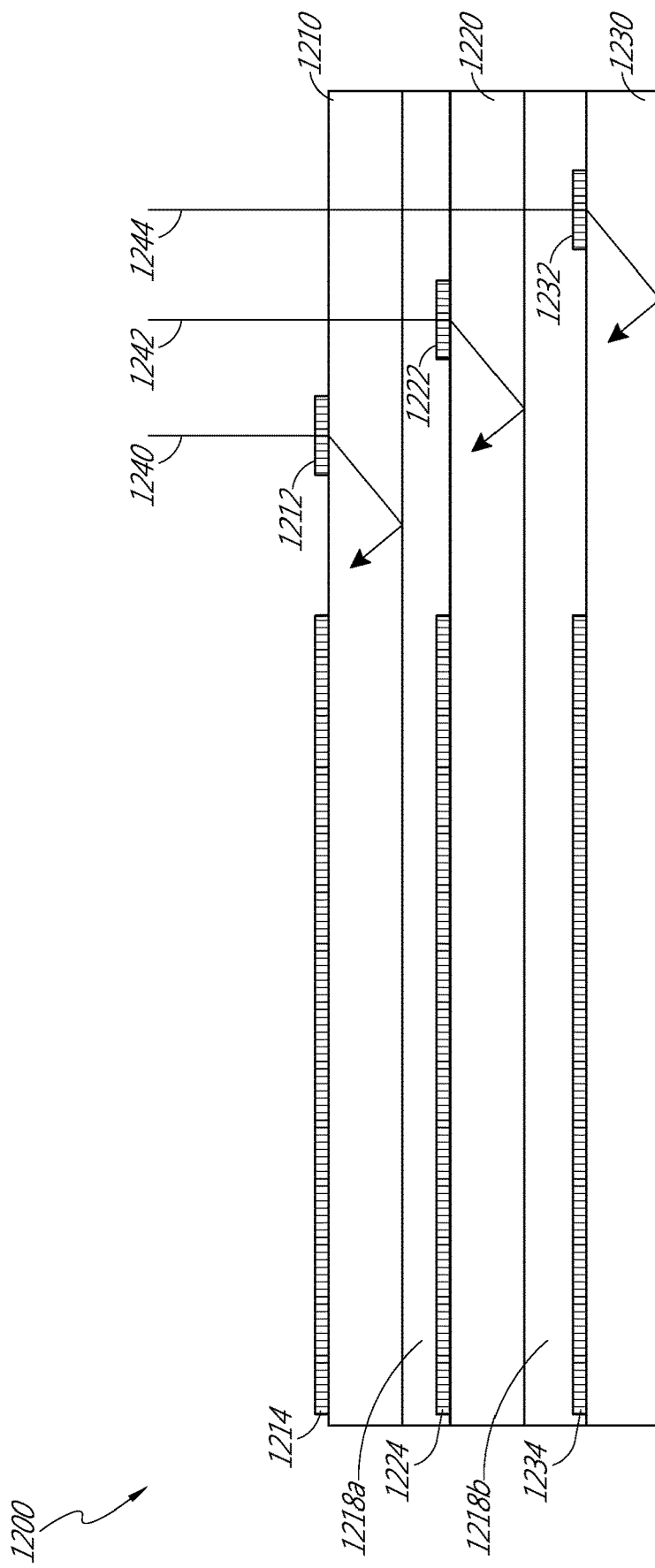
FIG. 9A illustrates a cross-sectional side view of an example of a set of stacked waveguides that each includes an incoupling optical element.

With reference now to FIG. 9A, in some embodiments, light impinging on a waveguide may need to be redirected to incouple that light into the waveguide. An incoupling optical element may be used to redirect and incouple the light into its corresponding waveguide. FIG. 9A illustrates a cross-sectional side view of an example of a plurality or set 1200 of stacked waveguides that each includes an incoupling optical element. The waveguides may each be configured to output light of one or more different wavelengths, or one or more different ranges of wavelengths. It will be appreciated that the stack 1200 may correspond to the stack 1178 (FIG. 6) and the illustrated waveguides of the stack 1200 may correspond to part of the plurality of waveguides 1182, 1184, 1186, 1188, 1190, except that light from one or more of the image injection devices 1200, 1202, 1204, 1206, 1208 is injected into the waveguides from a position that requires light to be redirected for incoupling.

The illustrated set 1200 of stacked waveguides includes waveguides 1210, 1220, and 1230. Each waveguide includes an associated incoupling optical element (which may also be referred to as a light input area on the waveguide), with, e.g., incoupling optical element 1212 disposed on a major surface (e.g., an upper major surface) of waveguide 1210, incoupling optical element 1224 disposed on a major surface (e.g., an upper major surface) of waveguide 1220, and incoupling optical element 1232 disposed on a major surface (e.g., an upper major surface) of waveguide 1230. In some embodiments, one or more of the incoupling optical elements 1212, 1222, 1232 may be disposed on the bottom major surface of the respective waveguide 1210, 1220, 1230 (particularly where the one or more incoupling optical elements are reflective, deflecting optical elements). As illustrated, the incoupling optical elements 1212, 1222, 1232 may be disposed on the upper major surface of their respective waveguide 1210, 1220, 1230 (or the top of the next lower waveguide), particularly where those incoupling optical elements are transmissive, deflecting optical elements. In some embodiments, the incoupling optical elements 1212, 1222, 1232 may be disposed in the body of the respective waveguide 1210, 1220, 1230. In some embodiments, as discussed herein, the incoupling optical elements 1212, 1222, 1232 are wavelength selective, such that they selectively redirect one or more wavelengths of light, while transmitting other wavelengths of light. While illustrated on one side or corner of their respective waveguide 1210, 1220, 1230, it will be appreciated that the incoupling optical elements 1212, 1222, 1232 may be disposed in other areas of their respective waveguide 1210, 1220, 1230 in some embodiments.

As illustrated, the incoupling optical elements 1212, 1222, 1232 may be laterally offset from one another. In some embodiments, each incoupling optical element may be offset such that it receives light without that light passing through another incoupling optical element. For example, each incoupling optical element 1212, 1222, 1232 may be configured to receive light from a different image injection device 1200, 1202, 1204, 1206, and 1208 as shown in FIG. 6, and may be separated (e.g., laterally spaced apart) from other incoupling optical elements 1212, 1222, 1232 such that it substantially does not receive light from the other ones of the incoupling optical elements 1212, 1222, 1232.

Each waveguide also includes associated light distributing elements, with, e.g., light distributing elements 1214 disposed on a major surface (e.g., a top major surface) of waveguide 1210, light distributing elements 1224 disposed on a major surface (e.g., a top major surface) of waveguide 1220, and light distributing elements 1234 disposed on a major surface (e.g., a top major surface) of waveguide 1230. In some other embodiments, the light distributing elements 1214, 1224, 1234, may be disposed on a bottom major surface of associated waveguides 1210, 1220, 1230, respectively. In some other embodiments, the light distributing elements 1214, 1224, 1234, may be disposed on both top and bottom major surface of associated waveguides 1210, 1220, 1230, respectively; or the light distributing elements 1214, 1224, 1234, may be disposed on different ones of the top and bottom major surfaces in different associated waveguides 1210, 1220, 1230, respectively.

The waveguides 1210, 1220, 1230 may be spaced apart and separated by, e.g., gas, liquid, and/or solid layers of material. For example, as illustrated, layer 1218*a* may separate waveguides 1210 and 1220; and layer 1218*b* may separate waveguides 1220 and 1230. In some embodiments, the layers 1218*a* and 1218*b* are formed of low refractive index materials (that is, materials having a lower refractive index than the material forming the immediately adjacent one of waveguides 1210, 1220, 1230). Preferably, the refractive index of the material forming the layers 1218*a*, 1218*b* is 0.05 or more, or 0.10 or more less than the refractive index of the material forming the waveguides 1210, 1220, 1230. Advantageously, the lower refractive index layers 1218*a*, 1218*b* may function as cladding layers that facilitate total internal reflection (TIR) of light through the waveguides 1210, 1220, 1230 (e.g., TIR between the top and bottom major surfaces of each waveguide). In some embodiments, the layers 1218*a*, 1218*b* are formed of air. While not illustrated, it will be appreciated that the top and bottom of the illustrated set 1200 of waveguides may include immediately neighboring cladding layers.

Preferably, for ease of manufacturing and other considerations, the material forming the waveguides 1210, 1220, 1230 are similar or the same, and the material forming the layers 1218*a*, 1218*b* are similar or the same. In some embodiments, the material forming the waveguides 1210, 1220, 1230 may be different between one or more waveguides, and/or the material forming the layers 1218*a*, 1218*b* may be different, while still holding to the various refractive index relationships noted above.

With continued reference to FIG. 9A, light rays 1240, 1242, 1244 are incident on the set 1200 of waveguides. It will be appreciated that the light rays 1240, 1242, 1244 may be injected into the waveguides 1210, 1220, 1230 by one or more image injection devices 1200, 1202, 1204, 1206, 1208 (FIG. 6).

In some embodiments, the light rays 1240, 1242, 1244 have different properties, e.g., different wavelengths or different ranges of wavelengths, which may correspond to different colors. The incoupling optical elements 1212, 122, 1232 each deflect the incident light such that the light propagates through a respective one of the waveguides 1210, 1220, 1230 by TIR.

For example, incoupling optical element 1212 may be configured to deflect ray 1240, which has a first wavelength or range of wavelengths. Similarly, the transmitted ray 1242 impinges on and is deflected by the incoupling optical element 1222, which is configured to deflect light of a second wavelength or range of wavelengths. Likewise, the ray 1244 is deflected by the incoupling optical element 1232, which is configured to selectively deflect light of third wavelength or range of wavelengths.

With continued reference to FIG. 9A, the deflected light rays 1240, 1242, 1244 are deflected so that they propagate through a corresponding waveguide 1210, 1220, 1230; that is, the incoupling optical elements 1212, 1222, 1232 of each waveguide deflects light into that corresponding waveguide 1210, 1220, 1230 to incouple light into that corresponding waveguide. The light rays 1240, 1242, 1244 are deflected at angles that cause the light to propagate through the respective waveguide 1210, 1220, 1230 by TIR. The light rays 1240, 1242, 1244 propagate through the respective waveguide 1210, 1220, 1230 by TIR until impinging on the waveguide's corresponding light distributing elements 1214, 1224, 1234.

Figure 9B:
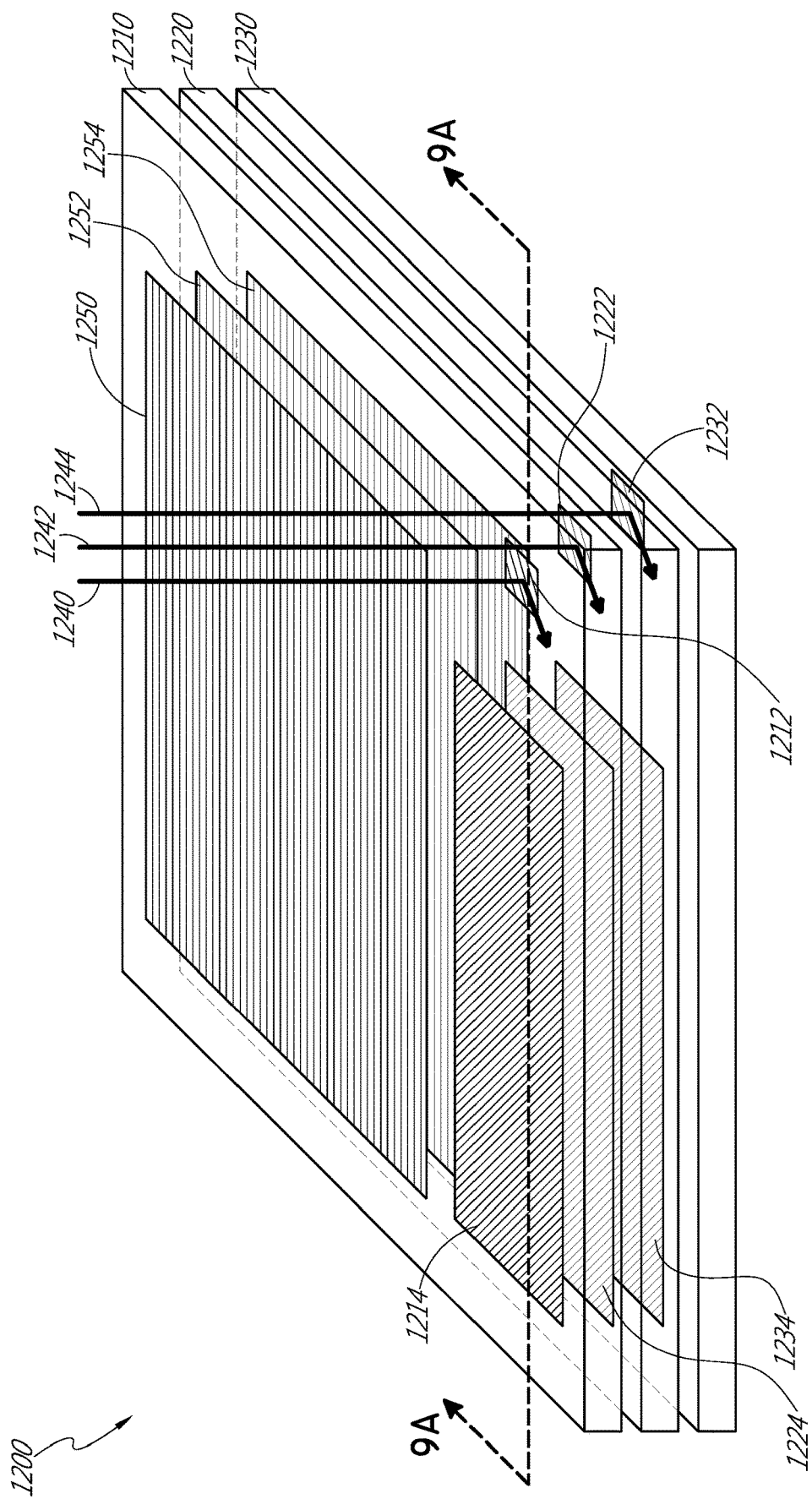
FIG. 9B illustrates a perspective view of an example of the plurality of stacked waveguides of FIG. 9A.

With reference now to FIG. 9B, a perspective view of an example of the plurality of stacked waveguides of FIG. 9A is illustrated. As noted above, the incoupled light rays 1240, 1242, 1244, are deflected by the incoupling optical elements 1212, 1222, 1232, respectively, and then propagate by TIR within the waveguides 1210, 1220, 1230, respectively. The light rays 1240, 1242, 1244 then impinge on the light distributing elements 1214, 1224, 1234, respectively. The light distributing elements 1214, 1224, 1234 deflect the light rays 1240, 1242, 1244 so that they propagate towards the outcoupling optical elements 1250, 1252, 1254, respectively.

In some embodiments, the light distributing elements 1214, 1224, 1234 are orthogonal pupil expanders (OPE's). In some embodiments, the OPE's both deflect or distribute light to the outcoupling optical elements 1250, 1252, 1254 and also increase the beam or spot size of this light as it propagates to the outcoupling optical elements. In some embodiments, e.g., where the beam size is already of a desired size, the light distributing elements 1214, 1224, 1234 may be omitted and the incoupling optical elements 1212, 1222, 1232 may be configured to deflect light directly to the outcoupling optical elements 1250, 1252, 1254. For example, with reference to FIG. 9A, the light distributing elements 1214, 1224, 1234 may be replaced with outcoupling optical elements 1250, 1252, 1254, respectively. In some embodiments, the outcoupling optical elements 1250, 1252, 1254 are exit pupils (EP's) or exit pupil expanders (EPE's) that direct light in a viewer's eye 4 (FIG. 7).

Accordingly, with reference to FIGS. 9A and 9B, in some embodiments, the set 1200 of waveguides includes waveguides 1210, 1220, 1230; incoupling optical elements 1212, 1222, 1232; light distributing elements (e.g., OPE's) 1214, 1224, 1234; and outcoupling optical elements (e.g., EP's) 1250, 1252, 1254 for each component color. The waveguides 1210, 1220, 1230 may be stacked with an air gap/cladding layer between each one. The incoupling optical elements 1212, 1222, 1232 redirect or deflect incident light (with different incoupling optical elements receiving light of different wavelengths) into its waveguide. The light then propagates at an angle which will result in TIR within the respective waveguide 1210, 1220, 1230. In the example shown, light ray 1240 (e.g., blue light) is deflected by the first incoupling optical element 1212, and then continues to bounce down the waveguide, interacting with the light distributing element (e.g., OPE's) 1214 and then the outcoupling optical element (e.g., EPs) 1250, in a manner described earlier. The light rays 1242 and 1244 (e.g., green and red light, respectively) will pass through the waveguide 1210, with light ray 1242 impinging on and being deflected by incoupling optical element 1222. The light ray 1242 then bounces down the waveguide 1220 via TIR, proceeding on to its light distributing element (e.g., OPEs) 1224 and then the outcoupling optical element (e.g., EP's) 1252. Finally, light ray 1244 (e.g., red light) passes through the waveguide 1220 to impinge on the light incoupling optical elements 1232 of the waveguide 1230. The light incoupling optical elements 1232 deflect the light ray 1244 such that the light ray propagates to light distributing element (e.g., OPEs) 1234 by TIR, and then to the outcoupling optical element (e.g., EPs) 1254 by TIR. The outcoupling optical element 1254 then finally outcouples the light ray 1244 to the viewer, who also receives the outcoupled light from the other waveguides 1210, 1220.

Figure 9C:
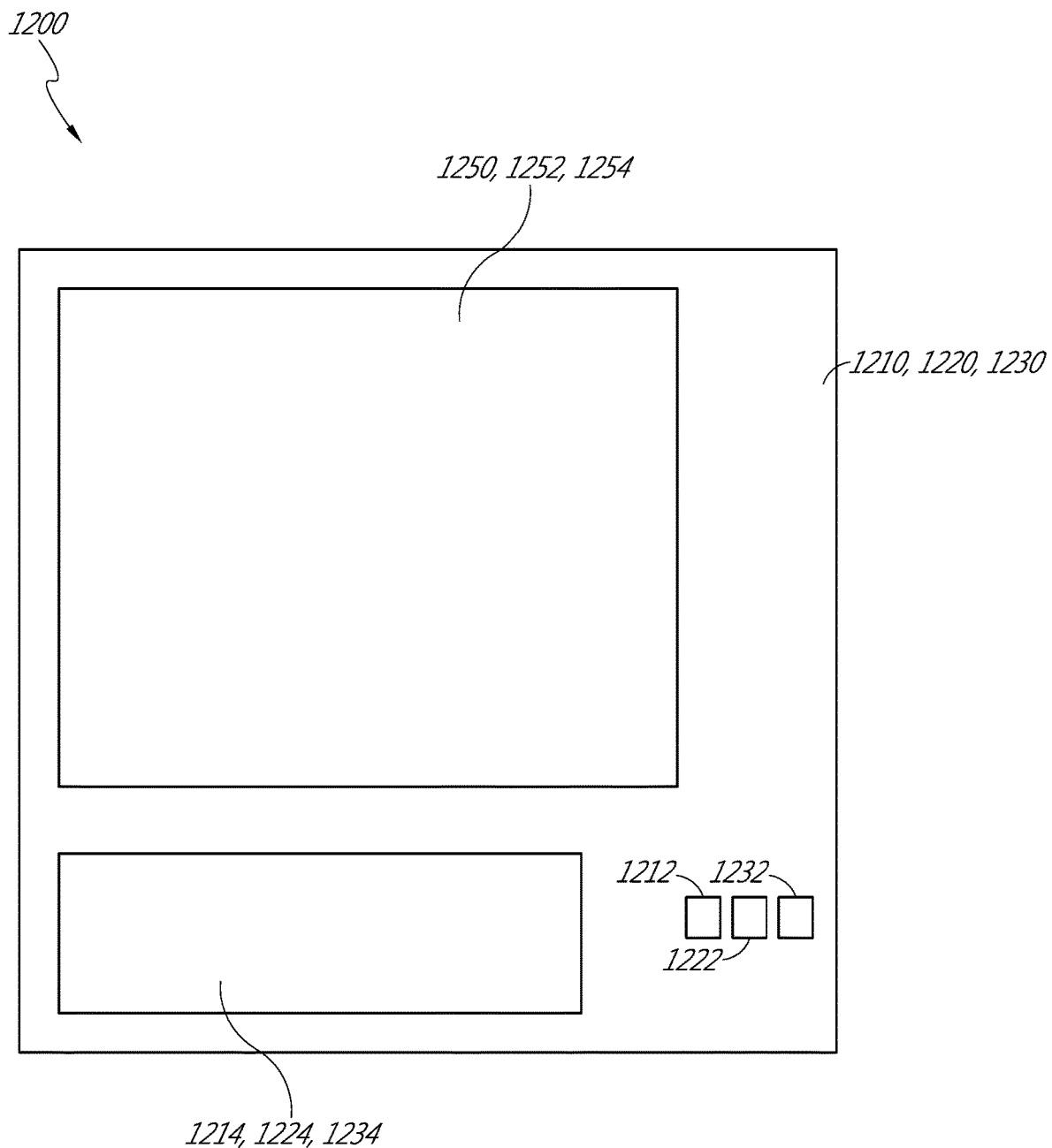
FIG. 9C illustrates a top-down plan view of an example of the plurality of stacked waveguides of FIGS. 9A and 9B.

FIG. 9C illustrates a top-down plan view of an example of the plurality of stacked waveguides of FIGS. 9A and 9B. As illustrated, the waveguides 1210, 1220, 1230, along with each waveguide's associated light distributing element 1214, 1224, 1234 and associated outcoupling optical element 1250, 1252, 1254, may be vertically aligned. However, as discussed herein, the incoupling optical elements 1212, 1222, 1232 are not vertically aligned; rather, the incoupling optical elements are preferably non-overlapping (e.g., laterally spaced apart as seen in the top-down view). As discussed further herein, this nonoverlapping spatial arrangement facilitates the injection of light from different resources into different waveguides on a one-to-one basis, thereby allowing a specific light source to be uniquely coupled to a specific waveguide. In some embodiments, arrangements including nonoverlapping spatially-separated incoupling optical elements may be referred to as a shifted pupil system, and the in coupling optical elements within these arrangements may correspond to sub pupils.

Bragg-Reflective or Diffractive Structures Based on Liquid Crystals

Generally, liquid crystals possess physical properties that may be intermediate between conventional fluids and solids. While liquid crystals are fluid-like in some aspects, unlike most fluids, the arrangement of molecules within liquid crystals exhibits some structural order. Different types of liquid crystals include thermotropic, lyotropic, and polymeric liquid crystals. Thermotropic liquid crystals disclosed herein can be implemented in various physical states, e.g., phases, including a nematic state/phase, a smectic state/phase, a chiral nematic state/phase or a chiral smectic state/phase.

As described herein, liquid crystals in a nematic state or phase can have calamitic (rod-shaped) or discotic (disc-shaped) organic molecules that have relatively little positional order, while having a long-range directional order with their long axes being roughly parallel. Thus, the organic molecules may be free to flow with their center of mass positions being randomly distributed as in a liquid, while still maintaining their long-range directional order. In some implementations, liquid crystals in a nematic phase can be uniaxial; i.e., the liquid crystals have one axis that is longer and preferred, with the other two being roughly equivalent. In other implementations, liquid crystals can be biaxial; i.e., in addition to orienting their long axis, the liquid crystals may also orient along a secondary axis.

As described herein, liquid crystals in a smectic state or phase can have the organic molecules that form relatively well-defined layers that can slide over one another. In some implementations, liquid crystals in a smectic phase can be positionally ordered along one direction. In some implementations, the long axes of the molecules can be oriented along a direction substantially normal to the plane of the liquid crystal layer, while in other implementations, the long axes of the molecules may be tilted with respect to the direction normal to the plane of the layer.

Herein and throughout the disclosure, nematic liquid crystals are composed of rod-like molecules with the long axes of neighboring molecules approximately aligned to one another. To describe this anisotropic structure, a dimensionless unit vector n called the director, may be used to describe the direction of preferred orientation of the liquid crystal molecules.

Herein and throughout the disclosure, a tilt angle or a pre-tilt angle Φ can refer to an angle measured in a plane perpendicular to a major surface (in an x-y plane) of the liquid crystal layers or of the substrate, e.g., the x-z plane, and measured between an alignment direction and the major surface or a direction parallel to the major surface, e.g., the x-direction.

Herein and throughout the disclosure, an azimuthal angle or a rotation angle φ is used to describe an angle of rotation about a layer normal direction, or an axis normal to a major surface of a liquid crystal layer, which is measured in a plane parallel to a major surface of the liquid crystal layers or of the substrate, e.g., the x-y plane, and measured between an alignment direction, e.g., an elongation direction or the direction of the director, and a direction parallel to the major surface, e.g., the y-direction.

Herein and throughout the disclosure, when an angle such as the rotation angle φ or a pre-tilt angle Φ are referred to as being substantially the same between different regions, it will be understood that an average alignment angles can, for example, be within about 1%, about 5% or about 10% of each other although the average alignment can be larger in some cases.

Herein and throughout the specification, a duty cycle can, for example, refers to a ratio between a first lateral dimension of a first region having liquid crystal molecules aligned in a first alignment direction, and the grating period of the zone having the first region. Where applicable, the first region corresponds to the region in which the alignment of the liquid crystals does not vary between different zones.

As describe herein, liquid crystals in a nematic state or a smectic state can also exhibit chirality. Such liquid crystals are referred to as being in a chiral phase or a cholesteric phase. In a chiral phase or a cholesteric phase, the liquid crystals can exhibit a twisting of the molecules perpendicular to the director, with the molecular axis parallel to the director. The finite twist angle between adjacent molecules is due to their asymmetric packing, which results in longer-range chiral order.

As described herein, liquid crystals in a chiral smectic state or phase can be configured such that the liquid crystal molecules have positional ordering in a layered structure, with the molecules tilted by a finite angle with respect to the layer normal. In addition, chirality can induce successive azimuthal twists of the liquid crystal molecules with respect to a direction perpendicular to the layer normal from one liquid crystal molecule to the next liquid crystal molecule in the layer normal direction, thereby producing a spiral twisting of the molecular axis along the layer normal.

As described herein and throughout the disclosure, a chiral structure refers to a plurality of liquid crystal molecules in a cholesteric phase that extend in a direction, e.g., a direction perpendicular to the director such as a layer depth direction, and are successively rotated or twisted in a rotation direction, e.g., clockwise or counterclockwise. In one aspect, the directors of the liquid crystal molecules in a chiral structure can be characterized as a helix having a helical pitch.

As described herein, liquid crystals in a cholesteric phase displaying chirality can be described as having a chiral pitch, or a helical pitch (p), which corresponds to a length in the layer depth direction corresponding to a net rotation angle of the liquid crystal molecules of the chiral structures by one full rotation in the first rotation direction. In other words, the helical pitch refers to the distance over which the liquid crystal molecules undergo a full 360° twist. The helical pitch (p) can change, e.g., when the temperature is altered or when other molecules are added to a liquid crystal host (an achiral liquid host material can form a chiral phase if doped with a chiral material), allowing the helical pitch (p) of a given material to be tuned accordingly. In some liquid crystal systems, the helical pitch is of the same order as the wavelength of visible light. As described herein, liquid crystals displaying chirality can also be described as having a twist angle, or a rotation angle (φ), which can refer to, for example, the relative azimuthal angular rotation between successive liquid crystal molecules in the layer normal direction, and as having a net twist angle, or a net rotation angle, which can refer to, for example, the relative azimuthal angular rotation between an uppermost liquid crystal molecule and a lowermost liquid crystal molecule across a specified length, e.g., the length of a chiral structure or the thickness of the liquid crystal layer.

According to various embodiments described herein, liquid crystals having various states or phases as described above can be configured to offer various desirable material properties, including, e.g., birefringence, optical anisotropy, and manufacturability using thin-film processes. For example, by changing surface conditions of liquid crystal layers and/or mixing different liquid crystal materials, grating structures that exhibit spatially varying diffraction properties, e.g., gradient diffraction efficiencies, can be fabricated.

As described herein, "polymerizable liquid crystals" may refer to liquid crystal materials that can be polymerized, e.g., in-situ photopolymerized, and may also be described herein as reactive mesogens (RM).

It will be appreciated that the liquid crystal molecules may be polymerizable in some embodiments and, once polymerized, may form a large network with other liquid crystal molecules. For example, the liquid crystal molecules may be linked by chemical bonds or linking chemical species to other liquid crystal molecules. Once joined together, the liquid crystal molecules may form liquid crystal domains having substantially the same orientations and locations as before being linked together. For ease of description, the term "liquid crystal molecule" is used herein to refer to both the liquid crystal molecules before polymerization and to the liquid crystal domains formed by these molecules after polymerization.

According to particular embodiments described herein, photo-polymerizable liquid crystal materials can be configured to form Bragg-reflective or diffractive structures, e.g., a diffraction grating, whose material properties, including birefringence, chirality, and ease for multiple-coating, can be utilized to create diffraction gratings with different material properties, e.g., birefringence, chirality, and thickness, which can result in different optical properties, e.g., diffraction efficiency, wavelength selectivity and off-axis diffraction angle selectivity, to name a few.

It will be appreciated that, as described herein, a "transmissive" or "transparent" structure, e.g., a transparent substrate, may allow at least some, e.g., at least 20, 30 or 50%, of an incident light, to pass therethrough. Accordingly, a transparent substrate may be a glass, sapphire or a polymeric substrate in some embodiments. In contrast, a "reflective" structure, e.g., a reflective substrate, may reflect at least some, e.g., at least 20, 30, 50, 70, 90% or more of the incident light, to reflect therefrom.

Optical properties of a grating are determined by the physical structures of the grating (e.g., the periodicity, the depth, and the duty cycle), as well as material properties of the grating (e.g., refractive index, absorption, and birefringence). When liquid crystals are used, optical properties of the grating can be controlled by controlling, e.g., molecular orientation or distribution of the liquid crystal materials. For example, by varying molecular orientation or distribution of the liquid crystal material across the grating area, the grating may exhibit graded diffraction efficiencies. Such approaches are described in the following, in reference to the figures.

Cholesteric Liquid Crystal Diffraction Grating (CLCG)

As described supra in reference to FIGS. 6 and 7, display systems according to various embodiments described herein may include optical elements, e.g., incoupling optical elements, outcoupling optical elements, and light distributing elements, which may include diffraction gratings. For example, as described above in reference to FIG. 7, light 400 that is injected into the waveguide 1182 at the input surface 1382 of the waveguide 1182 propagates within the waveguide 1182 by total internal reflection (TIR). At points where the light 400 impinges on the out-coupling optical element 1282, a portion of the light exits the waveguide as exit beams 402. In some implementations, any of the optical elements 1182, 1282, or 1382 can be configured as a diffraction grating.

Efficient light in-coupling into (or out-coupling from) the waveguide 1182 can be a challenge in designing a waveguide-based see-through displays, e.g., for virtual/augmented/mixed display applications. For these and other applications, it is desirable to have the diffraction grating formed of a material whose structure is configurable to optimize various optical properties, including diffraction properties. The desirable diffraction properties include, among other properties, polarization selectivity, spectral selectivity, angular selectivity, high spectral bandwidth and high diffraction efficiencies, among other properties. To address these and other needs, in various embodiments disclosed herein, the optical element 1282 is configured as a cholesteric liquid crystal diffraction grating (CLCG). As described infra, CLCGs according to various embodiments can be configured to optimize, among other things, polarization selectivity, bandwidth, phase profile, spatial variation of diffraction properties, spectral selectivity and high diffraction efficiencies.

In the following, various embodiments of CLCGs configured as a reflective liquid crystal diffraction grating comprising cholesteric liquid crystals (CLC) optimized for various optical properties are described. Generally, diffraction gratings have a periodic structure, which splits and diffracts light into several beams travelling in different directions. The directions of these beams depend, among other things, on the period of the periodic structure and the wavelength of the light. To optimize certain optical properties, e.g., diffraction efficiencies, for certain applications such as outcoupling optical element 1282 (FIGS. 6, 7), various material properties of the CLC can be optimized as described infra.

As described supra, liquid crystal molecules of a cholesteric liquid crystal (CLC) layer in a chiral (nematic) phase or a cholesteric phase is characterized by a plurality of liquid crystal molecules that are arranged to have successive azimuthal twists of the director as a function of position in the film in a normal direction, or a depth direction, of the liquid crystal layer. As described herein, the liquid crystal molecules that arranged to have the successive azimuthal twists are collectively referred to herein as a chiral structure. As described herein, an angle ($\phi$) of azimuthal twist or rotation is described as the angle between the directors of the liquid crystal molecules, as described supra, relative to a direction parallel to the layer normal. The spatially varying director of the liquid crystal molecules of a chiral structure can be described as forming a helical pattern in which the helical pitch (p) is defined as the distance (e.g., in the layer normal direction of the liquid crystal layer) over which the director has rotated by 360°, as described above. As described herein, a CLC layer configured as a diffraction grating has a lateral dimension by which the molecular structures of the liquid crystals periodically repeat in a lateral direction normal to the depth direction. This periodicity in the lateral direction is referred to as a grating period ($\Lambda$).

Figure 10:
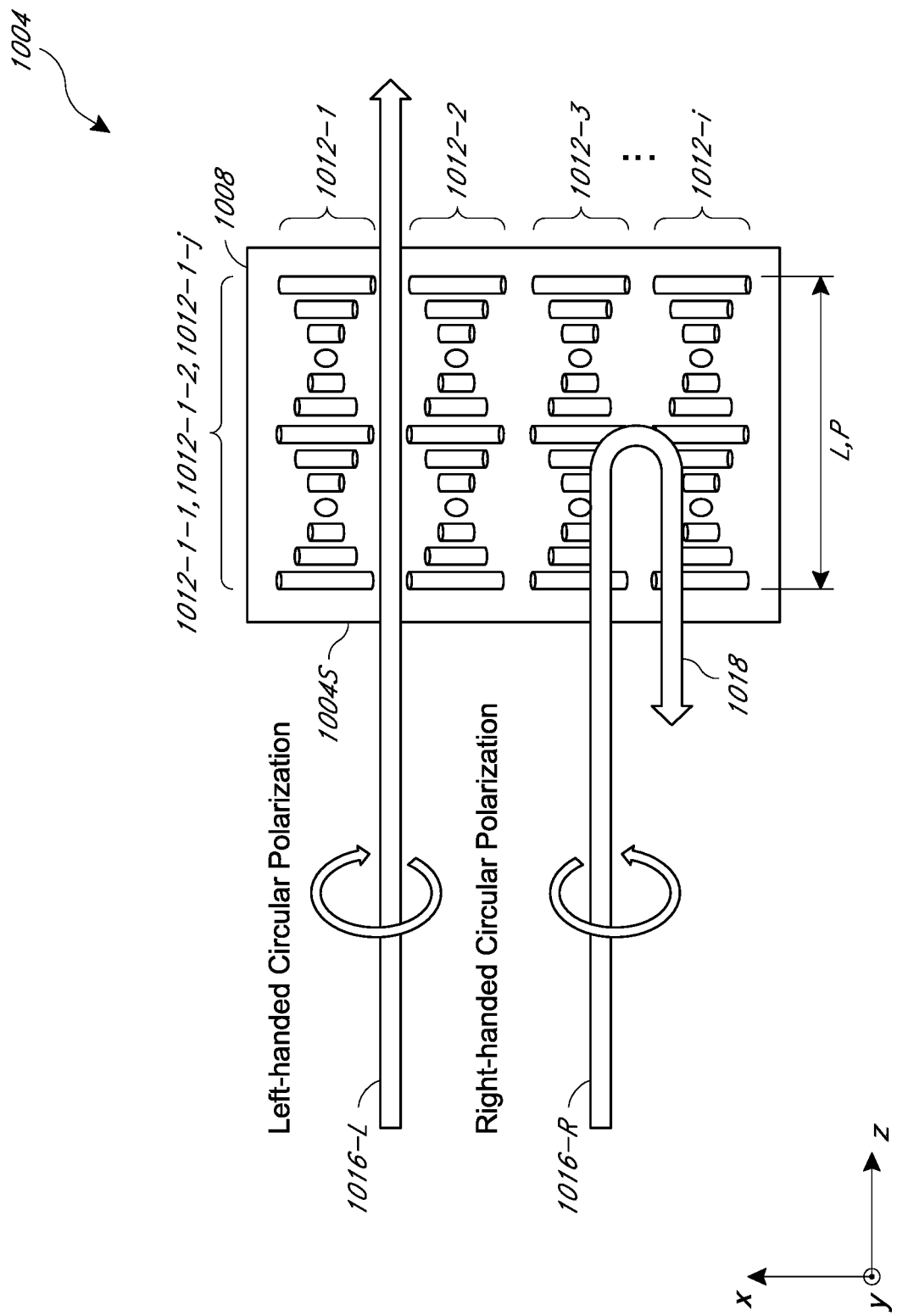
FIG. 10 illustrates a cross-sectional side view of an example of a cholesteric liquid crystal diffraction grating (CLCG) having a plurality of uniform chiral structures.

According to various embodiments described herein, a diffraction grating comprises a cholesteric liquid crystal (CLC) layer comprising a plurality of chiral structures, wherein each chiral structure comprises a plurality of liquid crystal molecules that extend in a layer depth direction by at least a helical pitch and are successively rotated in a first rotation direction. The helical pitch is a length in the layer depth direction corresponding to a net rotation angle of the liquid crystal molecules of the chiral structures by one full rotation in the first rotation direction. The arrangements of the liquid crystal molecules of the chiral structures vary periodically in a lateral direction perpendicular to the layer depth direction FIG. 10 illustrates a cross-sectional side view of a cholesteric liquid crystal (CLC) layer 1004 comprising a plurality of uniform chiral structures, according to embodiments. The CLC 1004 comprises a CLC layer 1008 comprising liquid crystal molecules arranged as a plurality of chiral structures 1012-1, 1012-2, ... 1012-$i$, wherein each chiral structure comprises a plurality of liquid crystal molecules, where is any suitable integer greater than 2. For example, the chiral structure 1012-1 comprises a plurality of liquid crystal molecules 1012-1-1, 1012-1-2, ... 1012-1-$j$ that are arranged to extend in a layer normal direction, e.g., the z-direction in the illustrated embodiment, where j is any suitable integer greater than 2. The liquid crystal molecules of each chiral structure are successively rotated in a first rotation direction. In the illustrated embodiment, the liquid crystal molecules are successively rotated in a clockwise direction when viewing in a positive direction of the z-axis (i.e., the direction of the axis arrow), or the direction of propagation of the incident light beams 1016-L, 1016-R. For example, in the illustrated embodiment, the liquid crystal molecules 1012-1-1, 1012-1-2, ... 1012-1-$j$ of the chiral structure 1012-1 are successively rotated by rotation angles $\phi_1, \phi_2, \ldots \phi_j$, relative to, e.g., the positive x-direction. In the illustrated embodiment, for illustrative purposes, the plurality of liquid crystal molecules of each of the chiral structures 1012-1, 1012-2, ... 1012-$i$ between opposing ends in the z-direction are rotated by one full rotation or turn, such that the net rotation angle of the liquid crystal molecules is about 360°. As a result, the chiral structures 1012-1, 1012-2, ... 1012-$i$ have a length L in the z-direction that is the same as the helical pitch p. However, embodiments are not so limited, and the chiral structures 1012-1, 1012-2, ... 1012-$i$ can have any number of full rotations greater than or less than 1, any suitable net rotation angle that is lower or higher than 360°, and/or any suitable length L in the z-direction that is shorter or longer than the helical pitch p. For example, in various embodiments described herein, the number of full turns of the chiral structures can be between 1 and 3, between 2 and 4, between 3 and 5, between 4 and 6, between 5 and 7, between 6 and 8, between 7 and 9, or between 8 and 10, among other numbers.

Still referring to FIG. 10, the successive rotation angles between adjacent liquid crystal molecules in the z-direction, $\phi_1, \phi_2, \ldots \phi_j$, can be the same according to some embodiments, or be different according to some other embodiments. By way of illustration, in the illustrated embodiment, the length of the chiral structures 1012-1, 1012-2, . . . 1012-*i* is about p and the net rotation angle is 360°, such that adjacent liquid crystal molecules in the z-direction are rotated by about 360°/(m−1), where m is the number of liquid crystal molecules in a chiral structure. For example, for illustrative purposes, each of the chiral structure 1012-1, 1012-2, . . . 1012-*i* has 13 liquid crystal molecules, such that adjacent liquid crystal molecules in the z-direction are rotated with respect to each other by about 30°. Of course, chiral structures in various embodiments can have any suitable number of liquid crystal molecules.

Thus, still referring to FIG. 10, the chiral structures that are adjacent in a lateral direction, e.g., x-direction, have similarly arranged liquid crystal molecules. In the illustrated embodiment, the chiral structures 1012-1, 1012-2, . . . 1012-*i* are similarly configured such that liquid crystal molecules of the different chiral structures that are at about the same depth, e.g., the liquid crystal molecules closest to the light-incident surface 1004S, have the same rotation angle, as well as successive rotation angles of successive liquid crystal molecules at about the same depth, as well as the net rotation angle of the liquid crystal molecules of each chiral structure.

In the following, the CLC layer 1004 illustrated in FIG. 10 is further described in operation, according to embodiments. As described, the CLC layer 1004 comprises the chiral structures 1012-1, 1012-2, . . . 1012-*i* having a uniform arrangement in a lateral direction, e.g., x-direction. In operation, when incident light having a combination of light beams having left-handed circular polarization and light beams having right-handed circular polarization are incident on the surface 1004S of the CLC layer 1008, by Bragg-reflection or diffraction, light with one of the circular polarization handedness is reflected by the CLC layer 1004, while light with the opposite polarization handedness is transmitted through the CLC layer 1008 without substantial interference. As described herein and throughout the disclosure, the handedness is defined as viewed in the direction of propagation. According to embodiments, when the direction of polarization, or handedness of the polarization, of the light beams 1016-L, 1016-R is matched such that it and has the same direction of rotation as the liquid crystal molecules of the chiral structures 1012-1, 1012-2, . . . 1012-*i*, the incident light is reflected. As illustrated, incident on the surface 1004S are light beams 1016-L having left-handed circular polarization and light beams 1016-R having a right-handed circular polarization. In the illustrated embodiment, the liquid crystal molecules of the chiral structures 1012-1, 1012-2, . . . 1012-*i* are rotated in a clockwise direction successively in the direction in which incident light beams 1016-L, 1016-R travel, i.e., positive x-direction, which is the same rotation direction as the light teams 1016-R having right-handed circular polarization. As a result, the light beams 1016-R having right-handed circular polarization are substantially reflected, whereas the light beams 1016-L having left-handed circular polarization are substantially transmitted through the CLC layer 1004.

Without being bound to any theory, under a Bragg-reflection or diffraction condition, the wavelength of the incident light (λ) may be proportional to the mean or average refractive index (n) of a CLC layer and to the helical pitch (p), and can be expressed as satisfying the following condition under some circumstances:

$$\lambda = np \qquad [1]$$

In addition, the bandwidth (Δλ) of Bragg-reflecting or diffracting wavelengths may be proportional to the birefringence Δn (e.g., the difference in refractive index between different polarizations of light) of CLC layer 1004 and to the helical pitch (p), and can be expressed as satisfying the following condition under some circumstances:

$$\Delta\lambda = \Delta n \cdot p \qquad [2]$$

In various embodiments described herein, the bandwidth Δλ is about 60 nm, about 80 nm or about 100 nm.

According to various embodiments, a peak reflected intensity within a visible wavelength range between, e.g., about 390 nm and about 700 nm, or within a near infrared wavelength range between, e.g., about 700 nm and about 2500 nm, can exceed about 60%, about 70%, about 80% or about 90%. In addition, according to various embodiments, the full width at half maximum (FWHM) can be less than about 100 nm, less than about 70 nm, less than about 50 nm or less than about 20 nm.

Figure 11:
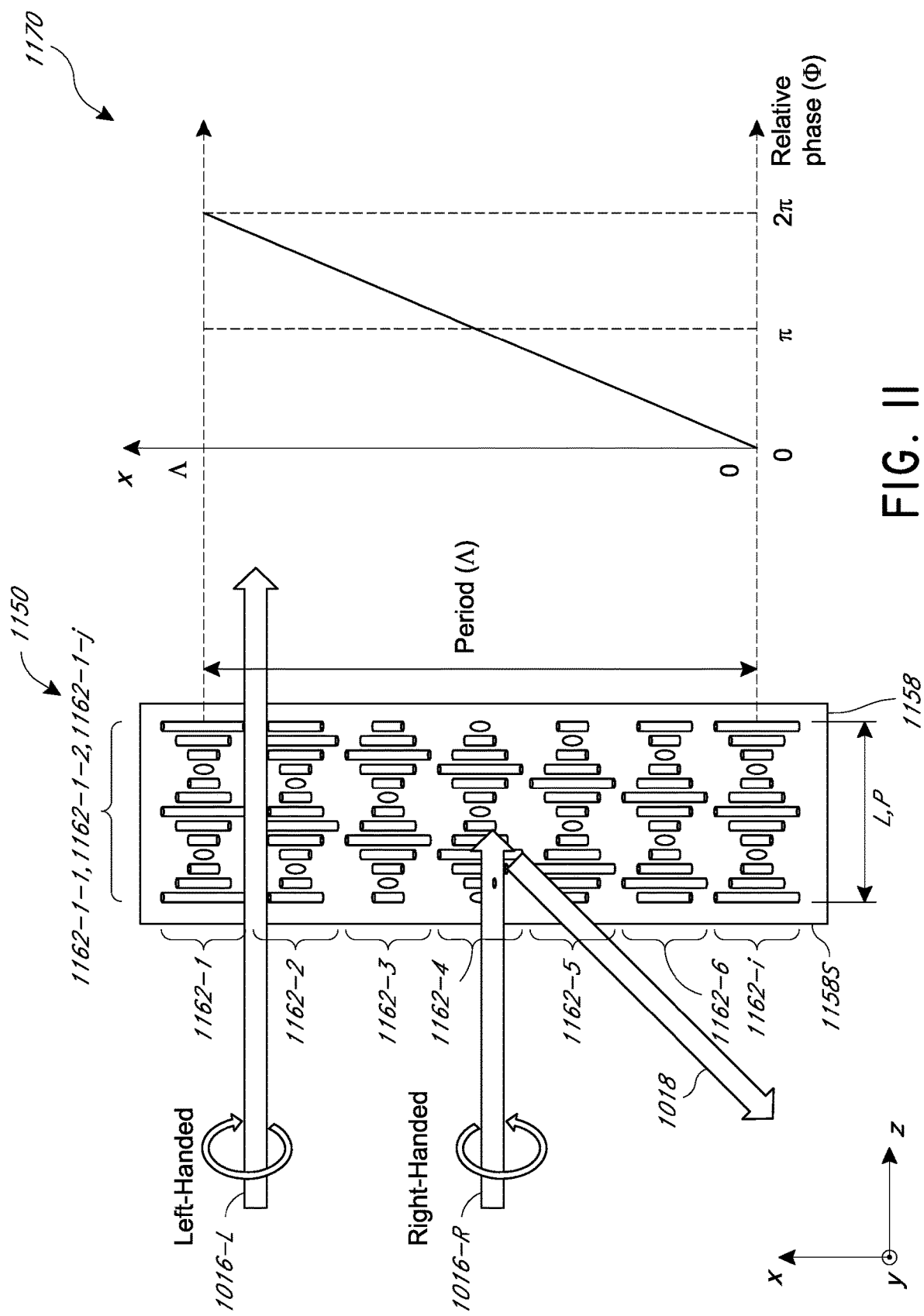
FIG. 11 illustrates a cross-sectional side view of an example of a CLCG having differently arranged chiral structures in a lateral direction.

FIG. 11 illustrates a cross-sectional side view of a CLC grating (CLCG) 1150 having differently arranged chiral structures in a lateral direction, e.g., varying twist angles in a lateral direction, according to embodiments. Similar to the CLC layer 1004 of FIG. 10, the diffraction grating 1150 comprises a cholesteric liquid crystal (CLC) layer 1158 comprising liquid crystal molecules arranged as a plurality of chiral structures 1162-1, 1162-2, . . . 1162-*i*, wherein each chiral structure comprises a plurality of liquid crystal molecules. For example, the chiral structure 1162-1 comprises a plurality of liquid crystal molecules 1162-1-1, 1162-1-2, . . . 1162-1-*j* that are arranged to extend in a layer normal direction, represented as z-direction in the illustrated embodiment. The liquid crystal molecules of each chiral structure are successively rotated in a first rotation direction in a similar manner as described with respect to FIG. 10. In addition, various other parameters of the chiral structures including the length L, the number of full rotations made by the liquid crystal molecules and the number of liquid crystal molecules per chiral structure are similar to the chiral structures described above with respect to FIG. 10.

In contrast to the illustrated embodiment of FIG. 10, however, in the illustrated embodiment of FIG. 11, the chiral structures that are adjacent in a lateral direction, e.g., x-direction, have differently arranged liquid crystal molecules. The chiral structures 1162-1, 1162-2, . . . 1162-*i* are differently configured in the x-direction such that the liquid crystal molecules of the different chiral structures at about the same depth have different rotation angles. For example, in the illustrated embodiment, the liquid crystal molecules 1162-1-1, 1162-2-1, . . . 1162-*i*-1, that are closest to the incident surface 1158S, of the chiral structures 1162-1, 1162-2, . . . 1162-*i*, respectively, are successively rotated by rotation angles φ1, φ2, . . . φi in the positive x-axis direction relative to, e.g., positive x-direction. In the illustrated embodiment, the net rotation angle of the liquid crystal molecules 1162-1-1, 1162-2-1, . . . 1162-*i*-1, that are closest to the incident surface 1158S across a lateral length A, which corresponds to a period of the diffraction grating 1150, is a rotation angle of about 180°. In addition, liquid crystal molecules of different chiral structures that are disposed at about the same depth level are rotated by about the same rotation angle relative to respective surface-most liquid crystal molecules.

Still referring to FIG. 11, the successive rotation angles $\phi_1, \phi_2, \ldots \phi_i$ of liquid crystal molecules that are at the same depth level across the period A in the x-direction can be the same according to some embodiments, or be different according to some other embodiments. In the illustrated embodiment, for the period A, when the net rotation angle is 360° as in the illustrated embodiment, adjacent liquid crystal molecules in the x-direction are rotated by about 360°/(m−1), where m is the number of liquid crystal molecules spanned by a period A in the x-direction. For example, for illustrative purposes, there are 7 liquid crystal molecules that span across the period A, such that adjacent liquid crystal molecules at the same vertical level in the x-direction are rotated with respect to each other by about 30°. Of course, chiral structures in various embodiments can have any suitable number of liquid crystal molecules.

It will be appreciated that, for illustrating purposes, the CLC layer 1158 is illustrated to have only one period A. Of course, embodiments are not so limited, and the CLC layer 1158 can have any suitable number of periods that is determined by the lateral dimension of the CLCG in the x-direction.

As illustrated by the CLCG 1150, when the chiral structures in a lateral direction, e.g., x-direction, are differently arranged, e.g., successively rotated, the successively rotated chiral structures induce shifts in the relative phases of the reflected light along the x-direction. This is illustrated with respect to graph 1170, which plots the phase change ϕ resulting from the chiral structures that are successively rotated by rotation angles ϕ$_1$, ϕ$_2$, . . . ϕ$_i$ in the x-axis direction in one period A. Without being bound to any theory, the relative phase difference (Δϕ) of reflected light 1018 can be expressed as Δϕ(x)=(2πx/Λ), where x is the position along the lateral direction and A is the period. The bandwidth can be expressed as Δλ≈Δn•p.

Referring back to FIGS. 10-11 and Eqs. [1] and [2], according to various embodiments, the Bragg-reflected wavelength can be varied by varying the helical pitch p of the chiral structures. In various embodiments, without being bound to any theory, the helical pitch p can be varied by increasing or decreasing helical twisting power (HTP), which refers to the ability of a chiral compound to induce the rotation or twist angles as described above. The HTP can in turn be varied by changing the amount of chiral compound relative to the amount of non-chiral compound. In various embodiments, by mixing a chiral compound chemically and/or mechanically with a non-chiral compound, e.g., a nematic compound, the Bragg-reflection wavelength and thus the color can be varied based on an inverse relationship between the relative fraction of the chiral compound and the helical pitch. In various embodiments disclosed herein, the ratio of the amount of chiral compound to the amount of nonchiral compound can be about 20:1, 10:1, 5:1, 4:1, 3:1, 2:1, 1:1, 1:2, 1:3, 1:4, 1:5, 1:10 or about 1:20 by weight.

In the description supra with respect to FIGS. 10 and 11, the incident light beams 1016-L, 1016-R are illustrated as being propagating in a direction parallel to the layer normal, e.g., in the z-direction. For various applications, however, e.g., as described above with respect to FIGS. 6 and 7, light propagating within the waveguide 1182, e.g., propagating by total internal reflection (TIR), impinges on the outcoupling optical elements 1282, 1284, 1286, 1288, 1290, e.g., diffraction gratings, at an off-axis angle. The diffraction gratings described herein can be configured to maximize bandwidth and diffraction efficiency for such configurations, as described below.

In the description supra with respect to FIGS. 10 and 11, the liquid crystal molecules are illustrated to not be pre-tilted. Embodiment are not so limited, however, and the liquid crystal molecules can have a pre-tilt angle 1, relative to a direction parallel to a major surface of the CLCG, e.g., relative to the x-y plane that is between about +/−60 degrees and about +/−90 degrees or between about +/−65 degrees and about +/−85 degrees, for instance about +/−75 degree; between about +/−35 degrees and about +/−65 degrees or between about +/−40 degrees and about +/−60 degrees, for instance about +/−50 degrees; between about +/−10 degrees and about +/−40 degrees or between about +/−15 degrees and about +/−35 degrees, for instance about +/−25 degrees, according to some embodiments. According to some other embodiments, the pre-tilt angle Φ can be between about ±15 degrees or between about ±10 degrees or between about ±5, e.g., 0 degrees.

CLCGs Configured for High Bandwidth Reflection at Off-Axis Incident Angle

Figure 12:
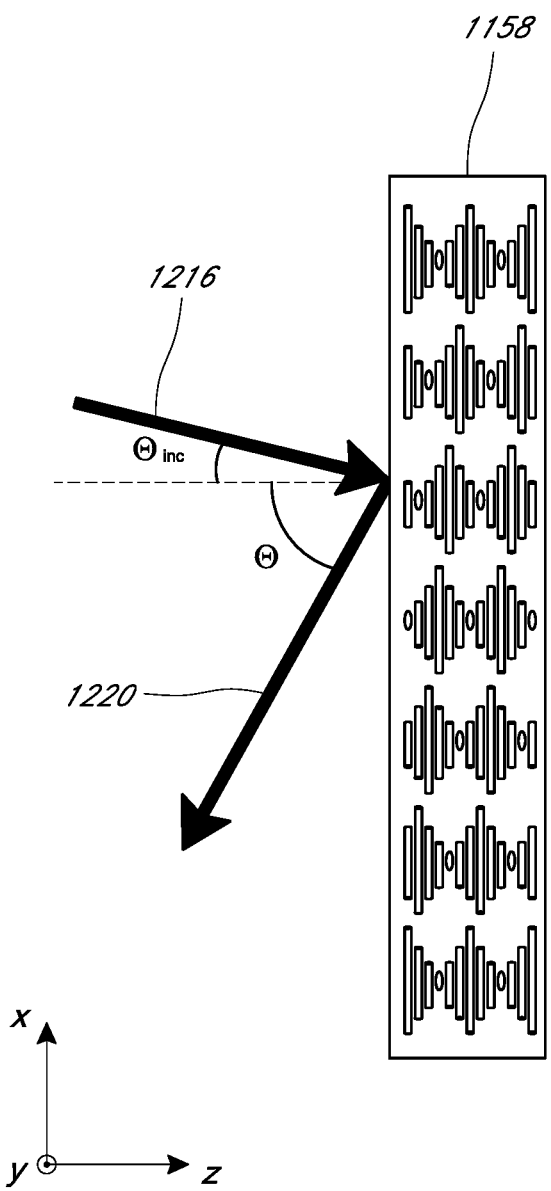
FIG. 12 illustrates a cross-sectional side view of an example of a CLC layer configured for Bragg reflection at an off-axis incident angle.

FIG. 12 illustrates a cross-sectional side view of a CLC layer 1158 configured for high bandwidth of reflection at an off-axis incident angle, according to embodiments. As described herein, an off-axis incident angle refers an angle of incidence θ$_{inc}$ of an incident beam 1216 with respect to the direction of layer normal (e.g., z-direction in FIG. 12) that has a non-zero value, resulting in a Bragg-reflected beam 1220 at a reflection angle θ. Under some circumstances, the reflection angle can be varied to a limited extent by varying a λ/Λ. Without being limited by any theory, under some circumstances, off-axis reflection can be described based on the following relationship:

$$n \cdot \sin(\theta) = \lambda/\Lambda + \sin(\theta_{inc}), \quad [3]$$

where θ$_{inc}$ is the incident angle relative to the direction of layer normal, θ is the reflection angle relative to the direction of layer normal and n is a reflective index of a medium in which the reflected beam propagates. When the CLC layer 1158 is illuminated with the incident beam 1216 at an off-axis angle, the reflection spectrum may be shifted toward shorter wavelengths. According to various embodiments disclosed herein, the ratio λ/Λ can have a value between 0.5 and 0.8, between 0.6 and 0.9, between 0.7 and 1.0, between 0.8 and 1.1, between 0.9 and 1.2, between 1.0 and 1.6, between 1.1 and 1.5, or between 1.2 and 1.4.

Without being bound to any theory, the off-axis angle at which the CLC layer 1158 is configured to Bragg-reflect with high efficiency can also depend on the helical pitch p of the chiral structures.

Figures 13A, 13B:
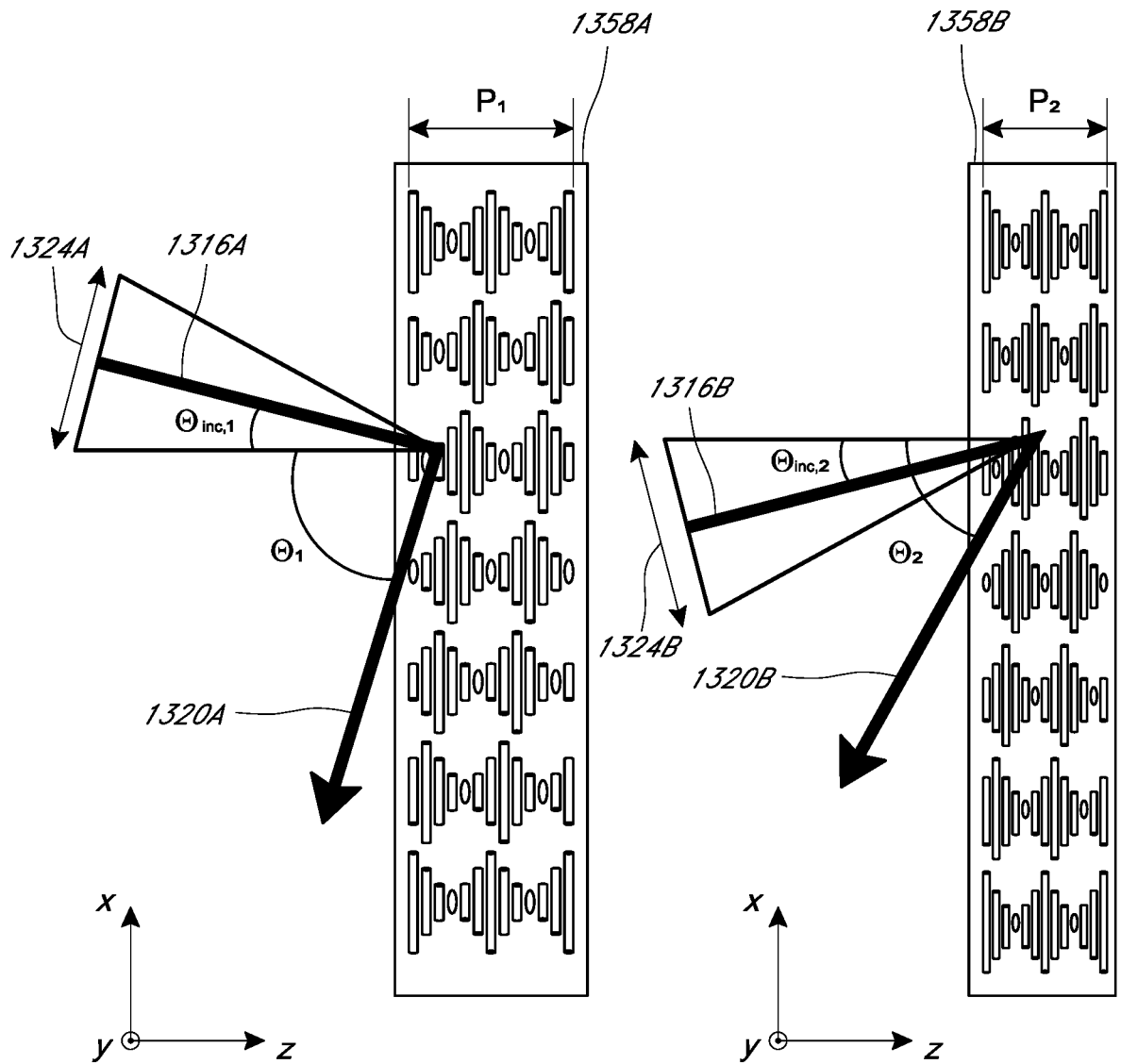
FIG. 13A illustrates a cross-sectional side view of an example of a CLC layer having a first helical pitch and configured for Bragg-reflection at a first off-axis incident angle.
FIG. 13B illustrates a cross-sectional side view of an example of a CLC layer having a second helical pitch and configured for Bragg-reflection at a second off-axis incident angle.

FIGS. 13A and 13B illustrate cross-sectional side views of CLC layers configured for reflection at off-axis incident angles, according to embodiments. Referring to FIG. 13A, a first cholesteric liquid crystal (CLC) layer 1358A comprises a first plurality of chiral structures having a first helical pitch (p$_1$). The first CLC layer 1358A has a first helical pitch p1 such that Bragg-reflection is at a maximum when a first incident light beam 1316A is directed to an incident surface of the CLC layer 1358A at a first off-axis angle θ$_{inc,1}$, which results in a first reflected light beam 1320A at a first reflection angle θ$_1$. As illustrated, the CLC layer 1358A is further configured to have a first range 1324A of off-axis incident angles in which relatively high diffraction efficiency can be obtained. The first range 1324A can correspond to a range of off-axis incident angles outside of which the intensity of the first reflected light beam 1320A falls off by more than, e.g., 1/e. For example, the first range 1324A can have values of, θ$_{inc,1}$±3°, θ$_{inc,1}$±5°, θ$_{inc,1}$±7°, θ$_{inc,1}$±10° or θ$_{inc,1}$±20°.

Referring to FIG. 13B, a second cholesteric liquid crystal (CLC) layer 1358B different from the first CLC layer 1358A comprising a second plurality of chiral structures having a second helical pitch (p$_2$) different from the first helical pitch p$_1$ of the first CLC layer 1358A of FIG. 13A.

As illustrated, the second CLC layer 1358B is configured such that when a second incident light beam 1316B is directed to an incident surface of the CLC layer 1358B at a second off-axis angle $\theta_{inc,2}$ different from the first off-axis angle $\theta_{inc,1}$, a second reflected light beam 1320B having a second reflection angle $\theta_2$ different from the first reflection angle $\theta_1$ is generated As illustrated, the CLC layer 1358B is further configured to have a second range 1324B of off-axis angles, similar to the first range 1324A described above with respect to FIG. 13A.

Figure 13C:
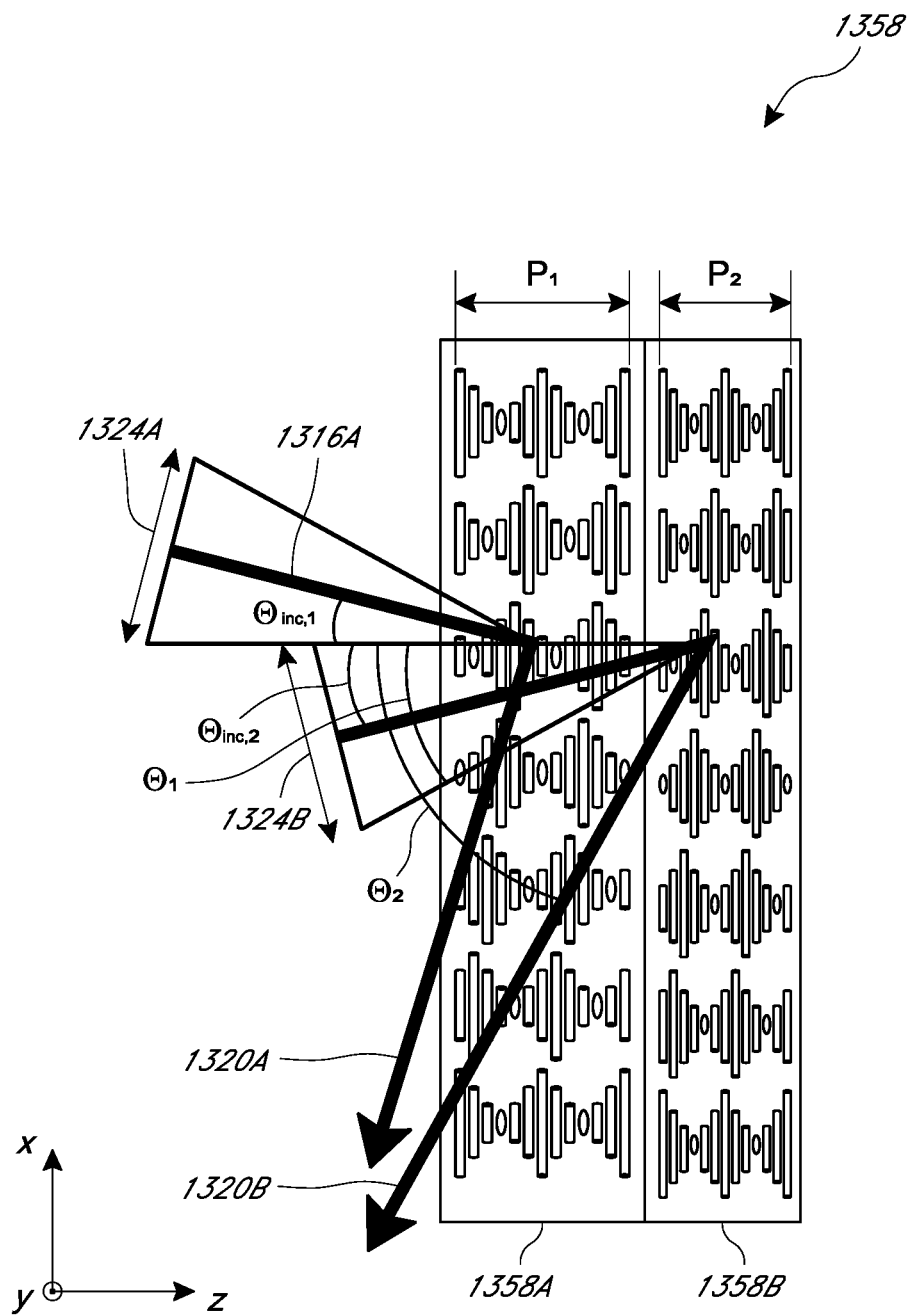
FIG. 13C illustrates a cross-sectional side view of an example of a CLCG including CLC layers of FIGS. 13A and 13B having different helical pitches in a stacked configuration for Bragg-reflection at a plurality of off-axis incident angles and high diffraction bandwidth.

FIG. 13C illustrates a cross-sectional side view of a CLCG 1358 including a plurality of CLC layers having different helical pitches in a stacked configuration for Bragg-reflection at a plurality of off-axis incident angles and high diffraction bandwidth, according to embodiments. The CLCG 1358 includes CLC layers 1358A, 1358B described above with respect to FIGS. 13A and 13B, respectively, that are formed over one another, e.g., in a stacked configuration and/or in contact with each other, according to embodiments. Various parameters of the plurality of CLC layers 1358A, 1358B including the different helical pitches can be improved or optimized such that the CLCG 1358 is configured for efficient reflection at a plurality of off-axis incident angles and for high diffraction efficiency over a wider range of off-axis angles than can be obtained using only one CLC. For example, in the illustrated embodiments, $p_1$ and $p_2$ can be selected such that the resulting first and second ranges 1324A and 1324B at least partially overlap to provide high diffraction efficiency over a contiguous range of wavelength that includes the first and second ranges 1324A and 1324B. However, in other embodiments, $p_1$ and $p_2$ can be selected such that the first and second ranges 1324A and 1324B do not overlap.

In operation, the first and second CLC layers 1358A, 1358B are formed over one another such that when first and second incident light beams 1316A, 1316B at first and second off-axis angles $\theta_{inc1}$, $\theta_{inc2}$, are directed to an incident surface of the first CLC layer 1358A, the first incident light beam 1316A is substantially reflected by the first CLC layer 1358A at a first reflection angle $\theta_1$, while the second incident light beam 1358B substantially transmits through the first CLC layer 1358A towards an incident surface of the second CLC layer 1358B, and substantially reflected by the second CLC layer 1358B at the second reflection angle $\theta_2$. It will be appreciated that, while not shown for clarity, the concepts described above can be extended to any suitable number of CLC layers.

As described herein and throughout the specification, a light beam that "substantially transmits" through a layer may refer to the light having at least 20%, 30%, 50%, 70% or 90%, of an incident light intensity remaining as the light exits the layer. Similarly, a light beam that is "substantially reflected" by a layer may refer to the light having at least 20, 30, 50%, 70% or 90%, of an incident light intensity remaining in the reflected light.

Still referring to FIG. 13C, in various embodiments, the liquid crystal molecules of the first and second CLC layers 1358A, 1358B can include the same chiral compound at different amounts, such that CLC layers 1358A, 1358B have different helical twisting power (HTP), as described supra. For example, the second CLC layer 1358B may have a higher relative amount of the same chiral compound compared to the first CLC layer 1358A. In some embodiments, the pitch p may be inversely proportional to the fraction of the chiral compound relative to the total liquid crystal compound which includes chiral and nonchiral compounds. However, embodiments are not so limited, and the first and second CLC layers 1358A, 1358B can have different chiral compounds.

In addition, in various embodiments, the liquid crystal molecules of the first and second CLC layers 1358A, 1358B can include the same or different chiral compounds, such that the CLC layers 1358A, 1358B have different ratios $\lambda/\Lambda_1$ and $\lambda/\Lambda_2$, respectively, such that the CLC layers 1358A, 1358B can be configured for high diffraction efficiencies at different incident angles $\theta_{inc1}$, $\theta_{inc2}$, e.g., according to Eq. [3].

Still referring to FIG. 13C, first and second CLC layers 1358A, 1358B can be fabricated directly on the top of each other, according to some embodiments. For example, the first CLC layer 1358A can be deposited on an alignment layer that provides alignment conditions for the first CLC layer 1358A and subsequently, the second CLC layer 1358B can be deposited on the first CLC layer 1358B. Under these fabrication conditions, the surface of the first CLC layer 1358A can provide alignment conditions for the second CLC layer 1358B. In some other embodiments, each of the CLC layers 1358A, 1358B can be fabricated with separate alignment layers. For example, the first CLC layer 1358A can be formed on a first alignment layer and, a second alignment layer can be formed on the first CLC layer 1358A, and the second CLC layer 1358B on the second alignment layer. An isolation layer, e.g., a thin oxide layer, may be formed on the first CLC layer 1358A, according to some embodiments, prior to forming the second alignment layer and/or the second CLC layer 1358B. In yet other embodiments, the two CLC layers 1358A, 1358B can be fabricated individually on different substrates and subsequently stacked. In various embodiments, an intermediate layer can be formed between the two CLC layers 1358A, 1358B, e.g., to enhance adhesion.

The concepts described above with respect to CLCGs having a plurality of CLC layers optimized for optimum diffraction efficiency at different off-axis angles can be extended to other alternative embodiments. In particular, in some embodiments, instead of forming a plurality of layers, a single CLC layer can be configured to have different regions that are optimized for optimum diffraction efficiency at different off-axis angles.

Figure 14:
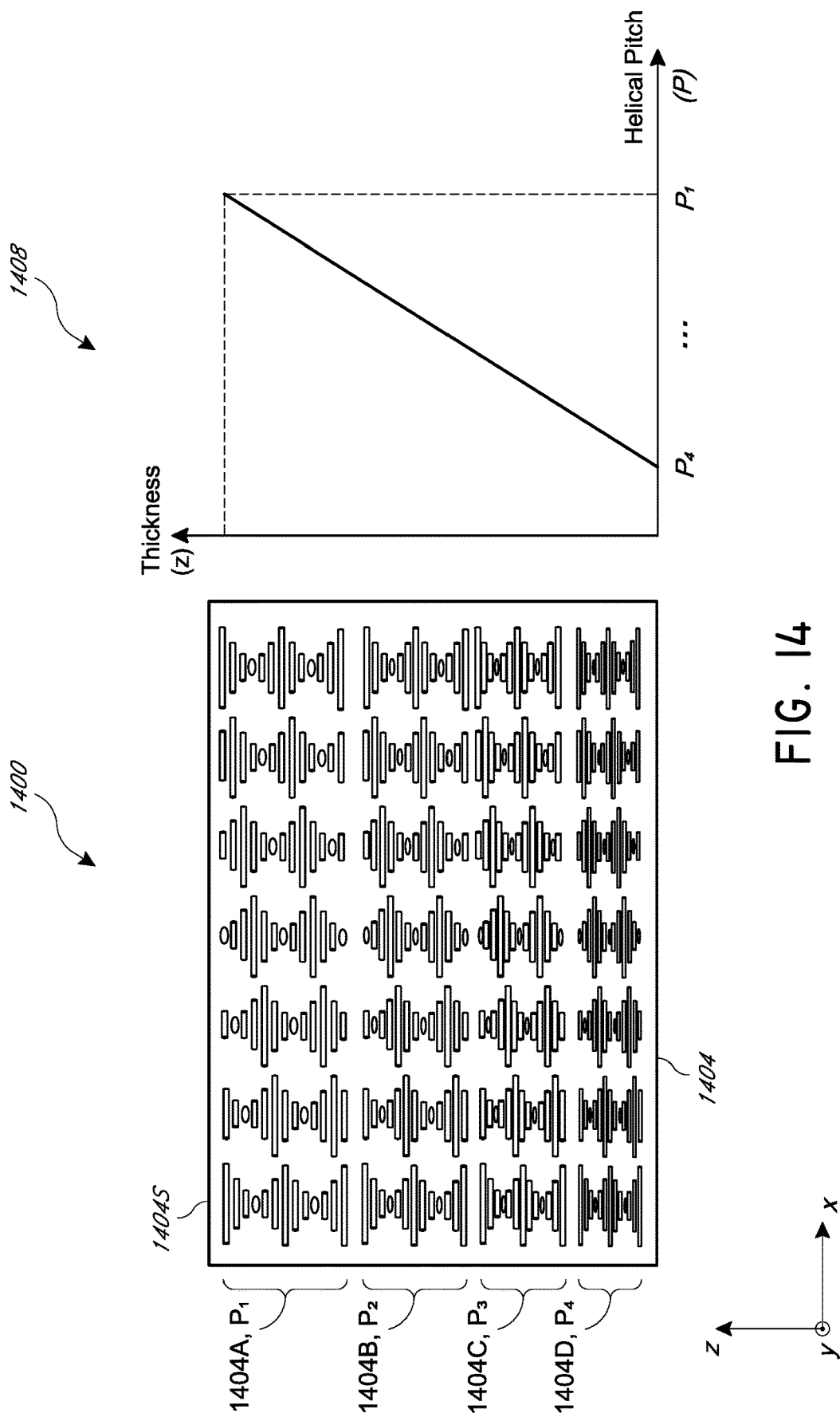
FIG. 14 illustrates a cross-sectional side view of an example of a CLCG including a CLC layer having vertical regions with different helical pitches along a depth direction for Bragg-reflection at a plurality of off-axis incident angles and high diffraction bandwidth.

FIG. 14 illustrates a cross-sectional side view of a CLCG 1400 including a single CLC layer 1404 having vertical regions with different helical pitches along a depth direction for Bragg-reflection at a plurality of off-axis incident angles at different vertical regions with high diffraction bandwidth, according to embodiments. The CLC layer 1404 has a plurality of vertical regions having different parameters, e.g., different helical pitches, that are optimized such that high diffraction efficiency can be obtained over a wider range of off-axis angles than can be obtained using only one CLC layer having a uniform pitch in the depth direction. In the illustrated embodiment, the single CLC layer 1404 includes a plurality of vertical regions 1404A, 1404B, 1404C and 1404D, which can have different helical pitches $p_1$, $p_2$, $p_3$ and $p_4$, respectively. Similar to as described above with respect to FIG. 13C, the helical pitches $p_1$, $p_2$, $p_3$ and $p_4$ can be selected such that the plurality of vertical regions 1404A, 1404B, 1404C and 1404D are configured for optimum diffraction efficiency at incident angles $\theta_{incA}$, $\theta_{incB}$, $\theta_{incC}$ and $\theta_{incD}$, respectively, which results in reflected light beams at different vertical depths at corresponding reflection angles $\theta_A$, $\theta_B$, $\theta_C$, and $\theta_D$, respectively. Furthermore, as described above with respect to FIG. 13C, the CLC layer 1404 is further configured to have respective ranges of off-axis angles in which relatively high diffraction efficiency can be obtained. Of course, while four vertical regions are illustrated for clarity, any suitable number of regions can be included in the CLC layer 1404. In addition, different variations described above with respect to the CLCG 1358 of FIG. 13C having a plurality of CLC layers can be applicable to the CLCG 1400.

In the illustrated embodiment of FIG. 14, the values of the helical pitches p1, p2, p3 and p4 decrease with increasing depth from an incident surface 1404S, such that a decreasing gradient in helical pitch is created in the depth direction (negative z-direction). When the rate of decrease of the helical pitch as a function of layer depth in the z-direction is uniform across the thickness of the CLC layer 1404, a graph 1408 representing a linear relationship between the depth and the helical pitch can be obtained. However, embodiments are not so limited. For example, the helical pitches $p_1$, $p_2$, $p_3$ and $p_4$ can increase or decrease at any depth and can change at different rates as a function of layer depth, according to some other embodiments.

The CLC layer 1404 having a gradient in helical pitch can be fabricated, by varying, e.g., increasing or decreasing, the helical twisting power (HTP) of the liquid crystal molecules at different depths of the CLC layer. The HTP can in turn be spatially varied by changing the relative amount of chiral compound. In various embodiments, by mixing a chiral compound chemically and/or mechanically with a non-chiral compound, e.g., a nematic compound, at different vertical depths, the helical pitches of the vertical regions 1404A, 1404B, 1404C and 1404D can be configured for optimum diffraction efficiency at different incident angles $\theta_{incA}$, $\theta_{incB}$, $\theta_{incC}$ and $\theta_{incD}$, respectively, based on an inverse relationship between the relative fraction of the chiral compound and the helical pitch. For example, a mixture of different chemical components (e.g., chiral di-acrylate monomers and nematic/non-chiral mono-acrylate monomers) that undergo polymerization process at different reaction rates under UV irradiation can be used. Additionally or alternatively, the HTP can be spatially varied by changing irradiation conditions, including exposure intensity and/or exposure time, of UV irradiation at different depths of the CLC layer. The HTP can also be spatially varied by varying the pre-/post-processing of UV polymerization process including thermal treatments before, after and/or during UV irradiation. For example, when a UV absorbing dye is added to a mixture, an intensity gradient of the UV light at different depth of the CLC layer can be created. For example, due to the UV intensity gradient, the polymerization near the surface may proceed at a faster rate compared to the bottom region of the CLC layer. For example, when the cholesteric component is a di-acrylate, the probability of being incorporated into the resulting polymer can be much higher, e.g., twice as high, as the probability of nematic mono-acrylate being incorporated in the polymer. Under some circumstances, if the overall polymerization rate is controlled such that a depletion of the chiral diacrylate near surface region of the CLC layer generates a di-acrylate concentration gradient in the depth direction of the CLC layer. This in turn starts diffusion of the di-acrylate towards the surface region of the CLC layer. The result after complete photo-polymerization can be that the surface region of the CLC layer contains more chiral material and thus has a shorter helical pitch compared to the bottom region of the CLC layer, which contains a relatively higher amount of non-chiral compound. Under some other circumstances, thermal treatment before/after or during UV irradiation can be added in the polymerization process to control the helical pitch gradient. Thus, by controlling the ratio between two different liquid crystal monomers and/or the dose of UV irradiation at different depths with or without thermal treatment, a helical pitch gradient can be achieved along the depth direction of the CLC layer.

For some applications, it may be desirable to have certain optical characteristics of a diffraction grating, such as off-angle diffraction efficiency, refractive index, wavelength selectivity, polarization selectivity and phase selectivity, among other parameters, to vary along a lateral direction orthogonal to the layer normal direction. The lateral variation be desired, for example, when the grating is stacked with a waveguide, e.g., as illustrated above with respect to FIGS. 6 and 7, such that the light propagates in the lateral direction. Under such configuration, however, the intensity of light may attenuate as it propagates within the waveguide (e.g., 1182 in FIG. 7). Such configurations may also be desirable, for example, to intentionally skew the light intensity across the grating (e.g., 1282 in FIG. 7) to adapt to spatial and/or angular variation of sensing efficiencies associated with the human eye to maximize the user experience. Thus, there is a need for optical elements, e.g., diffraction gratings, having spatially varying optical characteristics.

Figure 15:
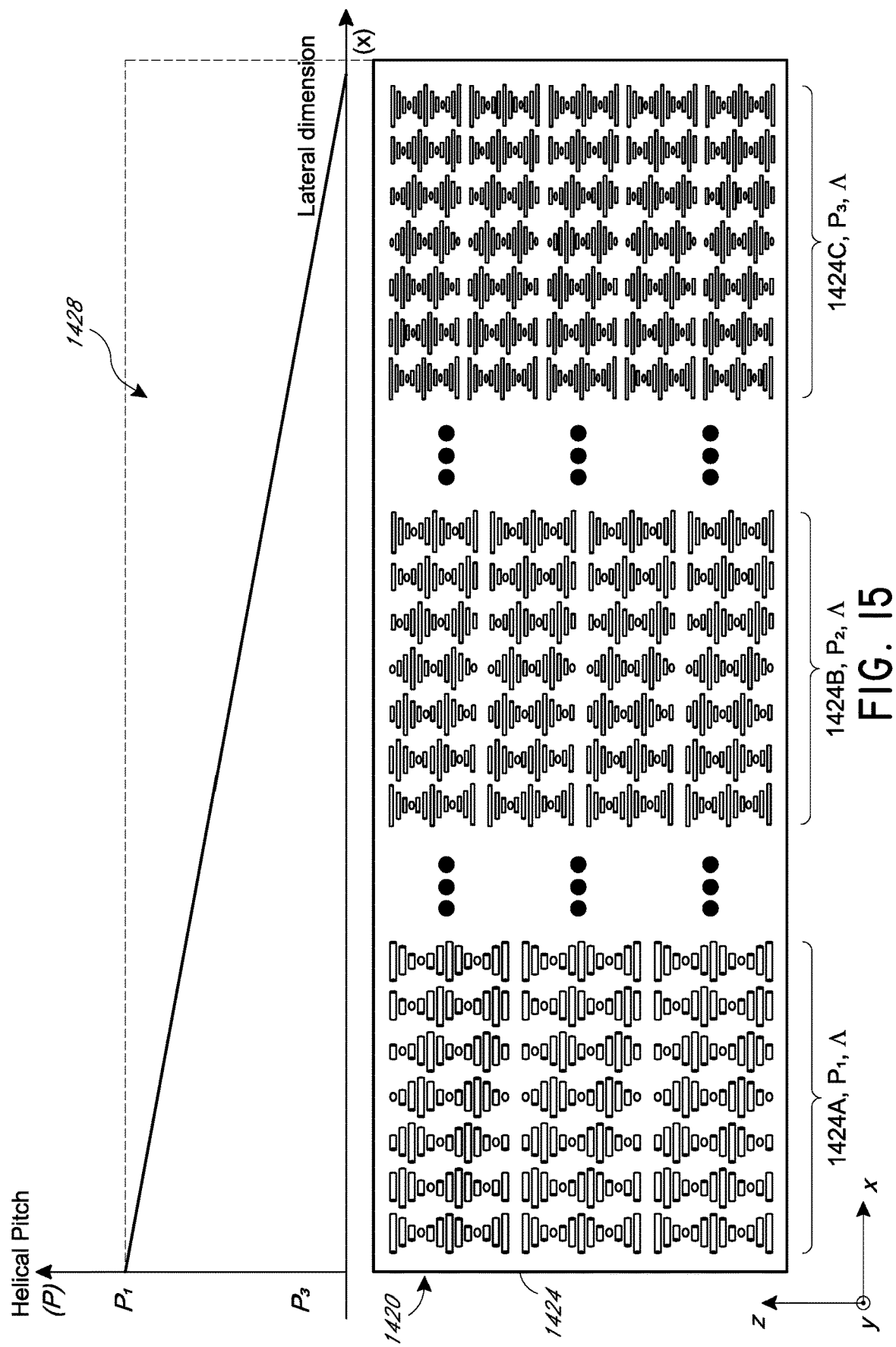
FIG. 15 illustrates a cross-sectional side view of an example of a CLCG including a CLC layer having lateral regions with different helical pitches along a lateral direction for spatially varying Bragg-reflection.

FIG. 15 illustrates a cross-sectional side view of a CLCG including a CLC layer having lateral regions with different helical pitches along a lateral direction for spatially varying Bragg-reflection, according to embodiments. The CLC layer 1424 has a plurality of lateral regions having different liquid crystal material parameters, e.g., helical pitches, such that laterally varying properties, e.g., laterally varying off-axis incident angles for Bragg reflection, can be obtained. In the illustrated embodiment, the CLC layer 1424 includes a plurality of lateral regions 1424A, 1424B and 1424C each having a period A and having respective helical pitches $p_1$, $p_2$ and $p_3$. The helical pitches $p_1$, $p_2$ and $p_3$ can be selected such that the plurality of vertical regions 1424A, 1424B and 1404C are configured for optimum diffraction efficiency at different off-axis incident angles $\theta_{incA}$, $\theta_{incB}$ and $\theta_{incC}$ respectively, which results in reflected light beams at corresponding reflection angles $\theta_A$, $\theta_B$, and $\theta_C$, respectively. Furthermore, as described above with respect to FIG. 13C, different lateral regions of the CLC layer 1424 are further configured to have similar respective ranges of off-axis angles in which relatively high diffraction efficiency can be obtained. Of course, while three vertical regions are illustrated for clarity, any suitable number of regions can be included in the CLC layer 1424.

In the illustrated embodiment of FIG. 15, the magnitudes of helical pitches $p_1$, $p_2$ and $p_3$ can change monotonically in a lateral direction, such that a gradient in helical pitch is created. When the rate of change of the helical pitch in the x-direction is uniform across a width or a length of the CLC layer 1424, a linear relationship between the length or width and the helical pitch can be obtained, as illustrated in graph 1428 representing a. However, embodiments are not so limited. For example, the helical pitches $p_1$, $p_2$ and $p_3$ can increase or decrease at any lateral position and can change at different rates in the x-direction along the length or width, according to various other embodiments.

According to various embodiments, CLC layers can be fabricated to have laterally varying diffraction characteristics by, e.g., spatially varying alignment characteristics or other material properties of the liquid crystal molecules. For example, in a similar manner as described supra with respect to FIG. 14, e.g., by controlling the ratio between two different liquid crystal monomers and/or the dose of UV irradiation in different lateral regions, a lateral helical pitch gradient can be achieved along a lateral dimension.

Waveguides Coupled with CLCG for Wavelength-Selective Light Coupling

Figure 16:
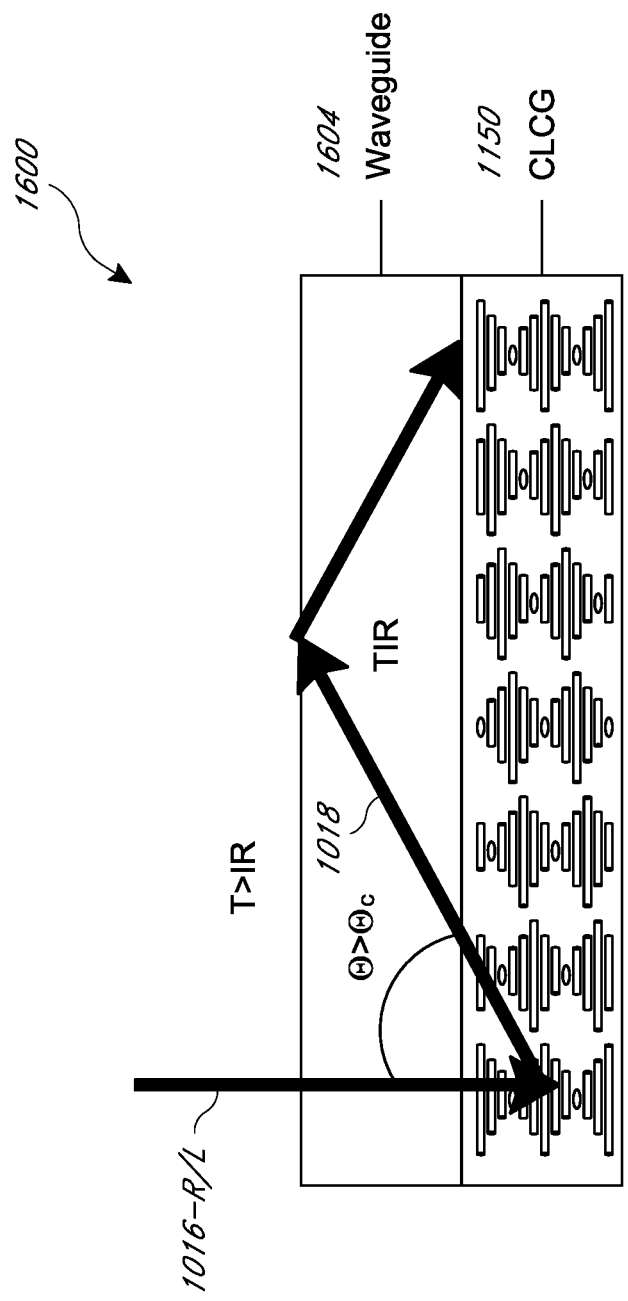
FIG. 16 illustrates an example of an optical wave-guiding device comprising a waveguide coupled to a CLCG and configured to propagate light by total internal reflection (TIR).

As described supra, for various applications including incoupling and outcoupling of light, a wave guide device can be configured to propagate light by total internal reflection (TIR). FIG. 16 illustrates an example of an optical wave-guiding device 1600 comprising a waveguide 1604 coupled to a CLCG 1150. The CLCG 1150 comprises liquid crystal molecules arranged as a plurality of chiral structures in a similar manner to chiral structures 1162-1, 1162-2, . . . 1162-$i$ described supra with respect to FIG. 11. The waveguide 1604 is disposed over the CLCG 1150 and optically coupled to the CLCG 1150. When elliptically/circularly polarized incident light 1016-R/L has a polarization handedness which matches the direction of rotation of the liquid crystal molecules of the chiral structures, the incident light 1016-R/L is Bragg-reflected by the CLCG 1150 and coupled into the waveguide 1604 at an angle such that the coupled light travels in a lateral direction (e.g., x-direction), by total internal reflection (TIR). Without being bound to any theory, the TIR condition can be satisfied when the diffraction angle θ is greater than the critical angle, $θ_C$, of the waveguide. Under some circumstances, the TIR condition can be expressed as:

$$\sin(θ_C)=1/n_t \quad [4]$$

where $n_t$ is the refractive index of the waveguide 1604. According to various embodiments, $n_t$ may be between about 1 and about 2 between about 1.4 and about 1.8 or between about 1.5 and about 1.7. For example, the waveguide may comprise a polymer such as polycarbonate or a glass.

Figure 17A:
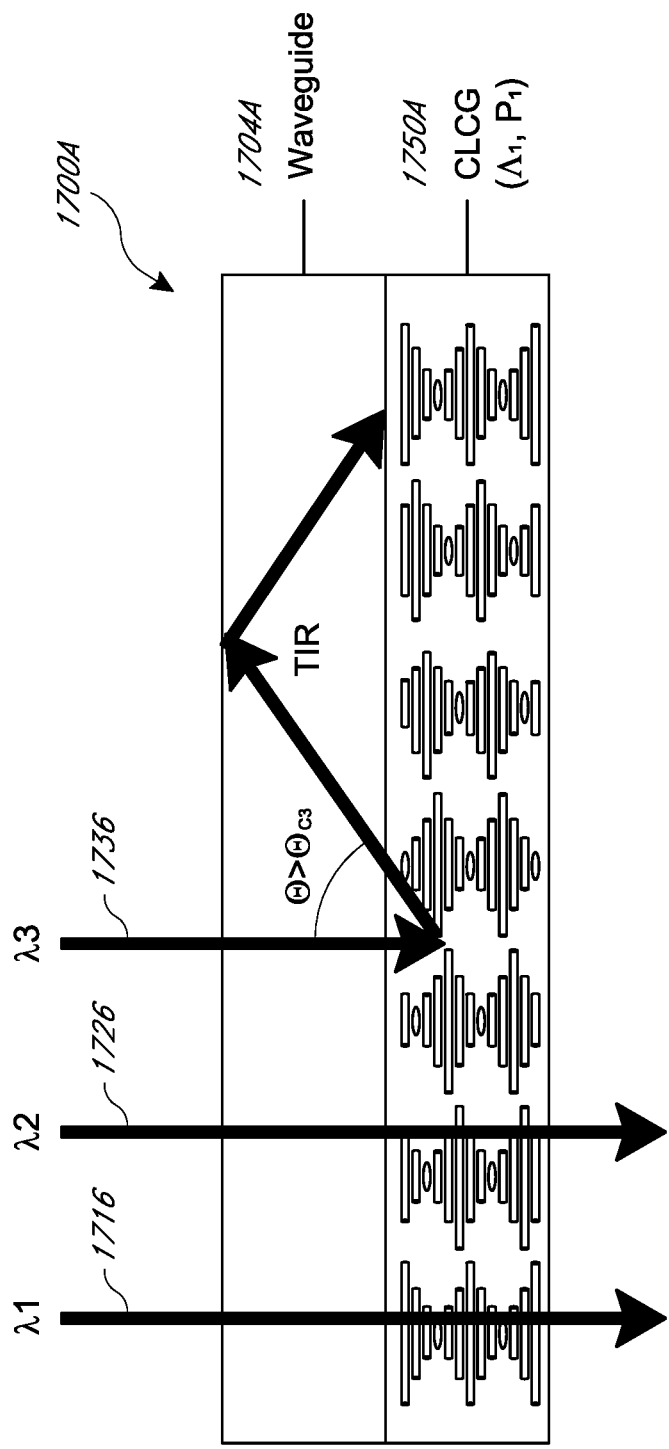
FIG. 17A illustrates an example of an optical wave-guiding device comprising a waveguide coupled to a CLCG and configured to selectively propagate light having a wavelength by total internal reflection (TIR).

FIG. 17A illustrates a first optical wave-guiding device 1700A comprising a first waveguide 1704A coupled to a first CLCG 1750A and configured to propagate light having a third wavelength $λ_3$ by total internal reflection (TIR) when $θ>θ_{c3}$. The first CLCG 1750A has a first period $Λ_1$ and a first helical pitch $p_1$. According to some embodiments, the first wave-guiding device 1700A may be configured for propagating light by TIR in the visible spectrum (e.g., with wavelengths between about 400 nm and 700 nm). According to some other embodiments, the first wave-guiding device 1700A may be configured for propagating light by TIR in the infrared spectrum (e.g., in the near-infrared portion of the spectrum with wavelengths between about 700 nm and 1400 nm). As described above with respect to FIGS. 10 and 11, Bragg-reflection occurs at a wavelength expressed by Eq. [1] supra and within a bandwidth of wavelength λΛ expressed by Eq. [2] supra. For example, the first CLCG 1750A may be designed for coupling by TIR third incident light 1736 having a third wavelength $λ_3$ in one of blue color (e.g., about 450 nm), green color (e.g., about 550 nm), red color (e.g., about 650 nm) or in the infrared. As illustrated, when λΛ is about 60 nm, about 80 nm or about 100 nm, as described supra, first and second light 1716 and 1726 having first and second wavelengths $λ_1$, $λ_2$ are substantially transmitted because Eq. [1] is not satisfied for these colors, which are not coupled into the first waveguide 1704 because Eq. [4] is not satisfied.

Figure 17B:
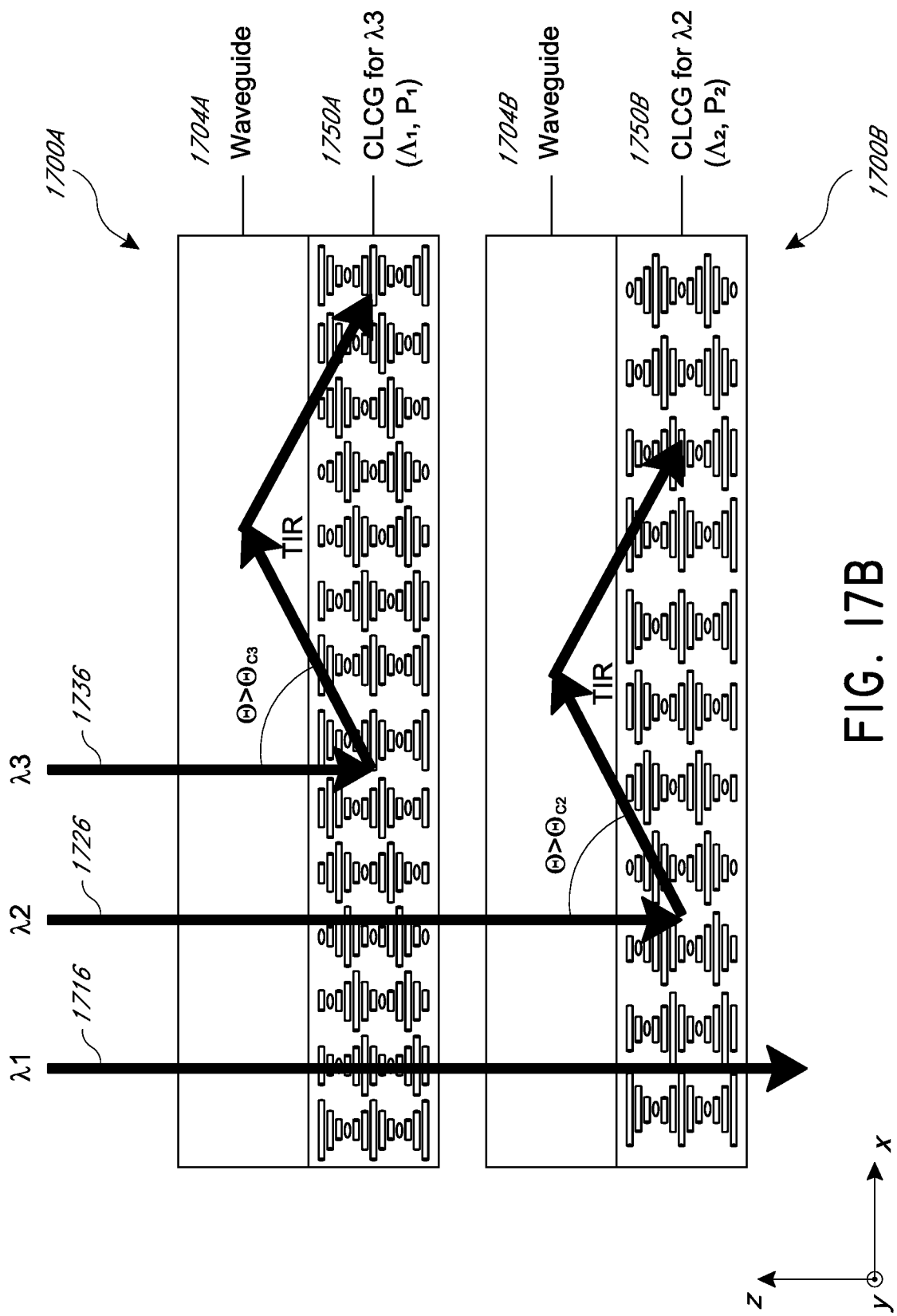
FIG. 17B illustrates an example of a plurality of optical wave-guiding devices in the same optical path, each comprising a waveguide coupled to a CLCG and configured to selectively propagate light having a wavelength by total internal reflection (TIR).

FIG. 17B illustrates a second optical wave-guiding device 1700B combined with the first optical wave-guiding device 1700A illustrated above with respect to FIG. 17A. The optical wave-guiding device 1700B is disposed in the optical path subsequent to the optical wave-guiding device 1700A, and comprises a second waveguide 1704B coupled to a second CLCG 1750B and configured to propagate second light 1726 having a second wavelength $λ_2$ by total internal reflection (TIR) when $θ>θ_{c2}$. The second CLCG 1750B has a second period $Λ_2$ and a second helical pitch $p_2$. As described above with respect to FIG. 17A, first and second light 1716 and 1726 having first and second wavelengths of $λ_1$, $λ_2$ are substantially transmitted through the first optical wave-guiding device 1700A. Of the transmitted first and second light 1716 and 1726, the second CLCG 1750B may be designed for coupling by TIR the second incident light 1726 having the second wavelength $λ_2$ in transmitted one of blue color (e.g., about 450 nm), green color (e.g., about 550 nm), red color (e.g., about 650 nm) or infrared, when $θ>θ_{c2}$. Thus, as illustrated, when Δλ is about 60 nm, about 80 nm or about 100 nm, as described supra, first light 1716 having the first wavelength $λ_1$ is substantially transmitted further through the second wave-guiding device 1700B.

Figure 17C:
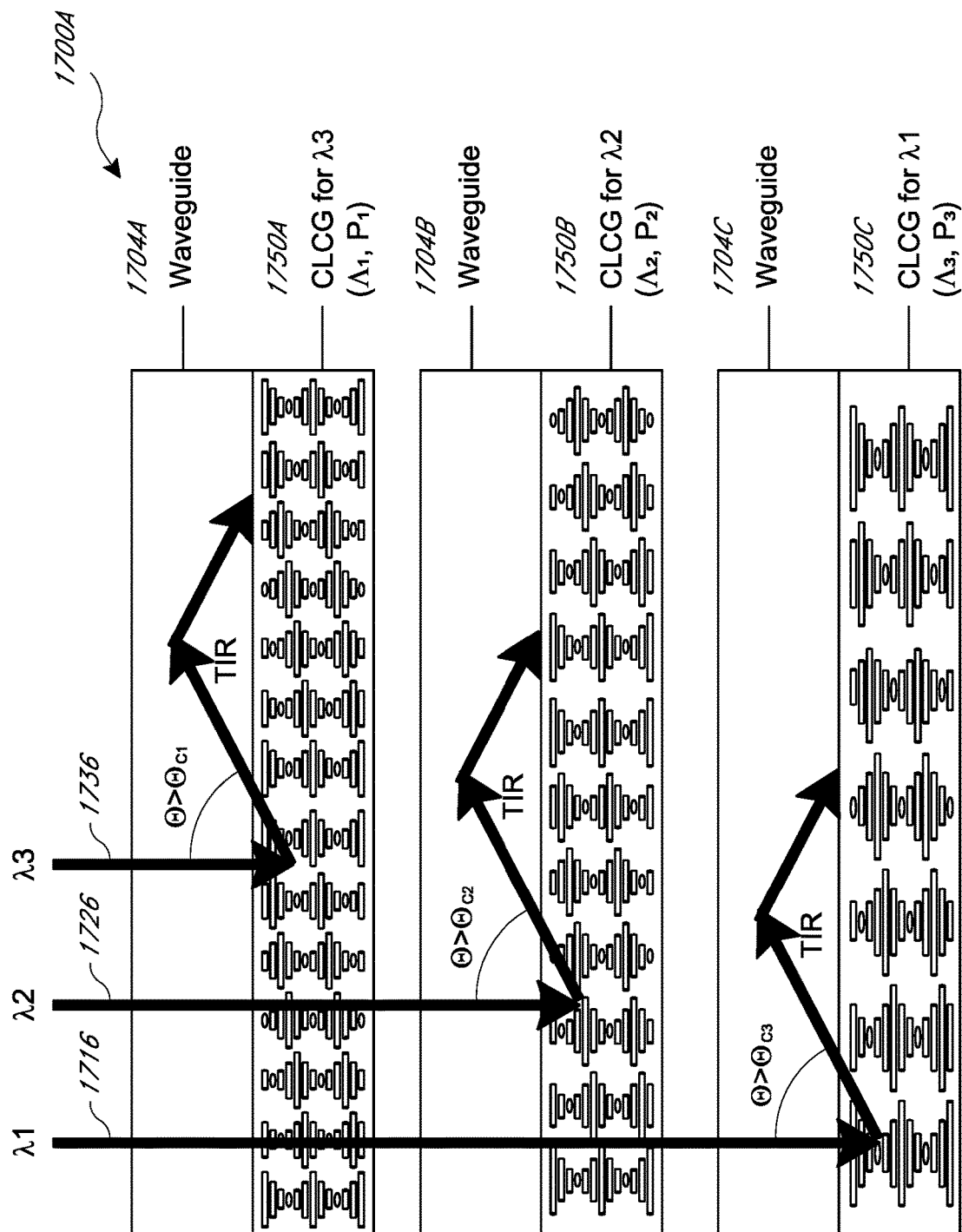
FIG. 17C illustrates an example of a plurality of optical wave-guiding devices in the same optical path, each comprising a waveguide coupled to a CLCG and configured to selectively propagate light having a wavelength by total internal reflection (TIR).

FIG. 17C illustrates a third optical wave-guiding device 1700C combined the first and second optical wave-guiding devices 1700A and 1700B illustrated above with respect to FIG. 17B. The third optical wave-guiding device 1700C is disposed in the optical path subsequent to the first and second optical wave-guiding devices 1700A and 1700B, and comprises a third waveguide 1704C coupled to a third CLCG 1750C and configured to propagate first light 1716 having a first wavelength $λ_2$ by total internal reflection (TIR) when $θ>θ_{c1}$. The third CLCG 1750C has a third period $Λ_3$ and a third helical pitch $p_3$. As described above with respect to FIG. 17B, first light 1716 having first wavelength $λ_1$ is substantially is transmitted through the first and second wave-guiding devices 1700A and 1700B. The third CLCG 1750C may be designed for coupling by TIR the first incident light 1716 having the first wavelength $λ_1$ in transmitted one of blue color (e.g., about 450 nm), green color (e.g., about 550 nm), red color (e.g., about 650 nm) or infrared when $θ>θ_{c1}$. Thus, as illustrated, when λΛ is about 60 nm, about 80 nm or about 100 nm, as described supra, first light 1716 having the first wavelength $λ_1$ is substantially coupled into the third waveguide 1704C because Eq. [4] is satisfied.

Thus, as described above with respect to FIGS. 17A-17C, by placing one or more of the first, second and third optical wave-guiding devices 1700A, 1700B and 1700C in the same optical path, one or more of first, second and third light 1716, 1726 and 1736 having different wavelengths $λ_1$, $λ_2$ and $λ_3$ can be coupled to propagate by TIR in one of first, second and third waveguides 1704A, 1704B and 1704C, respectively. While in each of FIGS. 17A-17C, each of the first to third optical wave-guiding devices 1704A, 1704B and 1704C has a dedicated first to third waveguides 1704A, 1704B and 1704C, respectively, and a dedicated first to third CLCGs 1750A, 1750B and 1750C, embodiments are not so limited. For example, a single waveguide can couple by TIR Bragg-reflected light from a stack of a plurality of CLCGs, as illustrated infra with respect to FIG. 18. In addition, any suitable number of optical wave-guiding devices greater than three (or less than three) can also be combined for further selective coupling by Bragg-reflection.

Figure 18:
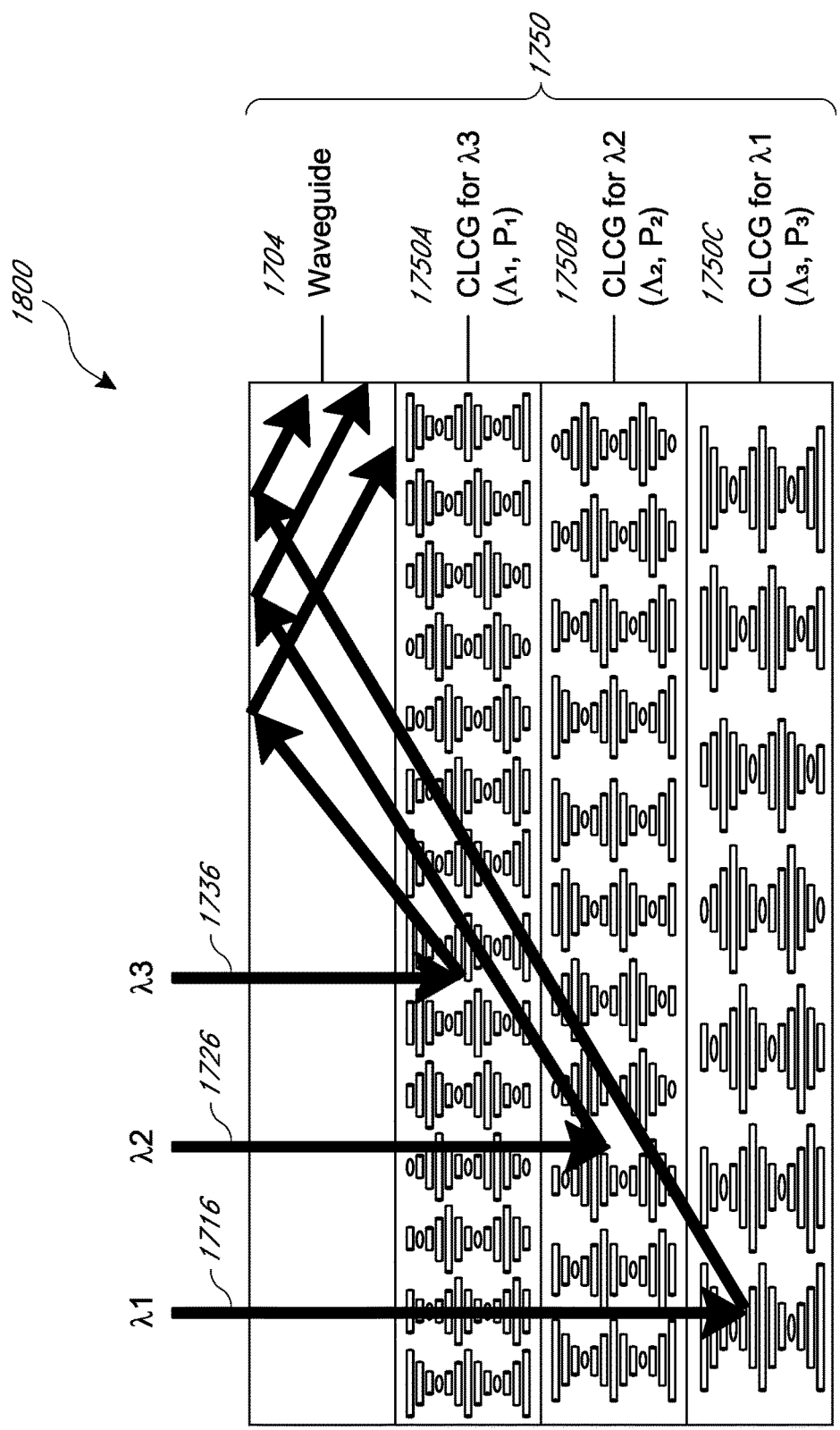
FIG. 18 illustrates an example of an optical wave-guiding device comprising a common waveguide coupled to a plurality of CLCGs and configured to selectively propagate light having a plurality of wavelengths by total internal reflection (TIR).

FIG. 18 illustrates an optical wave-guiding device 1800 comprising a common waveguide 1704 coupled to a plurality of CLCGs 1750. The plurality of CLCGs 1750 is configured as a stack comprising the first to third CLCGs 1750A-1750C and configured to propagate third, second and first light 1736, 1726 and 1716 having third, second and first wavelengths $λ_3$, $λ_2$ and $λ_1$, respectively, by total internal reflection (TIR). The TIR occurs when one or more of third, second and first lights 1736, 1726 and 1716, respectively, satisfies the condition θ>θ$_{c3}$ θ>θ$_{c2}$ and θ>θ$_{c1}$, respectively, in a similar manner as described above with respect to FIGS. 17A-17C. Also in a similar manner, first, second and third CLCGs 1750A, 1750B and 1750C are configured to selectively Bragg-reflect third, second and first light 1736, 1726 and 1716, respectively, when θ>θ$_{c3}$ θ>θ$_{c2}$ and θ>θ$_{c1}$. Of course, any suitable number CLCGs less than or greater than three (or less than three) can be stacked for further selective coupling by Bragg-reflection. Thus, compared to the embodiments described above with respect to FIGS. 17B and 17C, a more compact wave-guiding device 1800 can be obtained by employing a common waveguide 1704. Also, instead of three distinct CLCG layers (as shown in FIG. 18), the stack of CLCG layers could be arranged as a single (or multiple) layers having a helical pitch gradient comprising the range from p$_1$ to p$_3$.

As described above with respect to FIGS. 17A-18, first to third CLCGs 1750, 1750B, 1750C have first to third periods Λ$_1$, Λ$_2$ and Λ$_3$, respectively and first to third helical pitches p$_1$, p$_2$ and p$_3$, respectively. In various embodiments, each of the CLCGs can be configured such that the wavelength/period ratio λ/Λ is between about 0.3 and 2.3, between about 0.8 and 1.8 or between about 1.1 and about 1.5, for instance about 1.3. Alternatively, the period (Λ) can be configured to be between about 1 nm and 250 nm smaller, between about 50 nm and 200 nm smaller or between about 80 nm and 170 nm smaller, than the respective wavelength (λ) that the CLCGs are configured for Bragg reflection. For example, when λ$_1$, λ$_2$ and λ$_3$ are within the visible range, e.g., about 620 nm to about 780 nm, for instance about 650 nm (red), about 492 nm to about 577 nm, for instance 550 nm (green), and about 435 nm to about 493 nm, for instance about 450 nm (blue), respectively, the corresponding periods Λ$_1$, Λ$_2$ and Λ$_3$ can be about 450 nm to about 550 nm, for instance about 500 nm, about 373 nm to about 473 nm, for instance about 423 nm, and about 296 nm to about 396 nm, for instance about 346 nm, respectively. Alternatively, when λ$_1$, λ$_2$ and λ$_3$ are in the infrared range, e.g., in the near infrared range between about 750 nm to about 1400 nm, for instance about 850 nm, the corresponding periods Λ$_1$, Λ$_2$ and Λ$_3$ can be about 975 nm to about 1820 nm, for instance about 1105 nm. In addition, various embodiments, each of the CLCGs can be configured such that the wavelength/helical pitch ratio λ/p is between about 0.6 and 2.6, between about 1.1 and 2.1 or between about 1.4 and about 1.8, for instance about 1.6. Alternatively, the helical pitch (p) can be configured to be between about 50 nm and 350 nm smaller, between about 100 nm and 300 nm smaller or between about 140 nm and 280 nm smaller, than the respective wavelength (λ) that the CLCGs are configured for Bragg reflection. For example, when λ$_1$, λ$_2$ and λ$_3$ are about 620 nm to about 780 nm, for instance about 650 nm (red), about 492 nm to about 577 nm, for instance 550 nm (green), and about 435 nm to about 493 nm, for instance about 450 nm (blue), respectively, the corresponding helical pitches p$_1$, p$_2$ and p$_3$ can be about 350 nm to about 450 nm, for instance about 400 nm, about 290 nm to about 390 nm, for instance about 340 nm and about 230 nm to about 330 nm, for instance about 280 nm, respectively. Alternatively, when λ$_1$, λ$_2$ and λ$_3$ are in the infrared range, e.g., in the near infrared range between about 750 nm to about 1400 nm, for instance about 850 nm, the corresponding periods Λ$_1$, Λ$_2$ and Λ$_3$ can be about 1200 nm to about 2240 nm, for instance about 1360 nm.

Figure 19:
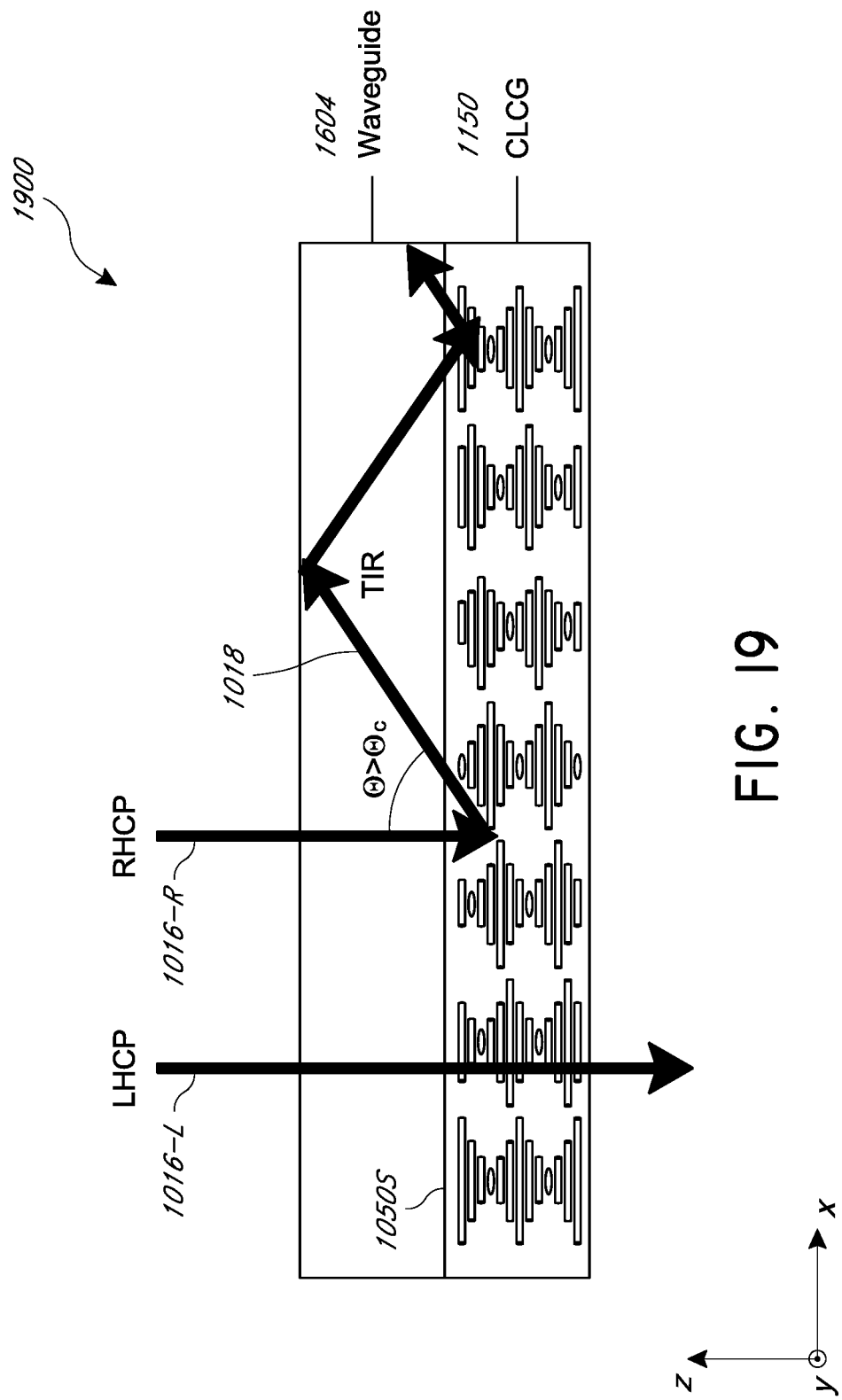
FIG. 19 illustrates an example of an optical wave-guiding device comprising a waveguide coupled to a CLCG and configured to propagate light by total internal reflection (TIR).

Waveguides Coupled with CLCG and a Mirror for Wavelength-Selective Light Coupling FIG. 19 illustrates an optical wave-guiding device 1900 comprising a waveguide 1604 coupled to a CLCG 1150, similar to the optical wave-guiding device described supra with respect to FIG. 16. As described supra with respect to FIGS. 10 and 11, in operation, when the handedness of polarization of the elliptical/circularly polarized incident light has the same direction of rotation as the liquid crystal molecules of the chiral structures of the CLCG 1150, the CLCG 1150 substantially reflects the incident light. As illustrated, incident on the surface 1050S are light beams 1016-L having a left-handed circular polarization and light beams 1016-R having a right-handed circular polarization. In the illustrated embodiment, the liquid crystal molecules of the chiral structures are successively rotated in a clockwise direction when viewing the direction in which incident light beams 1016-L, 1016-R travel, i.e., the negative z-direction, such that the rotation direction of the liquid crystal molecules match the handedness of the light teams 1016-R having a right-handed circular polarization. As a result, the light beams 1016-R having a right-handed circular polarization are substantially reflected by the CLCG 1150, whereas the light beams 1016-L having a left-handed circular polarization are substantially transmitted through the CLCG 1150.

For some applications, it may be desirable to flip the polarization handedness of an elliptical or circular polarized light prior to coupling into a wave-guiding device similar to that described above with respect to FIG. 19. Such may the case, e.g., when the polarization handedness of the incident elliptical or circular polarized light does not match the rotation direction of the chiral structures in the CLCG such that the CLCG is not configured to be Bragg-reflect the light for coupling into the waveguide, as discussed supra. For some other applications, it may be desirable to recycle light that is transmitted through the CLCG due to a lack of match between the polarization handedness of the incident elliptical or circular polarized light and the rotation direction of the chiral structures in the CLCG. To address these and other needs, in the following, various embodiments of wave-guiding devices employing a polarization converting reflector to address these needs are disclosed.

Figure 20:
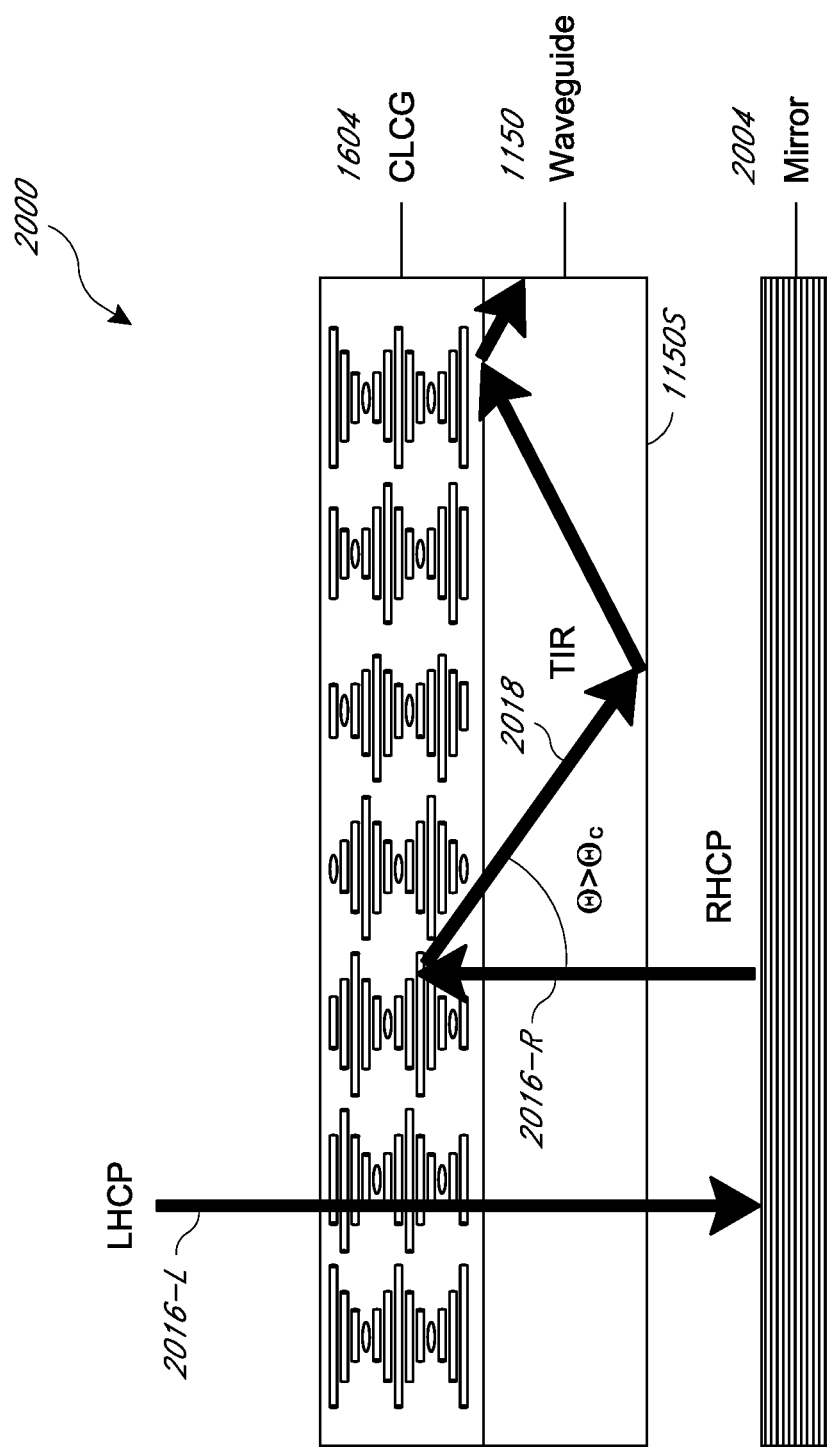
FIG. 20 illustrates an example of an optical wave-guiding device comprising a waveguide coupled to a CLCG and a polarization converting reflector, where the CLCG is configured to receive incident light and the waveguide is configured to propagate light Bragg-reflected from the CLCG by total internal reflection (TIR).

FIG. 20 illustrates an optical wave-guiding device 2000 comprising a waveguide 1150 coupled to a CLCG 1604 and a polarization converting reflector 2004, where the CLCG 1604 is configured to receive incident light and the waveguide 1150 is configured to propagate light Bragg-reflected from the CLCG by total internal reflection (TIR), according to embodiments. The polarization converting reflector 2004 is configured such that, upon reflection therefrom, the polarization handedness of an incident elliptically or circularly polarized light is flipped to an opposite polarization handedness (e.g., left-handed to right-handed, or right-handed to left-handed). The wave-guiding device 2000 is similar to the wave-guiding device 1900 described above with respect to FIG. 19 except, instead of being configured to first receive an incident light beam through the waveguide 1150, the wave-guiding device 2000 is configured to first receive an incident light beam 2016-L having, e.g., a left-handed circular polarization, through the CLCG 1604. The incident light beam 2016-L has a polarization handedness that does not match the rotation direction of the chiral structures in the CLCG 1604 when viewed in the propagation direction (negative z-direction) of the incident light beam 2016-L, such that it is not Bragg-reflected by the CLCG 1604. As a result, the incident light beam 2016-L is substantially transmitted through the CLCG 1604 and subsequently reflected by the polarization converting reflector 2004. The reflected light beam 2016-R having, e.g., a right-handed circular polarization, thereby becomes an incident light beam on the surface 1150S of the waveguide 1150. Because of the flipped polarization handedness, the reflected light beam 2016-R now incident on surface 1150S of the waveguide 1150 has a polarization handedness that matches the rotation direction of the chiral structures in the CLCG 1604 when viewed in the propagation direction of reflected light beam 2016-R (positive z-direction), such that it is Bragg-reflected by the CLCG 1604. The reflected light beam 2016-R that is reflected as further reflected beam 2018 reflected at an angle $\theta > \theta_c$ relative to the layer normal direction (z-axis) couples to and travels through the waveguide 1150 in a lateral direction (e.g., x-direction).

Figure 21A:
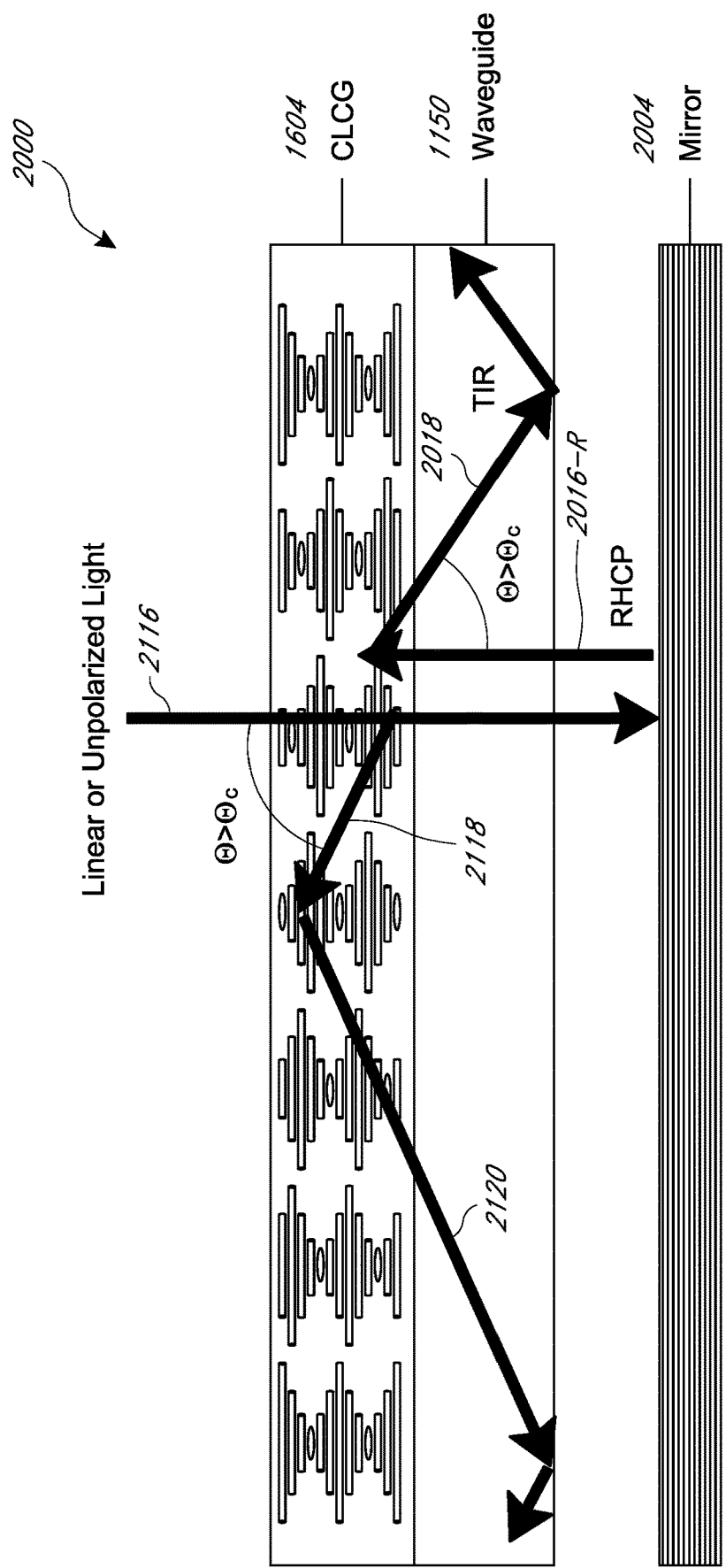
FIG. 21A illustrates the optical wave-guiding device of FIG. 20, where the CLCG is configured to receive incident light that is linearly polarized or unpolarized, and where the waveguide is configured to propagate light Bragg-reflected from the CLCG and light reflected by the reflector by total internal reflection (TIR).

FIG. 21A illustrates the optical wave-guiding device 2000 described above with respect to FIG. 20 under a condition in which the incident light beam 2116 is linearly polarized or unpolarized, each of which can be treated as comprising both left-handed and right-handed circular polarization components. Under such conditions, the incident light beam 2116 can be coupled into a waveguide by TIR in opposing lateral directions. For example, similar to as described above with respect to FIG. 20, the component of the incident light beam 2116 that has a polarization handedness, e.g., left-handedness, that does not match the rotation direction of the chiral structures in the CLCG 1604 is substantially transmitted through the CLCG 1604 and subsequently reflected by the polarization converting reflector 2004, to be flipped in polarization handedness, e.g., flipped to right-handedness, and coupled into and travels through the waveguide 1150 in a first lateral direction (e.g., positive x-direction). On the other hand, similar to as described above with respect to FIG. 19, the component of the incident light beam 2116 that has a polarization handedness, e.g., right-handedness, that matches the rotation direction of the chiral structures in the CLCG 1604, is substantially directly reflected by the CLCG 1604 and subsequently coupled into and travels through the waveguide 1150 in a second lateral direction opposite the first lateral direction (e.g., negative x-direction).

Figure 21B:
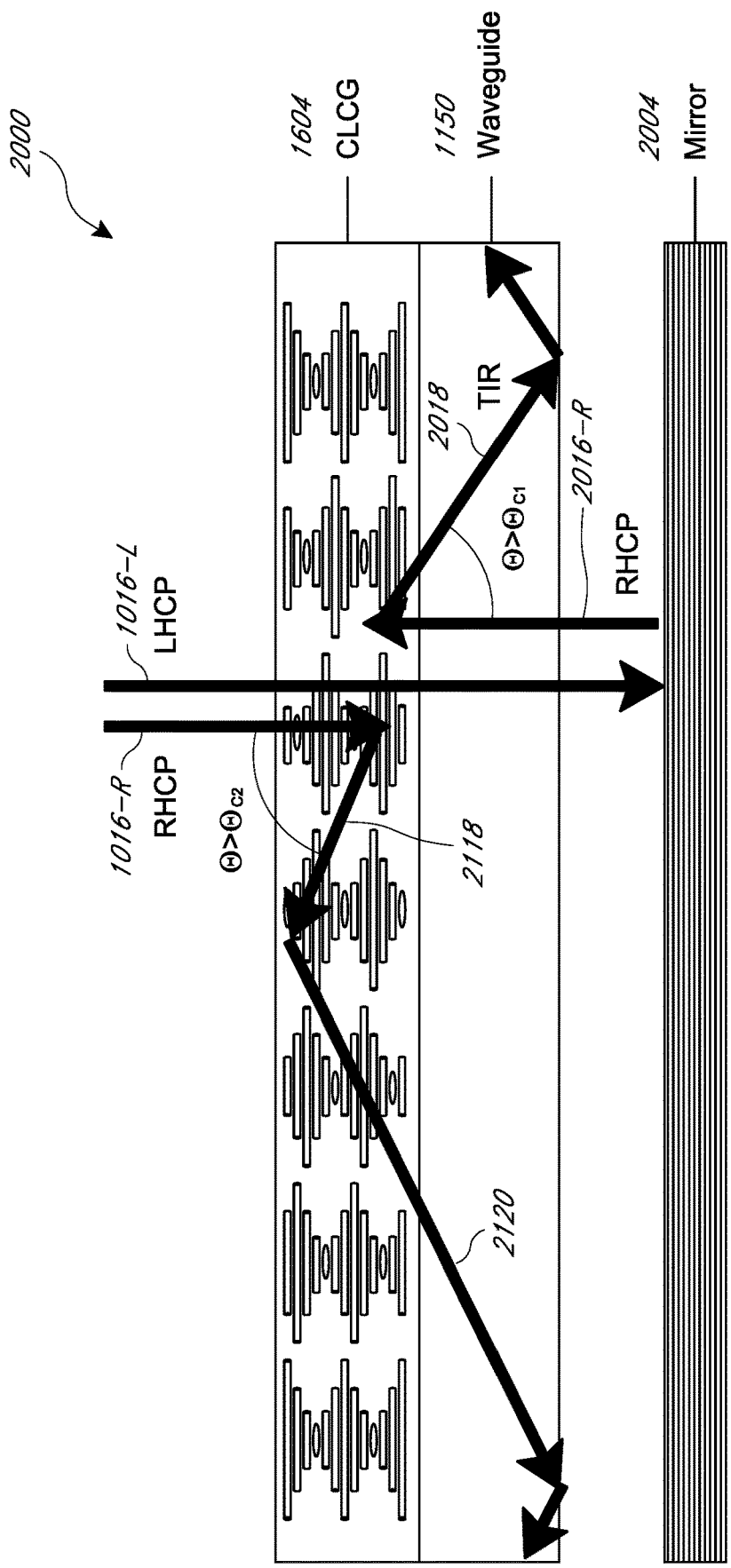
FIG. 21B illustrates the optical wave-guiding device of FIG. 20, where the CLCG configured to receive incident light that is polarized into orthogonal elliptical or circular polarized light beams, and where the waveguide is configured to propagate light Bragg-reflected from the CLCG and light reflected by the reflector by total internal reflection (TIR).

FIG. 21B illustrates the optical wave-guiding device 2000 described above with respect to FIG. 21A under a condition in which the incident light is polarized into two orthogonal elliptical or circular polarized light beams, e.g., light beams 1016-L having left-handed circular polarization and light beams 1016-R having right-handed circular polarization. Under such conditions, the incident light beams 1016-L, 1016-R can be coupled into a waveguide by TIR to propagate in opposing lateral directions, in a similar manner as described with respect to FIG. 21A, supra. For example, the light beams 1016-L that has a polarization handedness, e.g., left-handedness, that does not match the rotation direction of the chiral structures in the CLCG 1604 is substantially transmitted through the CLCG 1604 and subsequently reflected by the polarization converting reflector 2004, to be flipped in polarization handedness, e.g., flipped to right-handedness, and coupled into and travels through the waveguide 1150 in a first lateral direction (e.g., positive x-direction). On the other hand, the incident light beam 1016-R that has a polarization handedness, e.g., right-handedness, that matches the rotation direction of the chiral structures in the CLCG 1604, is substantially directly reflected by the CLCG 1604 and subsequently coupled into and travels through the waveguide 1150 in a second lateral direction opposite the first lateral direction (e.g., negative x-direction).

Figure 22A:
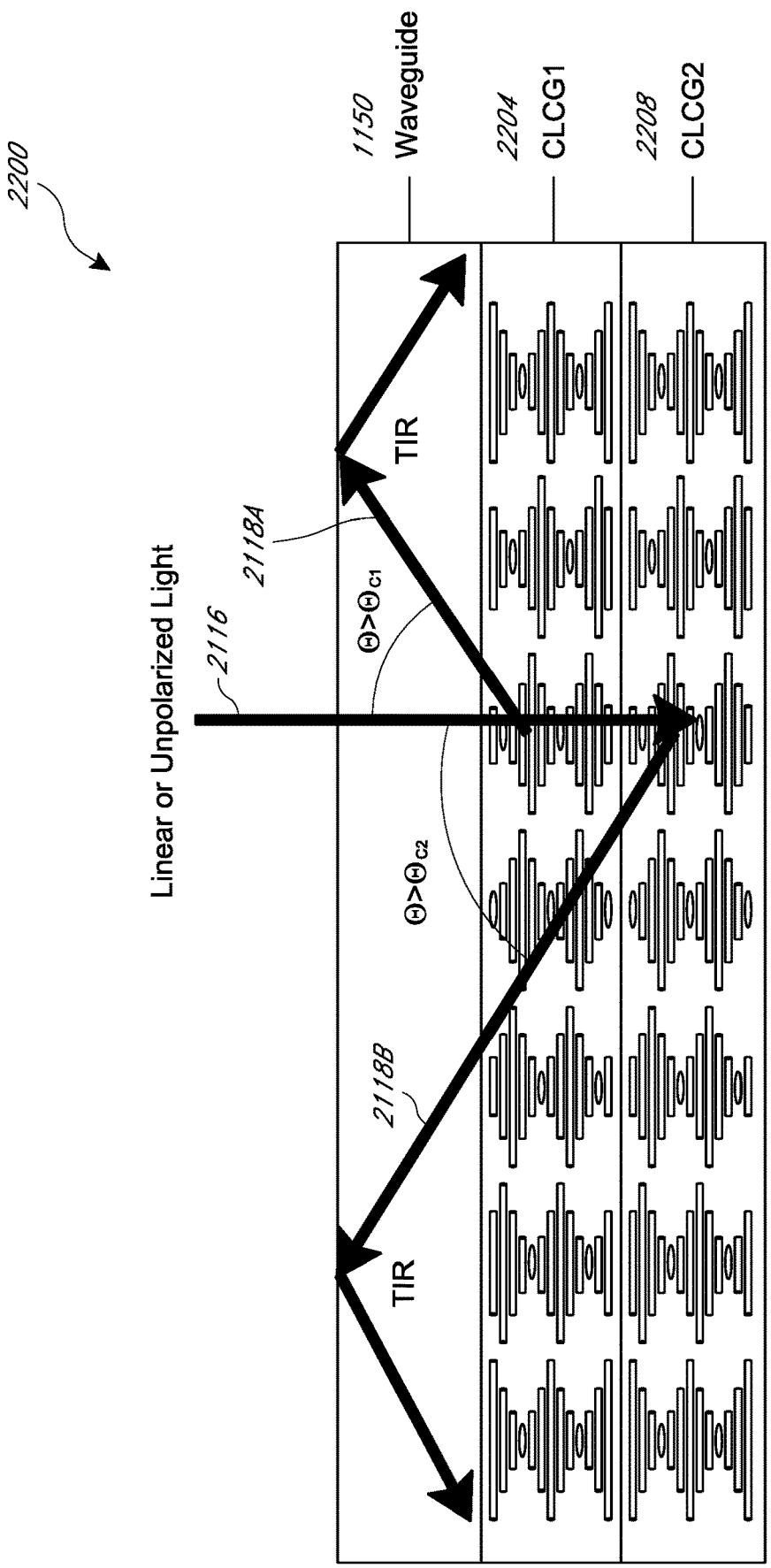
FIG. 22A illustrates an example of an optical wave-guiding device comprising a plurality of CLC layers coupled to a common waveguide, including a first CLC layer having chiral structures having a first rotation direction and a second CLC layer having chiral structures having a second rotation direction opposite to the first rotation direction, under a condition in which the incident light beam is linearly polarized or unpolarized.

FIG. 22A illustrates an optical wave-guiding device 2200 comprising a common waveguide 2204 coupled to a plurality of CLCGs that are, e.g., arranged as a stack, including a first CLCG 2204 having chiral structures having a first rotation direction and a second CLCG 2208 having chiral structures having a second rotation direction opposite to the first rotation direction, according to embodiments. As described supra with respect to various embodiments, in operation, when the direction of polarization direction of an incident light beam is matched to the direction of rotation of the liquid crystal molecules of chiral structures of a CLCG, the incident light is reflected. The illustrated optical wave-guiding device 2200 is under a condition in which the incident light beam 2116 is linearly polarized or unpolarized. Under such conditions, the incident light beam 2116 can be coupled into a waveguide by TIR in both of opposing lateral directions (positive and negative x directions). In the illustrated embodiment, when viewing in the direction in which incident light 2116 travels, i.e., the negative z-direction, the liquid crystal molecules of the chiral structures of the first CLCG 2204 are successively rotated in a clockwise direction, while the liquid crystal molecules of the chiral structures of the second CLCG 2204 are successively rotated in the opposite counterclockwise direction.

Still referring to FIG. 22A, the component of the elliptical or circular incident light beam 2116 that has a first polarization handedness, e.g., right-handed polarized component, that matches the rotation direction of the chiral structures of the first CLCG 2204, e.g., clockwise direction, is substantially reflected by the first CLCG 2204, thereby resulting in a first reflected beam 2118A at an angle $\theta > \theta_{c1}$ relative to the layer normal direction (z-axis), and couples to and travels through the common waveguide 2204 in a first lateral direction (e.g., positive x-direction).

Still referring to FIG. 22A, on the other hand, the component of the elliptical or circular incident light beam 2116 that has a second polarization handedness, e.g., left-handed polarized component, that does not match the rotation direction of the chiral structures of the first CLCG 2204, is substantially transmitted through the first CLCG 2204. After being transmitted through the first CLCG 2204, the elliptical or circular incident light beam 2116 that has the second polarization handedness 2116 that does match the rotation direction of the chiral structures of the second CLCG 2208, e.g., counter-clockwise direction, is substantially reflected by the second CLCG 2208, thereby resulting in a second reflected beam 2118B at an angle $\theta > \theta_{c2}$ relative to the layer normal direction (z-axis), and couples to and travels through the common waveguide 2204 in a second lateral direction (e.g., negative x-direction).

Figure 22B:
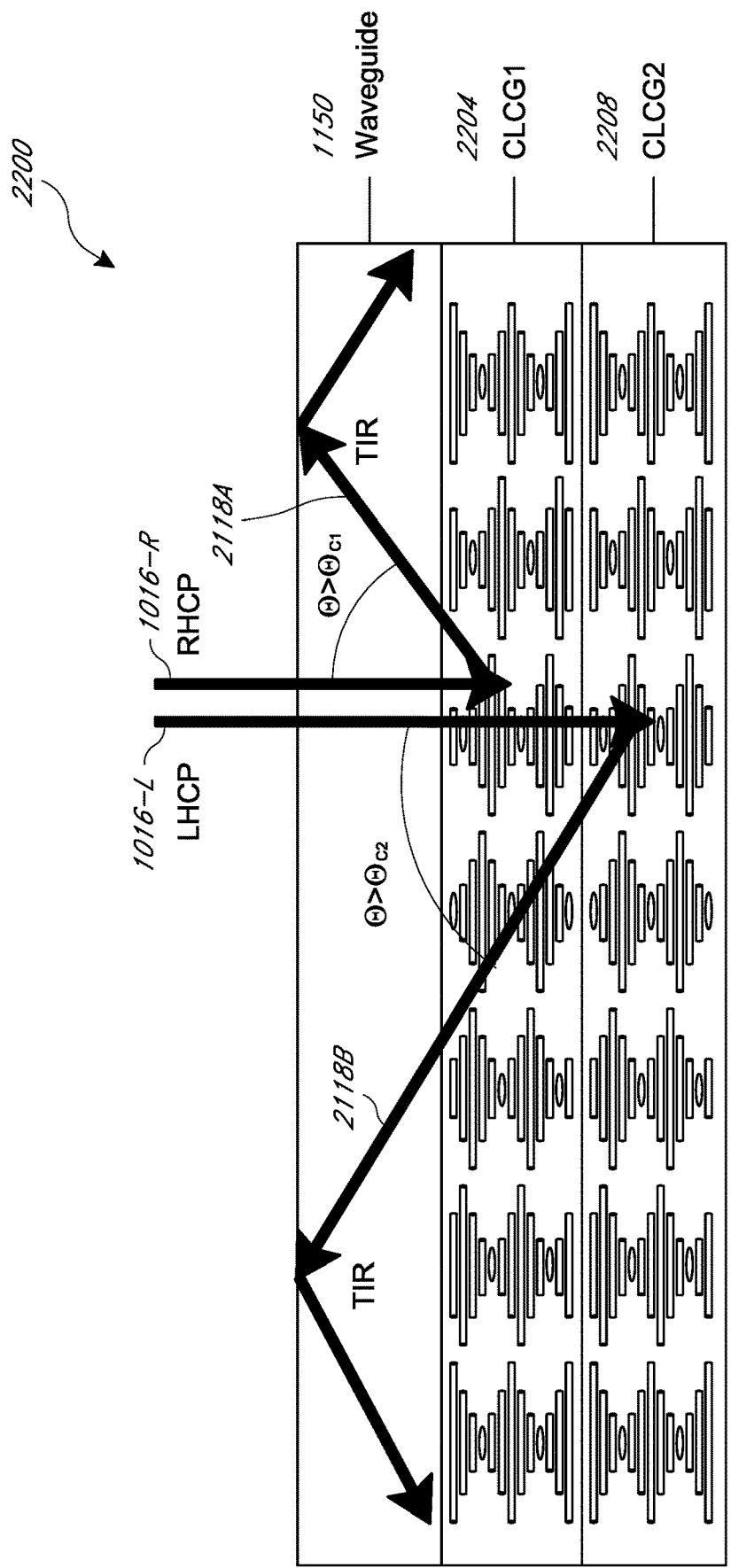
FIG. 22B illustrates the optical wave-guiding device of FIG. 22A, under a condition in which the incident light is polarized into orthogonal elliptical or circular polarized light beams.

FIG. 22B illustrates the optical wave-guiding device 2000 described above with respect to FIG. 22A under a different condition in which the incident light is polarized into two orthogonal elliptical or circular polarized light beams, e.g., light beams 1016-L having, e.g., a left-handed elliptical/circular polarization and light beams 1016-R having, e.g., a right-handed elliptical/circular polarization. Under such condition, the incident light beams 1016-L, 1016-R can be coupled into the common waveguide 2204 by TIR in opposing lateral directions, in a similar manner as described with respect to FIG. 22A, supra, for coupling the incident light beams 1016-L, 1016-R having first and second polarization handedness, e.g., left-handedness and right-handedness.

The embodiments described above with respect to FIGS. 21B and 22B can be particularly advantageous in certain applications, e.g., where different light signals (i.e., images) are encoded in orthogonal circular polarizations. Under such circumstances, light can be coupled into the opposite directions (e.g., positive and negative x-directions) depending on the polarization handedness.

Figure 22C:
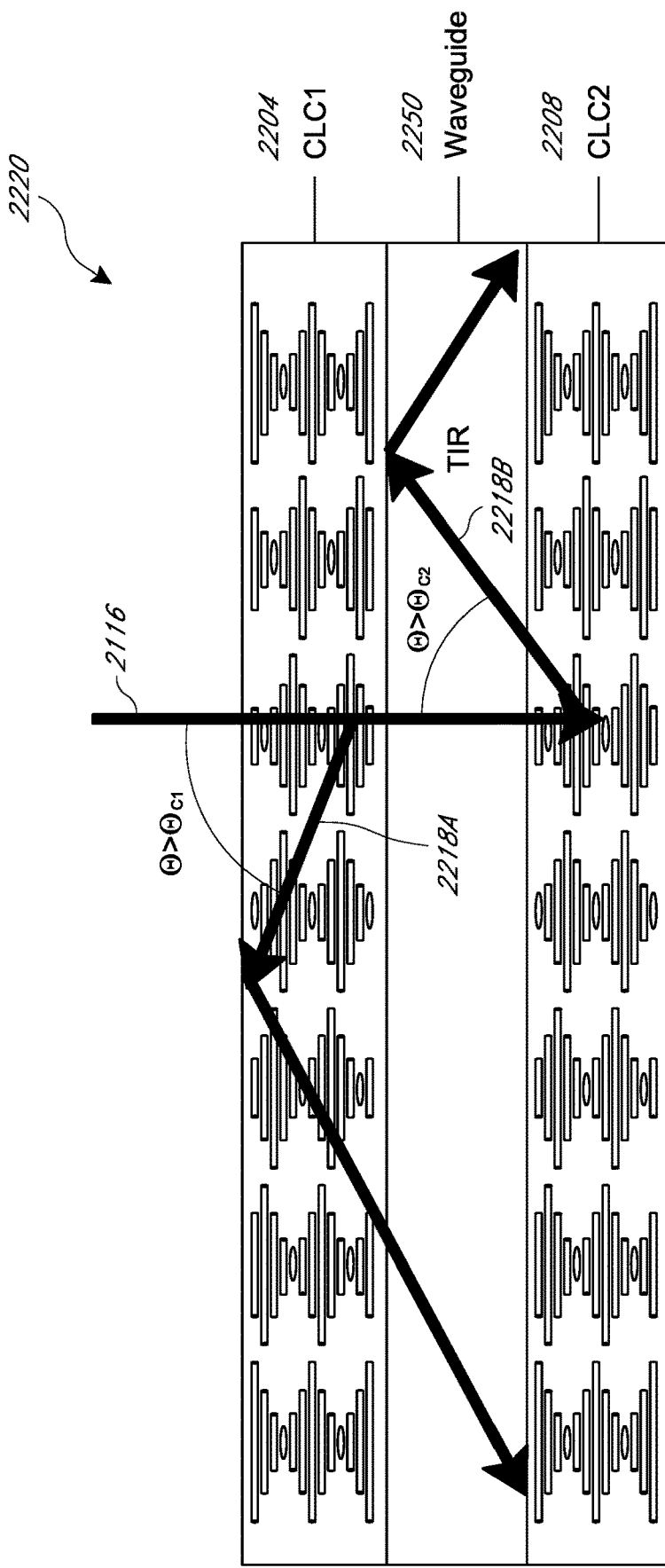
FIG. 22C illustrates an example of an optical wave-guiding device comprising a plurality of CLC layers coupled to a common waveguide interposed between two CLC layers, including a first CLC layer having chiral structures having a first rotation direction and a second CLC layer having chiral structures having a second rotation direction opposite to the first rotation direction, under a condition in which the incident light beam is linearly polarized or unpolarized.

FIG. 22C illustrates an optical wave-guiding device 2220 comprising a common waveguide 2250 coupled to a plurality of CLCGs, e.g., arranged as a stack, including a first CLCG 2204 having chiral structures having a first rotation direction and a second CLCG 2208, having chiral structures having a second rotation direction opposite to the first rotation direction, according to embodiments. Unlike the embodiments described with respect to FIGS. 22A and 22B, in the wave-guiding device 2220, the common waveguide 2250 is interposed between the first and second CLCG layers 2204, 2208. For illustrative purposes, the illustrated optical wave-guiding device 2220 is under a condition in which the incident light beam 2116 is linearly polarized or unpolarized. Under such conditions, the incident light beam 2116 can be coupled into a waveguide by TIR in opposing lateral directions. In the illustrated embodiment, when viewing the direction in which incident light 2116 travels, i.e., the negative z-direction, the liquid crystal molecules of the chiral structures of the first CLCG 2204 are successively rotated in a clockwise direction, while the liquid crystal molecules of the chiral structures of the second CLCG 2204 are successively rotated in the opposite counterclockwise direction. Of course, opposite arrangement is possible.

Still referring to FIG. 22C, the component of the elliptical or circular incident light beam 2116 that has a first polarization handedness, e.g., right-handed polarized component, that matches the rotation direction of the chiral structures of the first CLCG 2204, e.g., clockwise direction, is substantially reflected by the first CLCG 2204, thereby resulting in a first reflected beam 2118A at an angle $\theta > \theta_{c1}$ relative to the layer normal direction (z-axis), which in turn reflects off of the outer surface of the first CLCG 2204, before coupling into and traveling through the common waveguide 2250 in a first lateral direction (e.g., negative x-direction) by TIR.

Still referring to FIG. 22C, on the other hand, the component of the elliptical or circular incident light beam 2116 that has a second polarization handedness, e.g., left-handed polarized component, that does not match the rotation direction of the chiral structures of the first CLCG 2204, e.g., clockwise direction, is substantially transmitted through the first CLCG 2204 and further through the common waveguide 2204, and thereafter substantially reflected by the second CLCG 2208, thereby resulting in a second reflected beam 2218B at an angle $\theta > \theta_{c2}$ relative to the layer normal direction (z-axis), and couples to and travels through the common waveguide 2250 in a second lateral direction (e.g., positive x-direction) by TIR.

Cholesteric Liquid Crystal Off-Axis Mirror

As described supra with respect to various embodiments, by matching the handedness of polarization of incident elliptically or circularly polarized light with the direction of rotation as the liquid crystal molecules of the chiral structures of a CLC layer, the CLC layer can be configured as a Bragg reflector. Furthermore, one or more CLC layers having different helical pitches can be configured as a wave-length selective Bragg reflector with high bandwidth. Based on the concepts described herein with respect to various embodiments, the CLC layers can be configured as an off-axis mirror configured to selectively reflect a first range of wavelengths, for example, infrared wavelengths (e.g., the near infrared), while transmitting another range of wavelengths, e.g., visible wavelengths. In the following, applications of various embodiments of CLC off-axis mirrors implemented in eye-tracking systems are disclosed, according to embodiments.

Figure 23:
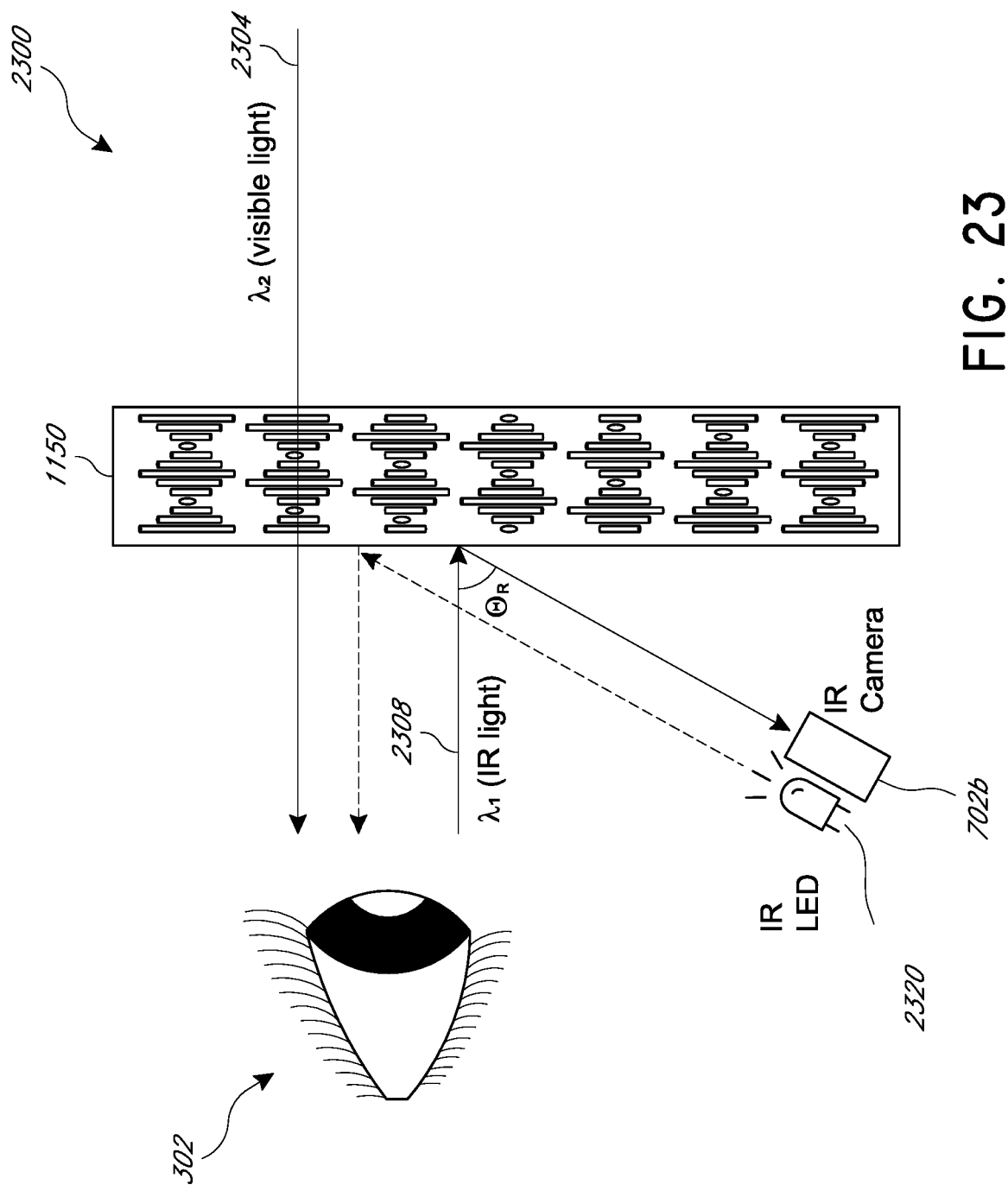
FIG. 23 illustrates an example of an imaging system comprising a forward-facing camera configured to images a wearer's eye using a cholesteric liquid crystal (CLC) off-axis mirror.

FIG. 23 illustrates an example of an eye-tracking system 2300 employing a cholesteric liquid crystal reflector (CLCR), e.g., a wavelength-selective CLCR 1150 configured to image an eye 302 of a viewer, according to various embodiments. Eye tracking can be a key feature in interactive vision or control systems including wearable displays, e.g., the wearable display system 200 in FIG. 2 or the systems 700 described in FIGS. 24A-24H, for virtual/augmented/mixed reality display applications, among other applications. To achieve good eye tracking, it may be desirable to obtain images of the eye 302 at low perspective angles, for which it may in turn be desirable to dispose an eye-tracking camera 702b near a central position of viewer's eyes. However, such position of the camera 702b may interfere with user's view. Alternatively, the eye-tracking camera 702b may be disposed to a lower position or a side. However, such position of the camera may increase the difficulty of obtaining robust and accurate eye tracking since the eye images are captured at a steeper angle. By configuring the CLCR 1150 to selectively reflect infrared (IR) light 2308 (e.g., having a wavelength of 850 nm) from the eye 302 while transmitting visible light 2304 from the world as shown in FIG. 4, the camera 702b can be placed away from the user's view while capturing eye images at normal or low perspective angles. Such configuration does not interfere with user's view since visible light is not reflected. The same CLCR 1150 can also be configured as an IR illumination source 2320, as illustrated. A low perspective angle of IR illuminator can results in less occlusions, e.g., from eye lashes, which configuration allows more robust detection of specular reflections, which can be key feature in modern eye-tracking systems.

Still referring to FIG. 23, according to various embodiments, the CLCR 1150 comprises one or more cholesteric liquid crystal (CLC) layers each comprising a plurality of chiral structures, wherein each chiral structure comprises a plurality of liquid crystal molecules that extend in a layer depth direction (e.g., z-direction) and are successively rotated in a first rotation direction, as described supra. The arrangements of the liquid crystal molecules of the chiral structures vary periodically in a lateral direction perpendicular to the layer depth direction such that the one or more CLC layers are configured to substantially Bragg-reflect a first incident light having a first wavelength ($\lambda_1$) while substantially transmitting a second incident light having a second wavelength ($\lambda_2$). As described elsewhere in the specification, each of the one or more CLC layers are configured to substantially Bragg-reflect elliptically or circularly polarized first and incident light having a handedness of polarization that is matched to the first rotation direction, when viewed in the layer depth direction, while being configured to substantially transmit elliptically or circularly polarized first and second incident light having a handedness of polarization that is opposite to the first rotation direction, when viewed in the layer depth direction. According embodiments, the arrangements of the liquid crystal molecules varying periodically in the lateral direction are arranged to have a period in the lateral direction such that a ratio between the first wavelength and the period is between about 0.5 and about 2.0. According to embodiments, the first wavelength is in the near infrared range between about 600 nm and about 1.4 µm, for instance about 850 nm and the second wavelength in is in the visible range having one or more colors as described elsewhere in the specification. According to embodiments, the liquid crystal molecules of the chiral structures are pre-tilted relative to a direction normal to the layer depth direction. As configured, the one or more CLC layers are configured such that the first incident light is reflected at an angle ($\theta_R$) relative to the layer depth direction (z-direction) exceeding about 50°, about 60°, about 70° or about 80° degrees relative to the layer depth direction based on, e.g., Eq. [3] described supra.

Referring back to FIG. 2, the eyes of the wearer of a head mounted display (HMD) (e.g., the wearable display system 200 in FIG. 2) can be imaged using a reflective off-axis Diffractive Optical Element (DOE), which may be for example, a Holographic Optical Element (HOE). The resulting images can be used to track an eye or eyes, image the retina, reconstruct the eye shape in three dimensions, extract biometric information from the eye (e.g., iris identification), etc.

There are a variety of reasons why a head mounted display (HMD) might use information about the state of the eyes of the wearer. For example, this information can be used for estimating the gaze direction of the wearer or for biometric identification. This problem is challenging, however, because of the short distance between the HMD and the wearer's eyes. It is further complicated by the fact that gaze tracking requires a larger field of view, while biometric identification requires a relatively high number of pixels on target on the iris. For an imaging system which will attempt to accomplish both of these objectives, the requirements of the two tasks are largely at odds. Finally, both problems are further complicated by occlusion by the eyelids and eyelashes. Embodiments of the imaging systems described herein address some or all of these problems. The various embodiments of the imaging systems 700 described herein with reference to FIGS. 24A-24F can be used with HMD including the display devices described herein (e.g., the wearable display system 200 shown in FIG. 2 and/or the display system 1000 shown in FIG. 6).

Figure 24A:
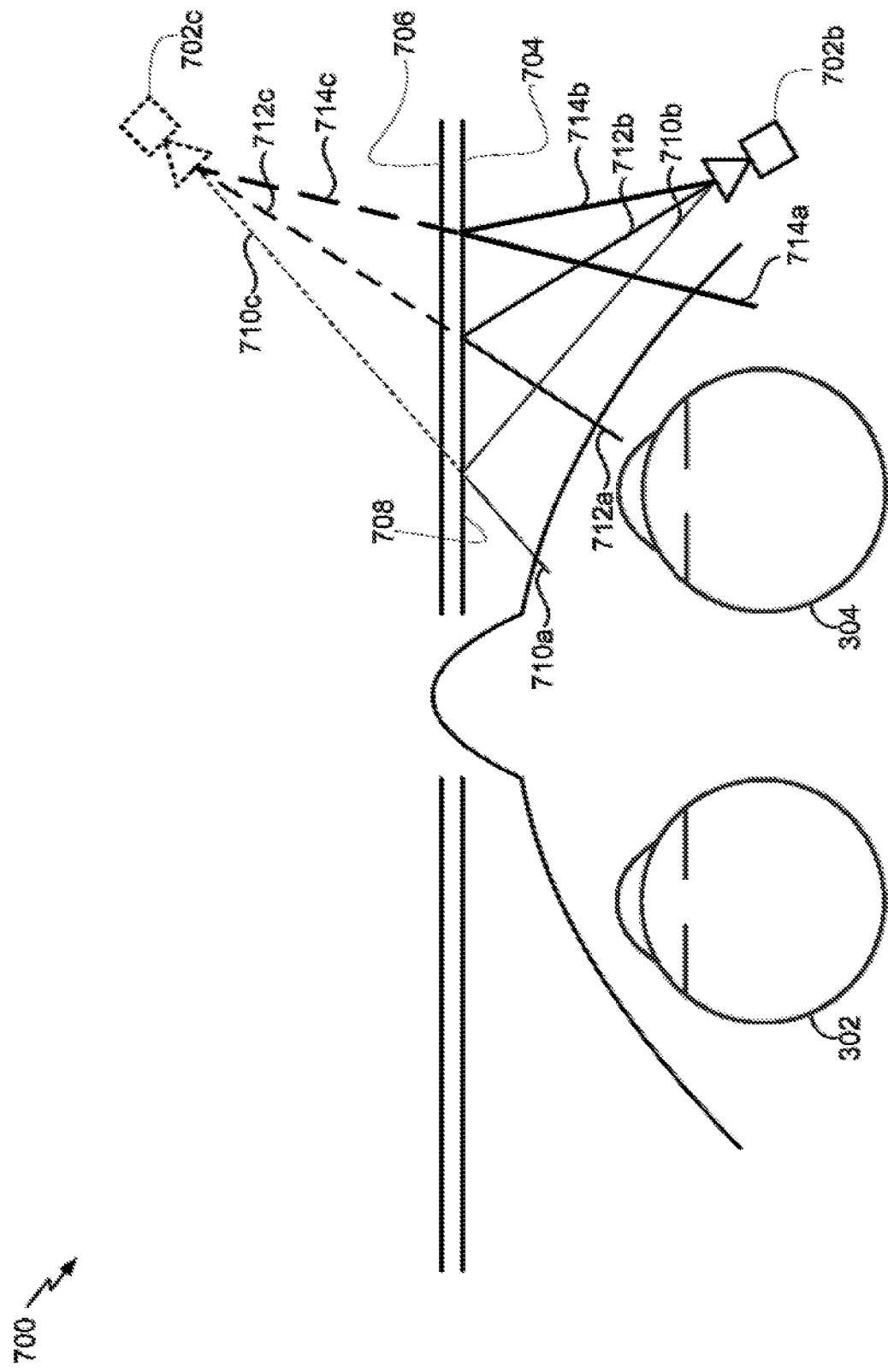
FIGS. 24A-24F illustrate examples of imaging systems comprising a forward-facing camera configured to images a wearer's eye using a CLC off-axis mirror.

FIG. 24A schematically illustrates an example of an imaging system 700 that comprises an imager 702b which is used to view the eye 304, and which is mounted in proximity to the wearer's temple (e.g., on a frame 64 of the wearable display system 200, FIG. 2, for example, an ear stem). In other embodiments, a second imager is used for the wearer's other eye 302 so that each eye is separately imaged. The imager 702b can include an infrared digital camera that is sensitive to infrared radiation. The imager \702b is mounted so that it is facing forward (in the direction of the wearer's vision), rather than facing backward and directed at the eye 304 (as with the camera 500 shown in FIG. 6). By disposing the imager 702b nearer the ear of the wearer, the weight of the imager 702b is also nearer the ear, and the HMD may be easier to wear as compared to an HMD where the imager is backward facing and disposed nearer to the front of the HMD (e.g., close to the display 62, FIG. 2). Additionally, by placing the forward-facing imager 702b near the wearer's temple, the distance from the wearer's eye 304 to the imager is roughly twice as large as compared to a backward-facing imager disposed near the front of the HMD (e.g., compare with the camera 500 shown in FIG. 4). Since the depth of field of an image is roughly proportional to this distance, the depth of field for the forward-facing imager 702b is roughly twice as large as compared to a backward-facing imager. A larger depth of field for the imager 702b can be advantageous for imaging the eye region of wearers having large or protruding noses, brow ridges, etc.

The imager 702b is positioned to view an inside surface 704 of an otherwise transparent optical element 706. The optical element 706 can be a portion of the display 708 of an HMD (or a lens in a pair of eyeglasses). The optical element 706 can be transmissive to at least 10%, 20%, 30%, 40%, 50%, or more of visible light incident on the optical element. In other embodiments, the optical element 706 need not be transparent (e.g., in a virtual reality display). The optical element 706 can comprise a CLC off-axis mirror 708. The CLC off-axis mirror 708 can be a surface reflecting a first range of wavelengths while being substantially transmissive to a second range of wavelengths (that is different from the first range of wavelengths). The first range of wavelengths can be in the infrared, and the second range of wavelengths can be in the visible. For example, the CLC off-axis mirror 708 can comprise a hot mirror, which reflects infrared light while transmitting visible light. In such embodiments, infrared light 710a, 712a, 714a from the wearer propagates to and reflects from the optical element 706, resulting in reflected infrared light 710b, 712b, 714b which can be imaged by the imager 702b. In some embodiments, the imager 702b can be sensitive to or able to capture at least a subset (such as a non-empty subset and/or a subset of less than all) of the first range of wavelengths reflected by the CLC off-axis mirror 708. For example, the CLC off-axis mirror 708 may reflect infrared light in the a range of 700 nm to 1.5 µm, and the imager 702b may be sensitive to or able to capture near infrared light at wavelengths from 700 nm to 900 nm. As another example, the CLC off-axis mirror 708 may reflect infrared light in the a range of 700 nm to 1.5 µm, and the imager 702b may include a filter that filters out infrared light in the range of 900 nm to 1.5 µm such that the imager 702b can capture near infrared light at wavelengths from 700 nm to 900 nm.

Visible light from the outside world (1144, FIG. 6) is transmitted through the optical element 706 and can be perceived by the wearer. In effect, the imaging system 700 shown in FIG. 24A acts as if there were a virtual imager 702c directed back toward the wearer's eye 304. The virtual imager 702c can image virtual infrared light 710c, 712c, 714c (shown as dotted lines) propagated from the wearer's eye 704 through the optical element 706. Although the hot mirror (or other DOE described herein) can be disposed on the inside surface 704 of the optical element 706, this is not a limitation. In other embodiments, the hot mirror or DOE can be disposed on an outside surface of the optical element 706 or within the optical element 706 (e.g., a volume HOE).

Figure 24B:
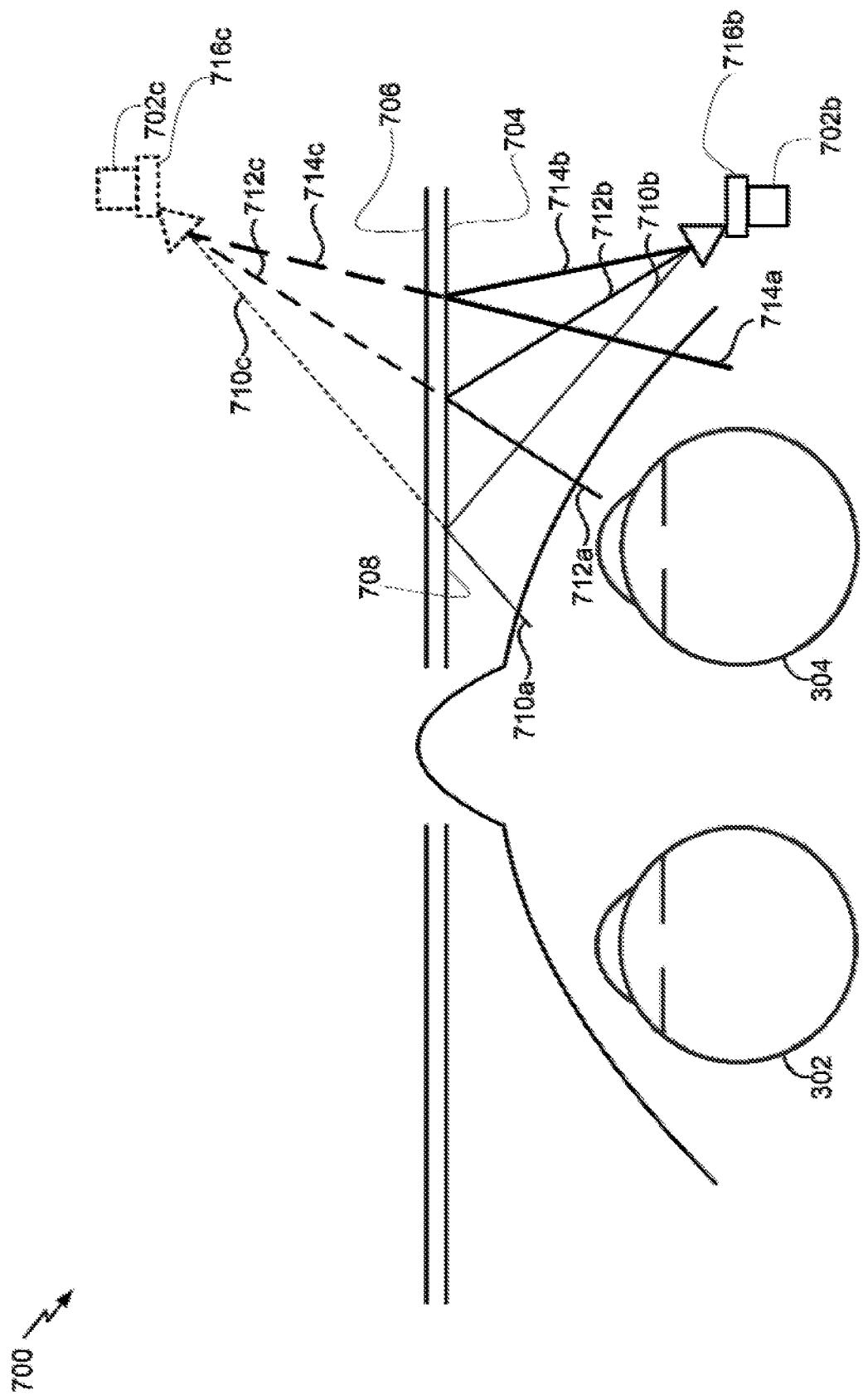

FIG. 24B schematically illustrates another example of the imaging system 700. In this embodiment, perspective distortions may be reduced or eliminated by the use of a perspective control lens assembly 716b (e.g., a shift lens assembly, a tilt lens assembly, or a tilt-shift lens assembly) with the imager 702b. In some embodiments, the perspective control lens assembly 716b may be part of the lens of the imager 702b. The perspective control lens 716b can be configured such that a normal to the imager 702b is substantially parallel to a normal to the region of the surface 704 that includes the DOE (or HOE) or hot mirror. In effect, the imaging system 700 shown in FIG. 24B acts as if there were a virtual imager 702c with a virtual perspective control lens assembly 716c directed back toward the wearer's eye 304.

Figure 24C:
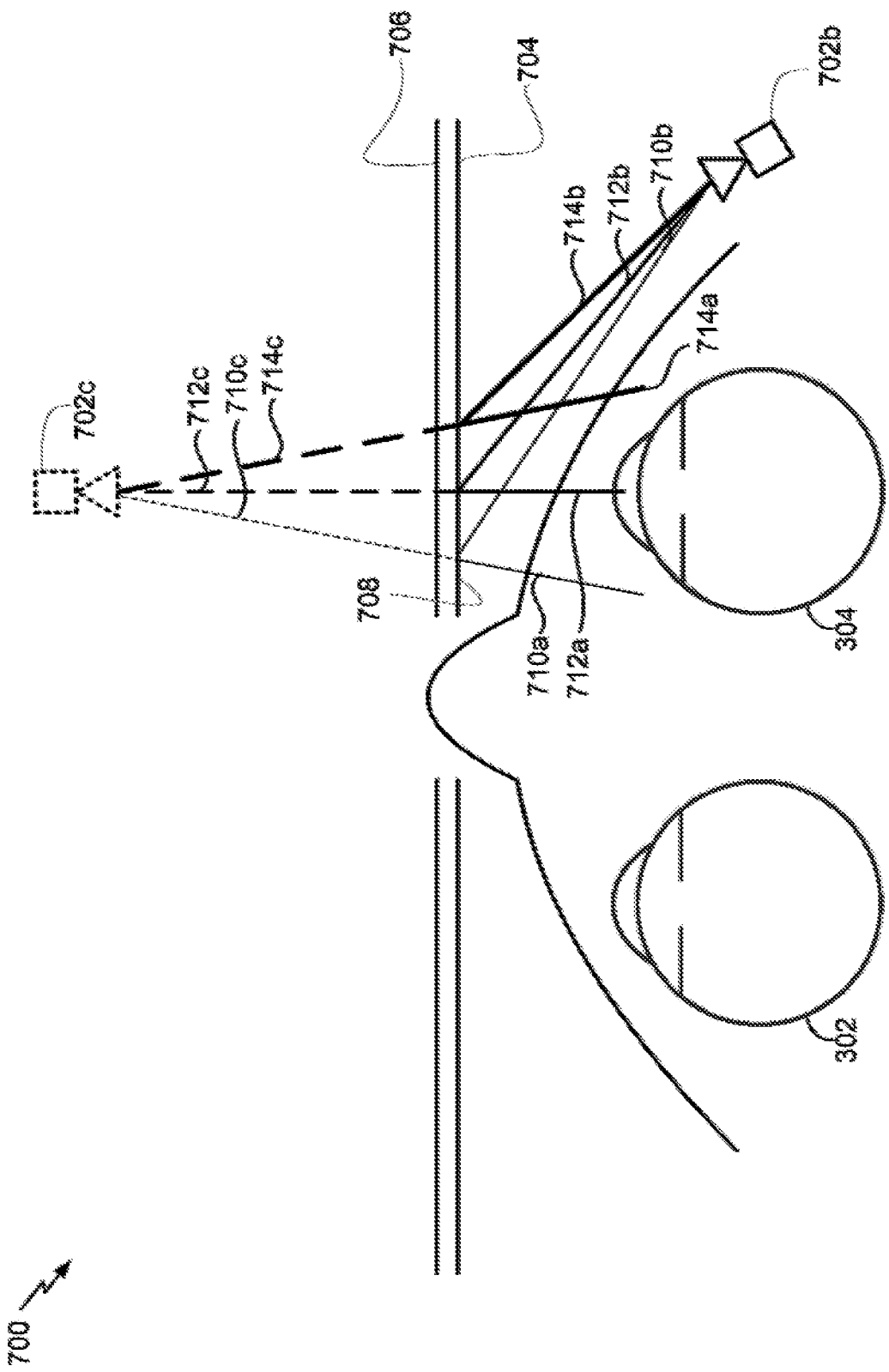
Figure 24D:
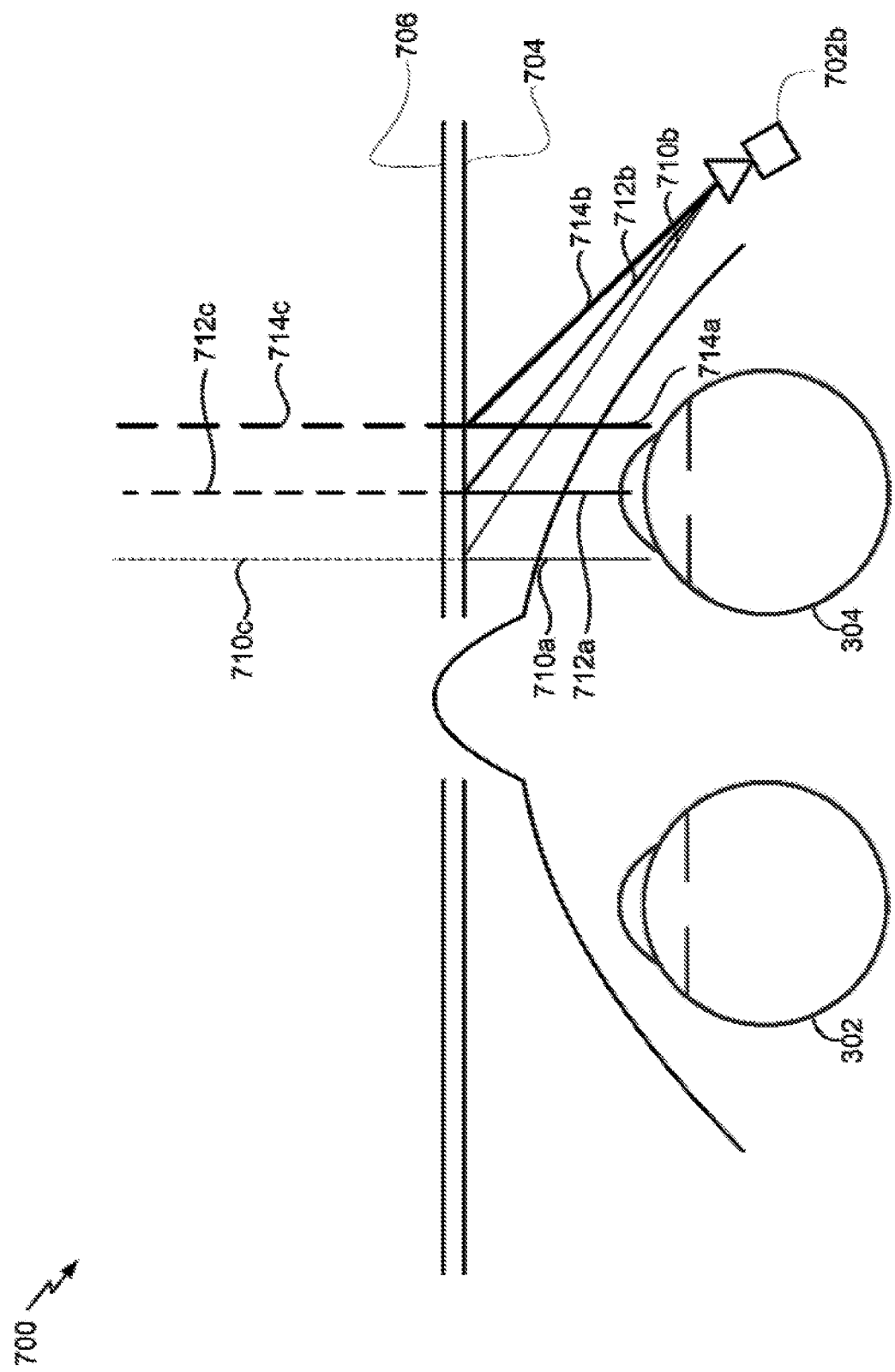

Additionally or alternatively, as schematically shown in FIG. 24C, the CLC off-axis mirror 708 of the optical element 706 may have, on its surface 704, an off axis holographic mirror (OAHM), which is used to reflect light 710a, 712a, 714a to facilitate viewing of the eye 304 by the camera imager 702b which captures reflected light 710b, 712b, 714b. The OAHM 708 may have optical power as well, in which case it can be an off-axis volumetric diffractive optical element (OAVDOE), as schematically shown in FIG. 24D. In the example shown in FIG. 24D, the effective location of the virtual camera 702c is at infinity (and is not shown in FIG. 24D).

Figure 24E:
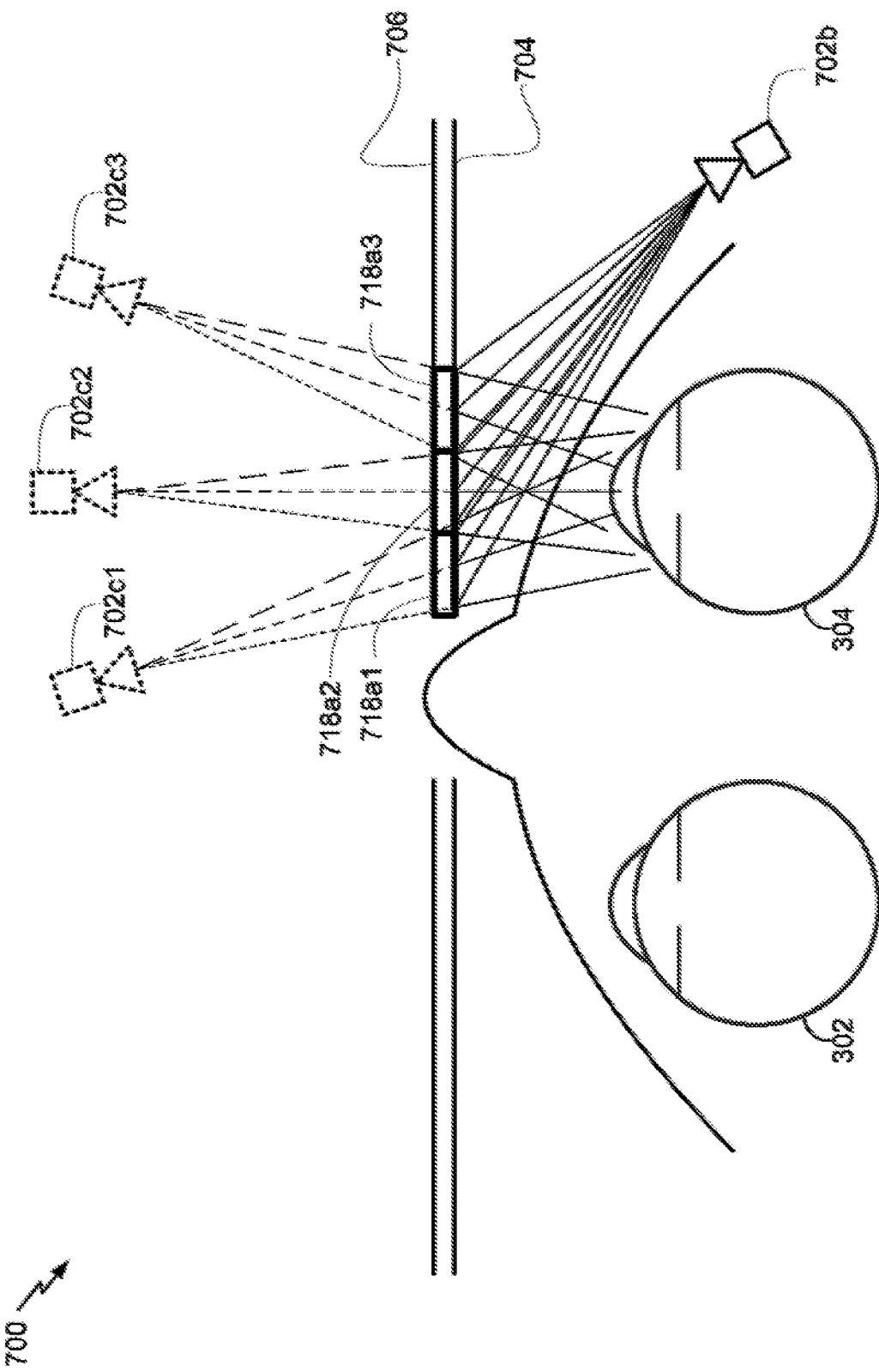

In some embodiments, the HOE (e.g., the OAHM or OAVDOE) can be divided into a plurality of segments. Each of these segments can have different optical properties or characteristics, including, for example, reflection angles at which the segments reflect the incoming (infrared) light or optical power. The segments can be configured so that light is reflected from each segment toward the imager 702b. As a result, the image acquired by the imager 702b will also be divided into a corresponding number of segments, each effectively viewing the eye from a different angle. FIG. 24E schematically illustrates an example of the display system 700 having an OAHM with three segments 718a1, 718a2, 718a3, each of which acts as a respective virtual camera 702c1, 702c2, 702c3 imaging the eye 304 at a different angular location.

Figure 24F:
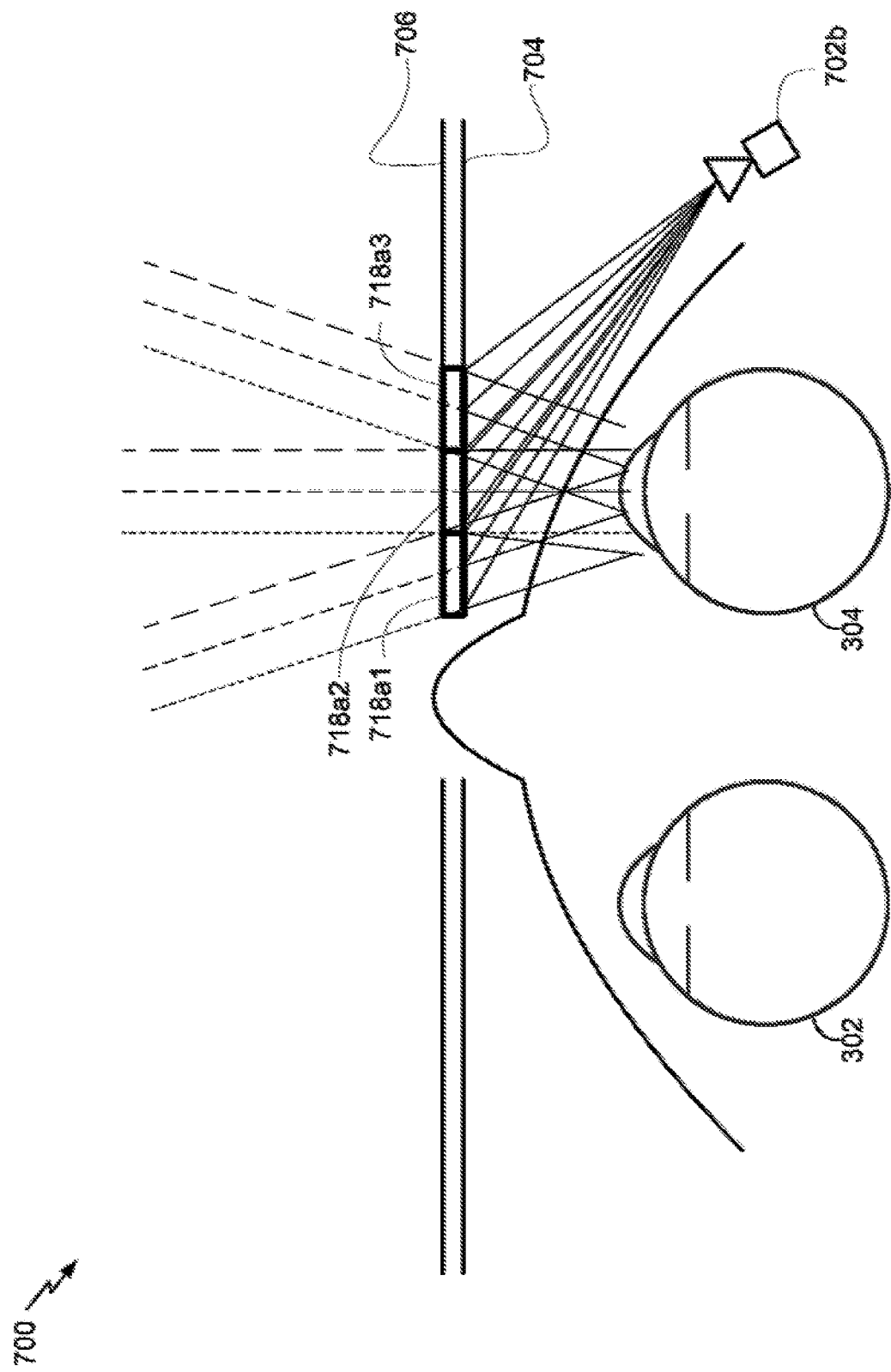

FIG. 24F schematically illustrates another example of the display system 700 having an OAHM with three segments 718a1, 718a2, 718a3, each having optical power (e.g., a segmented OAVDOE), with each segment generating a virtual camera at infinity imaging the eye 304 at a different angular location. Although three segments are schematically illustrated in FIGS. 24E and 24F, this is for illustration and not limitation. In other embodiments, two, four, five, six, seven, eight, nine, or more segments can be utilized. None, some, or all of these segments of the HOE can have optical power.

Figure 24G:
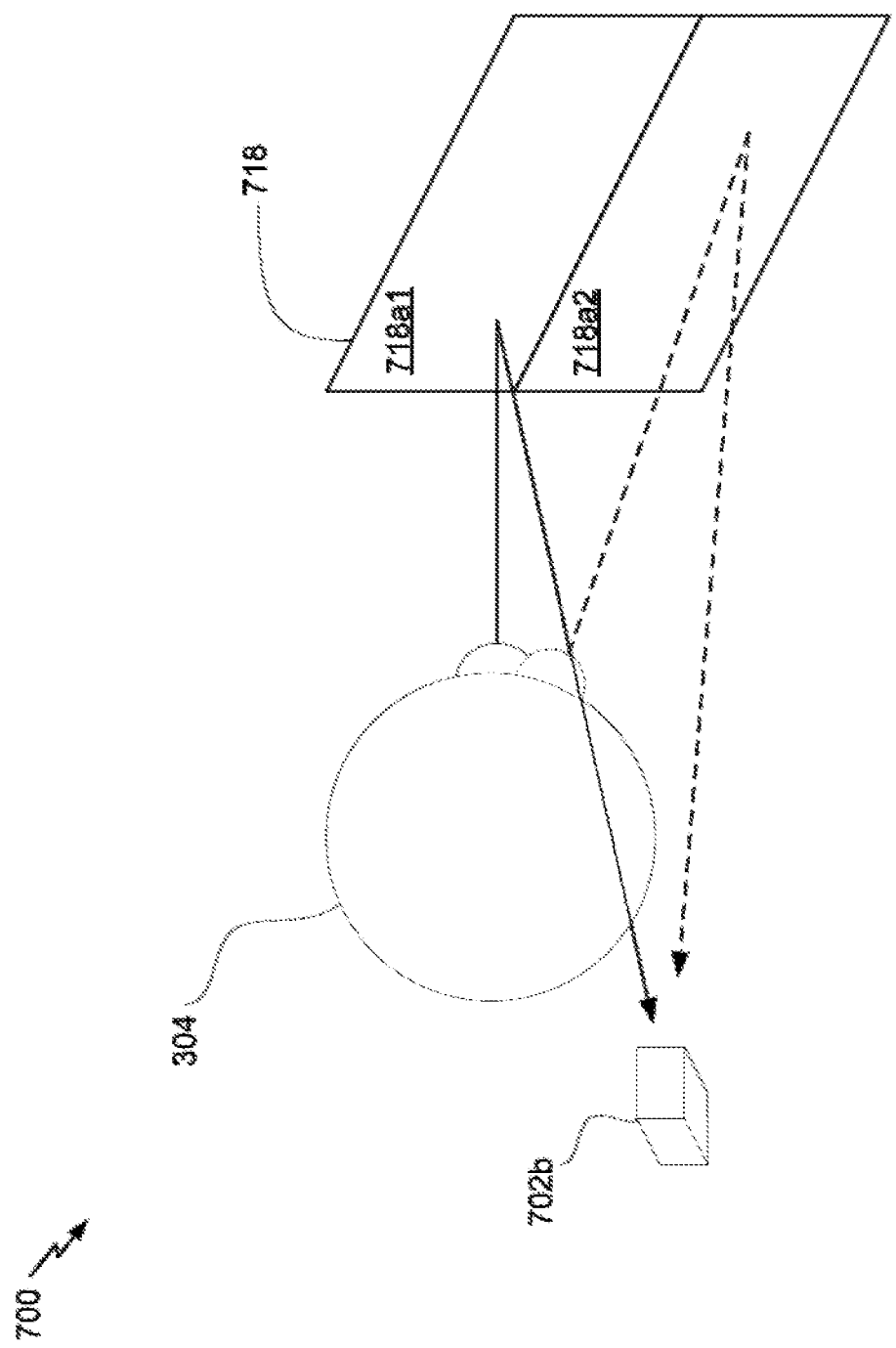
FIGS. 24G and 24H illustrate examples of imaging systems comprising a forward-facing camera configured to images a wearer's eye using a diffractive optical element comprising a plurality of segments including one more CLC off-axis mirrors, where each of the segments can have different optical properties.

The three segments 718a1, 718a2, 718a3 are shown as spaced horizontally across the optical element 706 in FIGS. 24E and 24F. In other embodiments, the segments can be spaced vertically on the optical element 706. For example, FIG. 24G schematically shows a DOE 718 having two vertically spaced segments 718a1 and 718a2, with the segment 718a1 comprising a CLC off-axis mirror configured to reflect light back toward the imager 702b (which may be in the same general horizontal plane as the segment 718a1), and the segment 718a2 configured to reflect light upwards toward the imager 702b. Similar to bifocal lenses, the arrangement shown in FIG. 24G can be advantageous in allowing the imaging system 700 to use reflection imagery acquired by the imager 702b from the upper segment 718a1 when the wearer is looking forward through the upper portion of the HMD (schematically shown via the solid arrowed line) and to use reflection imagery from the lower segment 718a2 when the wearer is looking downward through the lower portion of the HMD (schematically shown via the dashed arrowed line).

Figure 24H:
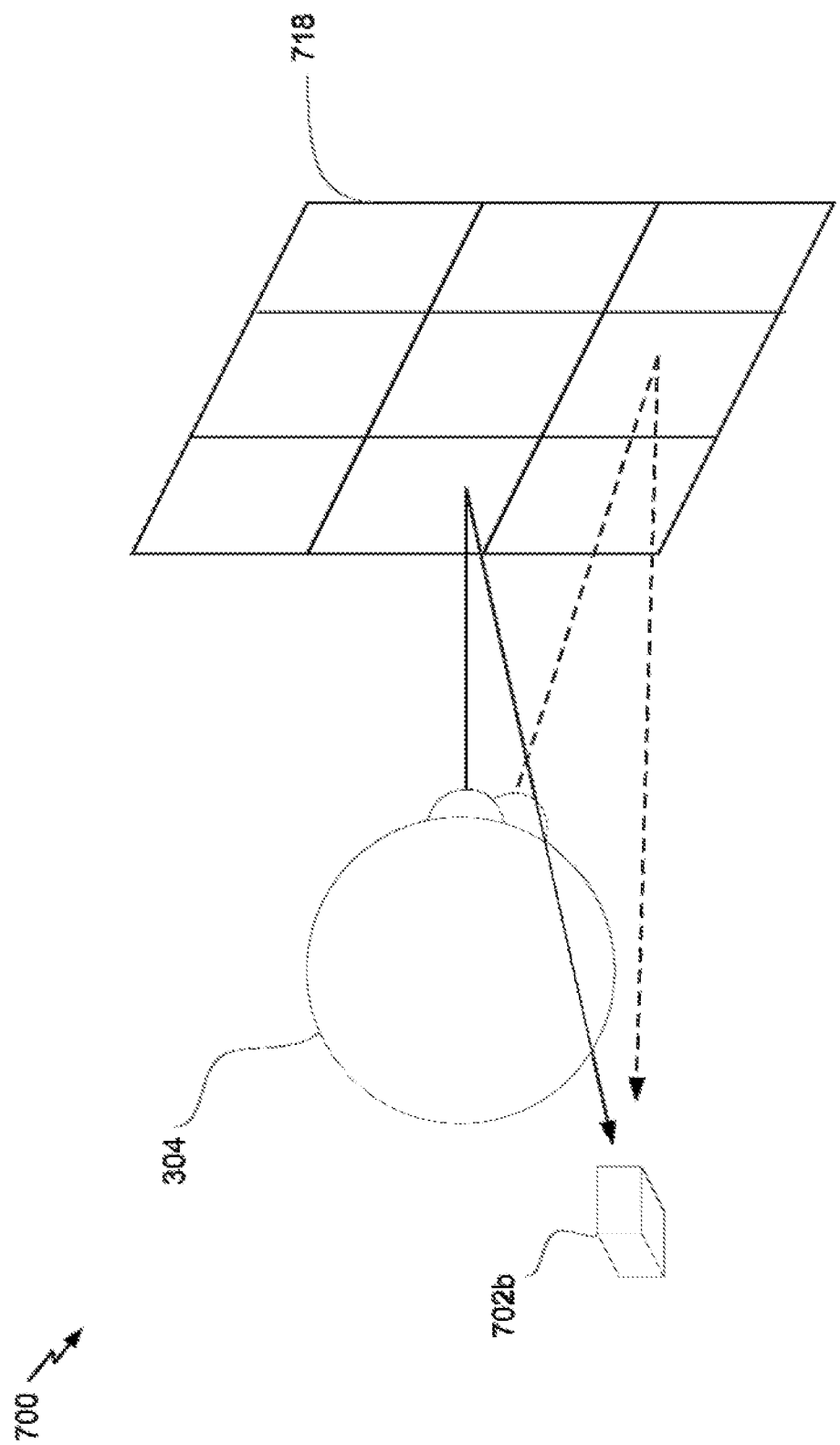

A mix of horizontally spaced and vertically spaced segments can be used in other embodiments. For example, FIG. 24H shows another example of the HOE 718 with a 3×3 array of segments each comprising a CLC off-axis mirror. The imager 702b can acquire reflection data from each of these nine segments, which represent light rays coming from different areas of and angular directions from the eye region. Two example light rays propagating from the eye region to the HOE 718 and reflecting back to the imager 702b are shown as solid and dashed lines. The imaging system 700 (or processing module 224 or 228) can analyze the reflection data from the plurality of segments to multiscopically calculate the three-dimensional shape of the eye or the gaze direction (e.g., eye pose) of the eye.

Embodiments of the optical system 700 utilizing segments may have multiple benefits. For example, the segments can be used individually, by selecting the particular segments which best suit a particular task, or they can be used collectively to multiscopically estimate the three-dimensional shape or pose of the eye. In the former case, this selectivity can be used to, for example, select the image of the wearer's iris which has the least occlusion by eyelids or eyelashes. In the latter case, the three dimensional reconstruction of the eye can be used to estimate orientation (by estimation of, for example, the location of the bulge of the cornea) or accommodation state (by estimation of, for example, the lens induced distortion on the apparent location of the pupil).

Waveguides Coupled with CLCG Optimized for Field of View

A medium having a refractive index that depends on the polarization and propagation direction of light is referred to as being birefringent (or birefractive). As described throughout the specification and understood in the relevant industry, light whose polarization is perpendicular to the optic axis of a birefringent medium is described as being affected by an ordinary refractive index ($n_o$), light whose polarization is parallel to the optic axis of the birefringent medium is described as being affected by an extraordinary refractive index ($n_e$), and a difference of the refractive indices, $n_e$–$n_o$, observed in the birefringent medium material is described as having a birefringence $\Delta n$. As described herein, an average refractive index $n_{LC}$ of a birefringent CLCG can be expressed as:

$$n_{LC} = \tfrac{1}{2}(n_o + n_e) = n_o + \Delta n/2. \quad [5]$$

According to various embodiments described herein, cholesteric liquid crystal (CLC) layers can have an average, a local, a mean, a median, a maximum or a minimum birefringence ($\Delta n$) of 0.05-0.10, 0.15-0.20, 0.20-0.25, 0.25-0.30, 0.30-0.35, 0.35-0.40, 0.40-0.45, 0.45-0.50, 0.50-0.55, 0.55-0.60, 0.60-0.65, 0.65-0.70, or a value within a range defined by any of these values.

As described herein, the phase retardation (Γ) of light in a material medium having birefringence $\Delta n$ can be expressed as $\Gamma = 2\pi\Delta n d/\lambda$, where $\lambda$ is the wavelength of light and d is the thickness of the medium. In addition, diffraction efficiency ($\eta$) of a birefringent medium such as a layer having liquid crystals can be expressed as $\eta = \sin^2(\eta \Delta n d/\lambda)$, where $\Delta n$ is birefringence, $\lambda$ is wavelength and d is the thickness of the medium. Because the phase retardation of light propagating through the diffractive components varies with the wavelength for conventional birefringent media, some diffractive components including diffraction gratings may show a limited range of wavelengths, or bandwidth, within the visible spectrum in which diffraction efficiency is relatively high.

According to various embodiments, various CLC layers and CLCGs described herein may be configured such that they diffract light incident thereon with relatively high efficiency within a particular range of angles of incidence, sometimes referred to as a range of angle of acceptance or a field-of-view (FOV). As described herein, the FOV may include a range of angles spanning negative and positive values of angles of incidence relative to a centerline wavelength of the FOV, outside of which the diffraction efficiency falls off by more than 10%, more than 25%, more than 50%, more than 75%, or by a value within a range defined by any of these values, relative to the diffraction efficiency at the centerline wavelength of the FOV, or relative to the diffraction efficiency at a wavelength corresponding to a peak efficiency within the FOV. Otherwise stated, inside the FOV, the CLC layers and CLCGs are configured such that the diffraction efficiency is greater than 25%, greater than 50%, greater than 75%, greater than 90%, or a value in a range defined by any of these values, relative to the diffraction efficiency at the centerline wavelength of the FOV, or relative to the diffraction efficiency at a wavelength corresponding to a peak efficiency within the FOV. Having the FOV within which the diffraction efficiency is relatively constant may be desirable, e.g., where uniform intensity of diffracted light is desired within the FOV.

Figure 25:
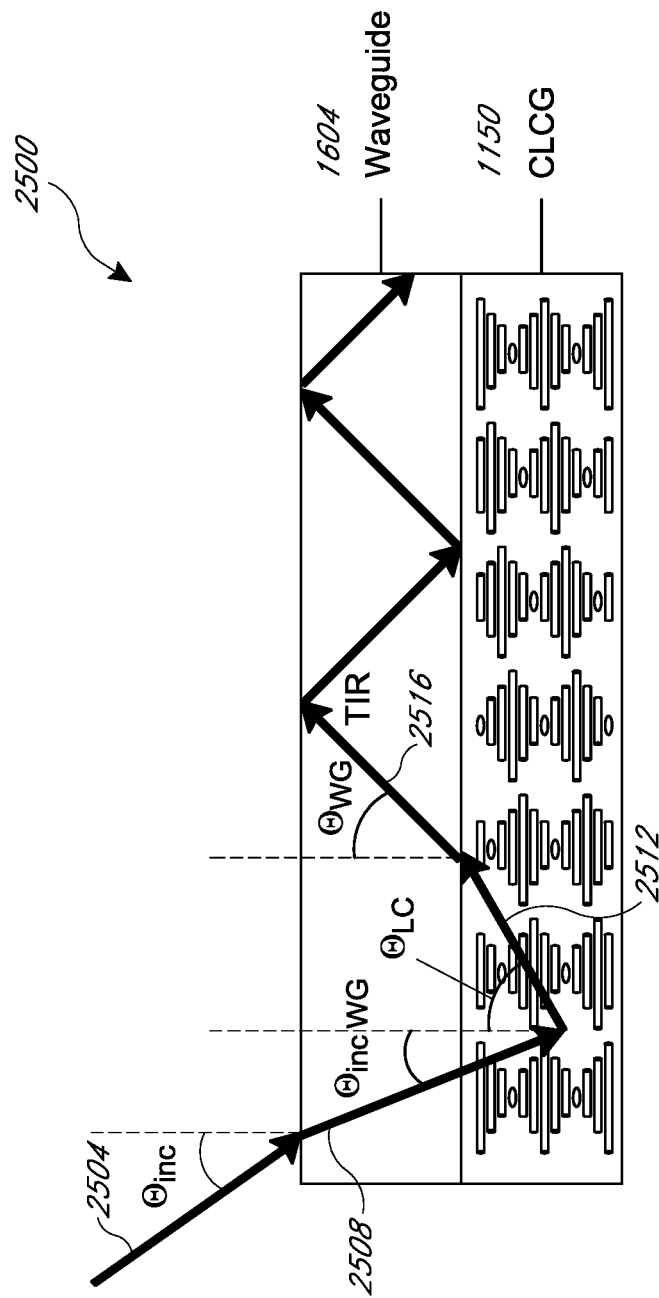
FIG. 25 illustrates an example optical wave-guiding device optimized for a wide range of field of view, comprising a waveguide coupled to a CLCG and configured to propagate light by total internal reflection (TIR).

Applicant has recognized that the FOV of the CLC layers and CLCGs can be increased or optimized for various embodiments of waveguides coupled with the CLC layers and CLCGs as described above, by selecting the CLC layers and CLCGs with an appropriate birefringence (see, e.g., Eq. [6]). FIG. 25 illustrates an example optical wave-guiding device 2500 optimized for relatively high FOV, according to embodiments. The optical wave-guiding device 2500 comprises a waveguide 1604 coupled to a CLCG 1150. Similar to various embodiments described herein, the CLCG 1150 comprises liquid crystal molecules arranged as a plurality of chiral structures in a similar manner to chiral structures 1162-1, 1162-2, . . . 1162-i described supra, e.g., with respect to FIG. 11. The waveguide 1604 is disposed over the CLCG 1150 and optically coupled thereto.

When elliptically/circularly polarized incident light 2504 having a right/left (R/L) handedness is incident on the waveguide 1604 at an angle $\theta_{inc}$ relative to a layer normal of the waveguide 1604, the incident light 2504 is coupled into the waveguide 1604 as light 2508, which becomes incident on the CLCG 1150 at an angle $\theta_{inc}$ WG relative to the layer normal. The light 2508 coupled into the waveguide 1604, when it has a polarization handedness (R/L) which matches the direction of rotation of the liquid crystal molecules of the chiral structures in the CLCG 1150, the light 2508 is Bragg-reflected by the CLCG 1150 into light 2512 having an angle $\theta_{LC}$ relative to the layer normal. The reflected light 2512 is subsequently coupled back into the waveguide 1604 as light 2516 at an angle $\theta_{WG}$ relative to the layer normal, such that the light 2516 travels in a lateral direction (e.g., x-direction), under total internal reflection (TIR). Without being bound to any theory, the TIR condition can be satisfied when the angle $\theta_{WG}$ is greater than a critical angle.

Without being bound to any theory, the range of propagation angles may be limited by the material index of the propagating medium as:

$$1 - \frac{\lambda}{\Lambda} < \sin\theta_{inc} < n - \frac{\lambda}{\Lambda}$$

When the incident angle is symmetric $|\sin \theta_{inc}| < (n-1)/2$, and the minimum refractive index for a given FOV satisfies $n > 2 \sin \theta_{inc} + 1$. This condition may also be valid in a CLCG layer as light diffracts and propagates through the layer. Since the CLCG layers is birefringent, the propagating light experiences the average index of the LC material, $n_{LC}$. Assuming (without requiring) $n_o$ to be fixed, the minimum birefringence $\Delta n$ is related to the angle of incidence of the FOV as:

$$\Delta n > 2(2 \sin \theta_{inc} - n_o + 1) \quad [6]$$

The LC material of the CLCG layer can be selected based on Eq. [6] to provide a desired FOV. The FOV may have angular ranges exceeding 20° 30°, 36°, 40°, 44°, 50° or an angular range in a range of angles defined by any of these values, when the liquid crystal molecules within the CLCG 1150 are configured according to Eq. [6]. For example, the following FOV incident angles can be associated with average indices as: 10°: $n_{LC} \geq 1.35$, 15°: $n_{LC} \geq 1.52$, 18°: $n_{LC} \geq 1.62$, 20°: $n_{LC} \geq 1.68$, 22°: $n_{LC} \geq 1.75$, and 25°: $n_{LC} \geq 1.85$. As another example, when $n_{LC}$ is between about 1.35 and about 1.85, the full FOV may be between about 20° and about 50°, or may exceed 50°.

In various embodiments, the above disclosed values of FOV can be obtained when the waveguide 1604 is formed of a suitable material having an index of refraction $n_t$ between about 1 and about 2 between about 1.4 and about 1.8 or between about 1.5 and about 1.7. For example, the waveguide may comprise a polymer such as polycarbonate or a glass.

Waveguides Coupled with CLCG Configured as Outcoupling Optical Elements

As described above with respect to FIGS. 9B and 9C, various embodiments of display devices disclosed herein include outcoupling optical elements 1250, 1252, 1254, which may be configured as exit pupil expanders (EPE's) that direct light in a viewer's eye 4 (FIG. 7). In various embodiments described herein, various optical components such as lenses, mirrors and gratings may be configured to be specific to a certain light propagation direction and or to certain polarization of light, e.g., right-handed or left-handed circular polarized light. As described herein, in various embodiments, CLC layers and CLCGs comprise a plurality of chiral structures, where each chiral structure comprises a plurality of liquid crystal molecules that extend in a layer depth direction by at least a helical pitch and are successively rotated in a rotation direction. The CLC layers or CLCGs can advantageously be configured to substantially Bragg-reflect elliptically or circularly polarized light having a handedness of polarization that is matched to the rotation direction of the liquid crystal molecules, while being configured to substantially transmit elliptically or circularly polarized light having a handedness of polarization that is opposite to the rotation direction of the liquid crystal molecules. Based on these properties of the CLC layers and CLCGs, various embodiments of display devices disclosed herein have optical elements 1250, 1252, 1254 comprising one or more CLC layers or CLCGs.

Figure 26:
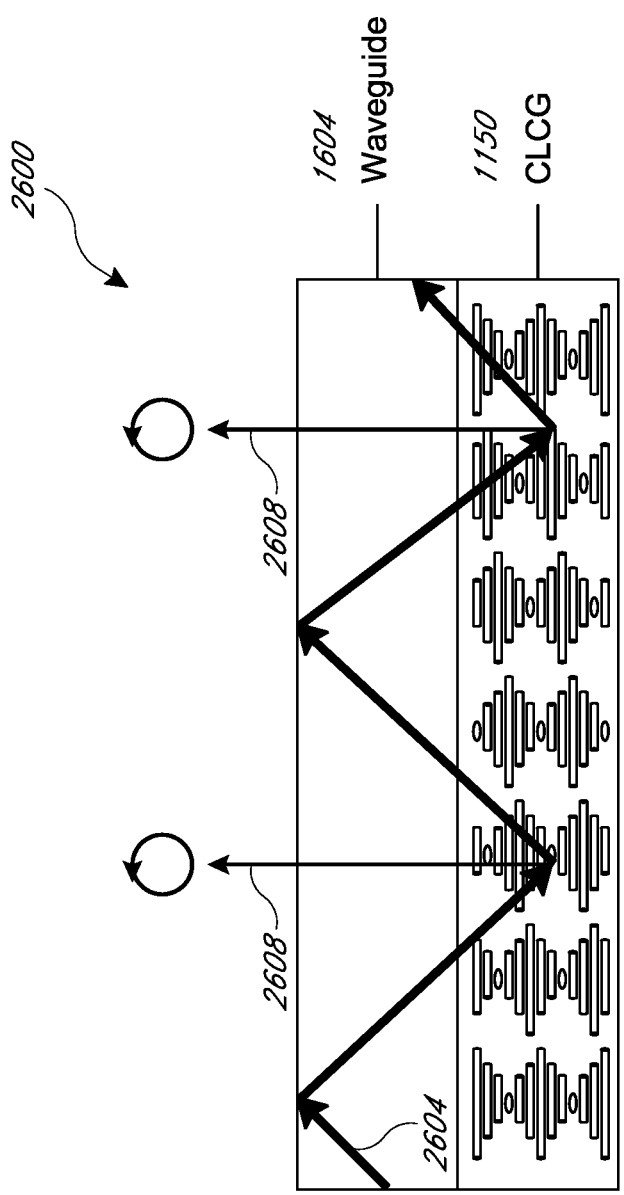
FIG. 26 illustrates an example optical wave-guiding device configured as an outcoupling optical element, comprising a waveguide coupled to a CLCG and configured to propagate light by total internal reflection (TIR).

FIG. 26 illustrates an example optical wave-guiding device 2600 configured as an outcoupling optical element, such as an EPE, according to embodiments. The waveguiding device 2600 comprises a waveguide 1604 coupled to a CLCG 1150 and configured to propagate light by total internal reflection (TIR). Similar to various embodiments described herein, the CLCG 1150 comprises liquid crystal molecules arranged as a plurality of chiral structures in a similar manner to chiral structures 1162-1, 1162-2, . . . 1162-i described supra with respect to, e.g., FIG. 11.

Still referring to FIG. 26, the CLCG 1150 coupled to the waveguide 1604 may represent any one of the outcoupling optical elements 1250, 1252, 1254 coupled to a respective one of the waveguides 1210, 1220, 1230, as illustrated in FIGS. 9B, 9C except, unlike the outcoupling optical elements 1250, 1252, 1254 that are formed on light-exiting sides of the respective waveguides 1210, 1220, 1230, the CLCG 1150 is formed on the side opposite to the light exiting side of the waveguide 1604. Thus, according to some embodiments, each of the outcoupling optical elements 1250, 1252, 1254 and a corresponding one of the incoupling optical elements 1212, 1222, 1232 are formed on opposite sides of a corresponding one of the waveguides 1210, 1220, 1230. In operation, light in-coupled by, e.g., the incoupling optical elements 1212, 1222, 1232 (FIGS. 9A-9C), propagate in a layer in-plane direction, by TIR within the waveguides 1210, 1220, 1230 (FIGS. 9A-9C), respectively. The incoupled light may then impinge on the light distributing elements 1214, 1224, 1234 (FIGS. 9A-9C) when present, which may deflect the light so that it propagates towards the outcoupling optical elements 1250, 1252, 1254. The light approaching the outcoupling optical elements 1250, 1252, 1254 may be represented by light 2604 in in FIG. 26. Upon impinging on the CLCG 1150, at least some of the light 2604 may be diffracted by the CLCG 1150 as diffracted light 2608 which may be, e.g., directed into a viewer's eye 4 (FIG. 7).

Still referring to FIG. 26, the liquid crystal molecules of the illustrated CLCG 1150 are successively rotated in a rotation direction, and arrangements of the liquid crystal molecules of the chiral structures vary periodically in a lateral direction perpendicular to the layer depth direction. Because of the rotational arrangement of the liquid crystal molecules, when the light 2604 is an elliptically/circularly polarized light having a polarization handedness, e.g., one of left-handedness or right-handedness, which matches the direction of rotation of the liquid crystal molecules of the chiral structures, the light 2604 is Bragg-reflected by the CLCG 1150. That is, the rotational arrangement of the liquid crystal molecules in the CLCG 1150 is such that, the CLCG 1150 selectively Bragg reflects light having one handedness while non-Bragg reflecting or transmitting light having the opposite handedness. In addition, because Bragg reflection occurs under the diffraction condition, the Bragg reflected light 2608 is unidirectional (e.g., most of the light is directed toward one direction at outcoupling, such as the direction indicated by the arrows 2608 in FIG. 26). The outcoupled light can preserve a uniform polarization state, which corresponds to the chirality of the CLC material. Thus, when configured as an optical outcoupling element, the CLCG 1150 serves as a polarizer and a unidirectional reflector, which allows for efficient integration with other optical components within various the display systems described herein. For example, the optical element 2600 can be used as an exit-pupil expander in waveguide-based AR displays to project virtual images with a controlled polarization state in a single direction.

Additional Aspects

In a $1^{st}$ aspect, a diffraction grating comprises a cholesteric liquid crystal (CLC) layer comprising a plurality of chiral structures, wherein each chiral structure comprises a plurality of liquid crystal molecules that extend in a layer depth direction by at least a helical pitch and are successively rotated in a first rotation direction. The helical pitch is a length in the layer depth direction corresponding to a net rotation angle of the liquid crystal molecules of the chiral structures by one full rotation in the first rotation direction. Arrangements of the liquid crystal molecules of the chiral structures vary periodically in a lateral direction perpendicular to the layer depth direction.

In a $2^{nd}$ aspect, in the diffraction grating of the $1^{st}$ aspect, each chiral structure comprises at least three calamitic liquid crystal molecules that are elongated along different elongation directions.

In a $3^{rd}$ aspect, in the diffraction grating of any one of the $1^{st}$ to $2^{nd}$ aspects, the CLC layer is configured to substantially Bragg-reflect elliptically or circularly polarized light having a handedness of polarization that is matched to the first rotation direction, when viewed in the layer normal direction, while being configured to substantially transmit elliptically or circularly polarized light having a handedness of polarization that is opposite to the first rotation direction, when viewed in the layer depth direction.

In a $4^{th}$ aspect, in the diffraction grating of any one of the $1^{st}$ to $3^{rd}$ aspects, the arrangements of the liquid crystal molecules varying periodically in the lateral direction are such that the liquid crystal molecules of successively laterally adjacent chiral structures at about the same depth in the layer depth direction are successively rotated in a second rotation direction by 360°/n, where n is an integer.

In a $5^{th}$ aspect, in the diffraction grating of any one of the $1^{st}$ to $4^{th}$ aspects, the arrangements of the liquid crystal molecules varying periodically in the lateral direction are such that elliptically or circularly polarized light that is Bragg-reflected by the laterally adjacent chiral structures is phase-shifted by an angle that is proportional to the angle of rotation in the second rotation direction between the laterally adjacent chiral structures.

In a $6^{th}$ aspect, in the diffraction grating of any one of $1^{st}$ to $5^{th}$ aspects, the chiral structures have substantially the same helical pitch.

In a $7^{th}$ aspect, in the diffraction grating of any of the $1^{st}$ to $4^{th}$ aspects, the chiral structures comprise a first plurality of chiral structures each comprising a plurality of first liquid crystal molecules that extend in a layer depth direction by at least a first helical pitch and are successively rotated in the first rotation direction, and a second plurality of chiral structures each comprising a plurality of second liquid crystal molecules that extend in the layer depth direction by at least a second helical pitch and are successively rotated in the first rotation direction. The first helical pitch and the second helical pitch are such that the first chiral structures and the second chiral structures are configured to Bragg-reflect light having different off-axis incident angles.

In an $8^{th}$ aspect, in the diffraction grating of the $7^{th}$ aspect, the first plurality of chiral structures are formed in a first cholesteric liquid crystal (CLC) layer, and wherein the second plurality of chiral structures are formed in a second cholesteric liquid crystal (CLC) layer formed over the first CLC layer and stacked in the layer depth direction.

In a $9^{th}$ aspect, in the diffraction grating of the $7^{th}$ aspect, the first plurality of chiral structures are formed in a first region of the cholesteric liquid crystal (CLC) layer, and wherein the second plurality of chiral structures are formed in a second region of the cholesteric liquid crystal (CLC) layer formed over the first region in the layer depth direction.

In a $10^{th}$ aspect, in the diffraction grating of the $7^{th}$ aspect, the first plurality of chiral structures are formed in a first region of the cholesteric liquid crystal (CLC) layer, and the second plurality of chiral structures are formed in a second region of the cholesteric liquid crystal (CLC) layer, wherein the first and second regions are laterally adjacent regions in the lateral direction.

In an $11^{th}$ aspect, in the diffraction grating of any of the $7^{th}$ to $10^{th}$ aspects, the one or both of first and second chiral structures form a gradient in the helical pitch in one or both of the layer depth direction and the lateral direction.

In a $12^{th}$ aspect, a wave-guiding device comprises one or more cholesteric liquid crystal (CLC) layers each comprising a plurality of chiral structures, wherein each chiral structure comprises a plurality of liquid crystal molecules that extend in a layer depth direction and are successively rotated in a first rotation direction. Arrangements of the liquid crystal molecules of the chiral structures vary periodically in a lateral direction perpendicular to the layer depth direction such that the one or more CLC layers are configured to Bragg-reflect incident light. The wave-guiding device additionally comprises one or more waveguides formed over the one or more CLC layers and configured to optically couple Bragg-reflected light from the one or more CLC layers such that the Bragg-reflected light travels in a lateral direction perpendicular to the layer depth direction by total internal reflection (TIR). The one or more CLC layers and the one or more waveguides are configured to be in the same optical path.

In a 13th aspect, in the wave-guiding device of the 12th aspect, each of the plurality of chiral structures extend in a layer depth direction by at least a helical pitch, wherein the helical pitch is a length in the layer depth direction corresponding to a net rotation angle of the liquid crystal molecules of the chiral structures by one full rotation in the first rotation direction.

In a 14th aspect, the wave-guiding device of any one of the 12th to 13th aspects comprises a plurality of CLC layers, wherein each one of the CLC layers has differently arranged chiral structures that are configured to selectively Bragg-reflect incident light having a wavelength different than the other ones of the CLC layers and at a Bragg-reflection angle different than the other ones of the CLC layers.

In a 15th aspect, in the wave-guiding device of any one of the 12th to 14th aspects, the periodically varying lateral arrangements of the liquid crystal layers are characterized by a period, wherein each one of the CLC layers has a different period than the other ones of the CLC layers.

In a 16th aspect, in the wave-guiding device of any one of the 12th to 15th aspects, each one of the CLC layers is configured to selectively Bragg-reflect incident light having a wavelength in the visible spectrum.

In a 17th aspect, in the wave-guiding device of any one of the 12th to 15th aspects, each one of the CLC layers is configured to selectively Bragg-reflect incident light having a wavelength in the infrared spectrum while transmitting light having wavelength in the visible spectrum.

In an 18th aspect, the wave-guiding device of any one of the 12th to 16th aspects comprises a plurality of waveguides, wherein each waveguide is optically coupled to one of the CLC layer formed thereon.

In 19th aspect, in the wave-guiding device of any one of the 12th to 16th aspects, the plurality of CLC layers form a stack, and a single waveguide is optically coupled to each one of CLC layers in the stack.

In a 20th aspect, the wave-guiding device of any one of the 12th to 16th aspects further comprises a polarizing reflector, wherein the one or more wave guides is interposed between the one or more CLC layers and the polarizing reflector and is configured such that an elliptically or circularly polarized incident light that transmits through the one or more CLC layers and further through the waveguide is reflected by the polarizing reflector as a reflected light having an opposite polarization handedness relative to the elliptically or circularly polarized incident light.

In a 21st aspect, the wave-guiding device of any one of the 12th to 16th and 20th aspects comprises a first CLC layer and a second CLC layer forming a stack with a waveguide, wherein chiral structures of the first CLC layer and the second CLC layer are successively rotated in opposite rotation directions.

In a 22nd aspect, in the wave-guiding device of the 21st aspect, the first and second CLC layers are stacked on the waveguide.

In a 23rd aspect, in the wave-guiding device of the 21st aspect, the first and second CLC layers are interposed by the waveguide.

In a 24th aspect, in the wave-guiding device of any one of the 12th to 23rd aspects, each of the one or more CLC layers has an average refractive index ($n_Lc$) exceeding 1.35, wherein the $n_{LC}$ has a value that is an average of an ordinary refractive index ($n_o$) and an extraordinary refractive index ($n_e$).

In a 25th aspect, in the wave-guiding device of the 24th aspect, the one or more waveguides are configured to optically couple Bragg-reflected light from the one or more CLC layers when the incident light is incident on the one or more CLC layer at an incident angle relative to the layer depth direction, wherein the incident angle is within a field of view (FOV), within which a diffraction efficiency is greater than 25%, spanning at least 20°.

In a 26th aspect, in the wave-guiding device of any one of 24th and 25th aspects, each of the one or more CLC layers has a birefringence (Δn) between about 0.05 and 0.70. In any of the 24th to 26th aspects, any of the one or more CLC layers may have a birefringence Δn greater than 2(2 sin $\theta_{inc}$−$n_o$+1), where $\theta_{inc}$ is an incident angle of a field of view (FOV) of the wave-guiding device and $n_o$ is the ordinary refractive index of the one or more CLC layers.

In a 27th aspect, a head-mounted display device is configured to project light to an eye of a user to display augmented reality image content. The head-mounted display device comprises a frame configured to be supported on a head of the user. The head-mounted display device additionally comprises a display disposed on the frame, where at least a portion of the display comprises one or more waveguides. The one or more waveguides are transparent and disposed at a location in front of the user's eye when the user wears the head-mounted display device, such that the transparent portion transmits light from a portion of an environment in front of the user to the user's eye to provide a view of the portion of the environment in front of the user. The display further comprises one or more light sources and at least one diffraction grating configured to couple light from the light sources into the one or more waveguides or to couple light out of the one or more waveguides, wherein the at least one diffraction grating comprises a diffraction grating according to any one of the 1st to 11th aspects.

In a 28th aspect, in the head-mounted device of the 27th aspect, the one or more light sources comprise a fiber scanning projector.

In a 29th aspect, the head-mounted device of any one of the 27th to 28th aspects is configured to project light into the user's eye so as to present image content to the user on a plurality of depth planes.

In a 30th aspect, a wavelength-selective cholesteric liquid crystal reflector (CLCR), comprises one or more cholesteric liquid crystal (CLC) layers each comprising a plurality of chiral structures, wherein each chiral structure comprises a plurality of liquid crystal molecules that extend in a layer depth direction and are successively rotated in a first rotation direction. Arrangements of the liquid crystal molecules of the chiral structures vary periodically in a lateral direction perpendicular to the layer depth direction such that the one or more CLC layers are configured to substantially Bragg-reflect a first incident light having a first wavelength while substantially transmitting a second incident light having a second wavelength.

In a 31st aspect, in the wavelength-selective CLCR of the 30th aspect, each of the one or more CLC layers are configured to substantially Bragg-reflect elliptically or circularly polarized first or second incident light having a handedness of polarization that is matched to the first rotation direction, when viewed in the layer depth direction, while being configured to substantially transmit elliptically or circularly polarized first or second incident light having a handedness of polarization that is opposite to the first rotation direction, when viewed in the layer depth direction.

In a 32nd aspect, in the wavelength-selective CLCR of any one of the 30th to 31st aspects, the arrangements of the liquid crystal molecules varying periodically in the lateral direction are arranged to have a period in the lateral direction such that a ratio between the first wavelength and the period is between about 1.1 and about 1.5.

In a 33$^{rd}$ aspect, in the wavelength-selective CLCR of any one of the 30$^{th}$ to 32$^{nd}$ aspects, the first wavelength is in the near infrared range between about 750 nm and about 1400 nm and the second wavelength in is in the visible range.

In a 34$^{th}$ aspect, in the wavelength-selective CLCR of any of one of the 30$^{th}$ to 32$^{nd}$ aspects, the one or more CLC layers are configured such that the first incident light is reflected at an angle exceeding 60 degrees relative to the layer depth direction.

In a 35$^{th}$ aspect, in the wavelength-selective CLCR of any one of the 30$^{th}$ to 32$^{nd}$ aspects, the plurality of liquid crystal molecules of the chiral structures are pre-tilted relative to a direction normal to the layer depth direction.

In a 36$^{th}$ aspect, a head mounted display (HMD) configured to be worn on a head of a user comprises a frame comprising a pair of ear stems. The HMD additionally comprises a pair of optical elements supported by the frame such that each of the pair of optical elements is capable of being disposed forward of an eye of the user. The HMD additionally comprises a forward-facing imager mounted to one of the pair of ear stems. The HMD further comprises a cholesteric liquid crystal (CLC) off-axis mirror according to any one of 30$^{th}$ to 35$^{th}$ aspects. The cholesteric liquid crystal (CLC) off-axis mirror is disposed in or on one of the pair of optical elements and configured to reflect infrared light toward the forward-facing imager that is configured to receive the infrared light reflected by the reflective element.

In a 37$^{th}$ aspect, in the HMD of the 36$^{th}$ aspect, the CLC off-axis mirror comprises a plurality of CLC layers, wherein each one of the CLC layers has differently arranged chiral structures that are configured to selectively Bragg-reflect incident light having a wavelength different than the other ones of the CLC layers and at a Bragg-reflection angle different than the other ones of the CLC layers.

In a 38$^{th}$ aspect, in the HMD of any one of the 36$^{th}$ to 37$^{th}$ aspects, the periodically varying lateral arrangements of the liquid crystal layers are characterized by a period, wherein each one of the CLC layers has a different period than the other ones of the CLC layers.

In a 39$^{th}$ aspect, in the HMD of any one of the 36$^{th}$ to 38$^{th}$ aspects, each one of the CLC layers is configured to selectively Bragg-reflect incident light having a wavelength in the infrared spectrum while transmitting incident light having a wavelength in the visible spectrum.

In a 40$^{th}$ aspect, in the HMD of any one of the 36$^{th}$ to 39$^{th}$ aspects, each of the pair of optical elements is transparent to visible light.

In a 41$^{st}$ aspect, in the HMD of any one of the 36$^{th}$ to 40$^{th}$ aspects, each of the pair of optical elements is configured to display an image to the user.

In a 42$^{nd}$ aspect, a wave-guiding device comprises one or more cholesteric liquid crystal (CLC) layers each comprising a plurality of chiral structures, wherein each chiral structure comprises a plurality of liquid crystal molecules that extend in a layer depth direction and are successively rotated in a first rotation direction, wherein arrangements of the liquid crystal molecules of the chiral structures vary periodically in a lateral direction perpendicular to the layer depth direction such that the one or more CLC layers are configured to Bragg-reflect incident light. The wave-guiding device additionally includes one or more waveguides formed over the one or more CLC layers and configured to optically couple Bragg-reflected light from the one or more CLC layers such that the Bragg-reflected light travels in a lateral direction perpendicular to the layer depth direction by total internal reflection (TIR). The wave-guiding device is configured to have a field of view (FOV), within which a diffraction efficiency is greater than 25%, which exceeds 20°.

In a 43$^{rd}$ aspect, in the wave-guiding device of the 42$^{nd}$ aspect, each of the one or more CLC layers has an average refractive index ($n_L c$) exceeding 1.35, wherein the $n_{LC}$ has a value that is an average of an ordinary refractive index (no) and an extraordinary refractive index ($n_e$).

In a 44$^{th}$ aspect, in wave-guiding device of any one of the 42$^{nd}$ to 43$^{rd}$ aspects, each of the one or more CLC layers has a birefringence (Δn) between about 0.05 and 0.70.

In a 45$^{th}$ aspect, a display device comprises a waveguide and an incoupling optical element formed on the waveguide and configured to incouple light incident thereon into a first side of the waveguide, wherein the incoupling optical element and the waveguide are configured such that light in-coupled into the waveguide propagates in the wave guide in an in-plane direction of the waveguide by total internal reflection (TIR). The display device additionally comprises an outcoupling optical element formed on the waveguide and configured to outcouple light incident thereon from the waveguide. The light out-coupling element comprises a cholesteric liquid crystal (CLC) layer comprising a plurality of chiral structures, wherein each of the chiral structures comprises a plurality of liquid crystal molecules that extend in a layer depth direction of the CLC layer and are successively rotated in a first rotation direction, wherein arrangements of the liquid crystal molecules of the chiral structures vary periodically in a lateral direction perpendicular to the layer depth direction such that the one or more CLC layers are configured to Bragg-reflect light incident thereon from the waveguide towards the first side.

In a 46$^{th}$ aspect, in the display device of the 45$^{th}$ aspect, the outcoupling optical element and the incoupling optical element are formed on opposite sides of the waveguide.

In a 47$^{th}$ aspect, in the display device of the 45$^{th}$ aspect, the light outcoupling optical element is configured to selectively Bragg-reflect light having one of right-handed circular polarization or left-handed circular polarization.

In a 48$^{th}$ aspect, in the display device of the 45$^{th}$ aspect, wherein the light outcoupling optical element is configured to selectively Bragg-reflect light having a polarization direction that is the same direction as the first rotation direction.

In a 49$^{th}$ aspect, in the display device of the 45$^{th}$ aspect, the light incoupling optical element comprises a liquid crystal layer.

In a 50$^{th}$ aspect, in the display device of the 49$^{th}$ aspect, wherein the liquid crystal layer comprises a second CLC layer comprising a plurality of chiral structures, wherein each of the chiral structures comprises a plurality of liquid crystal molecules that extend in a layer depth direction of the second CLC layer and are successively rotated in the first rotation direction, wherein arrangements of the liquid crystal molecules of the chiral structures vary periodically in the lateral direction.

Additional Considerations

In the embodiments described above, augmented reality display systems and, more particularly, spatially varying diffraction gratings are described in connection with particular embodiments. It will be understood, however, that the principles and advantages of the embodiments can be used for any other systems, apparatus, or methods with a need for the spatially varying diffraction grating. In the foregoing, it will be appreciated that any feature of any one of the embodiments can be combined and/or substituted with any other feature of any other one of the embodiments.

Unless the context clearly requires otherwise, throughout the description and the claims, the words "comprise," "comprising," "include," "including" and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Likewise, the word "connected", as generally used herein, refers to two or more elements that may be either directly connected, or connected by way of one or more intermediate elements. Additionally, the words "herein," "above," "below," "infra," "supra," and words of similar import, when used in this application, shall refer to this application as a whole and not to any particular portions of this application. Where the context permits, words in the above Detailed Description using the singular or plural number may also include the plural or singular number, respectively. The word "or" in reference to a list of two or more items, that word covers all of the following interpretations of the word: any of the items in the list, all of the items in the list, and any combination of one or more of the items in the list. In addition, the articles "a," "an," and "the" as used in this application and the appended claims are to be construed to mean "one or more" or "at least one" unless specified otherwise.

As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain embodiments require at least one of X, at least one of Y and at least one of Z to each be present.

Moreover, conditional language used herein, such as, among others, "can," "could," "might," "may," "e.g.," "for example," "such as" and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or whether these features, elements and/or states are included or are to be performed in any particular embodiment.

While certain embodiments have been described, these embodiments have been presented by way of example only, and are not intended to limit the scope of the disclosure. Indeed, the novel apparatus, methods, and systems described herein may be embodied in a variety of other forms; furthermore, various omissions, substitutions and changes in the form of the methods and systems described herein may be made without departing from the spirit of the disclosure. For example, while blocks are presented in a given arrangement, alternative embodiments may perform similar functionalities with different components and/or circuit topologies, and some blocks may be deleted, moved, added, subdivided, combined, and/or modified. Each of these blocks may be implemented in a variety of different ways. Any suitable combination of the elements and acts of the various embodiments described above can be combined to provide further embodiments. The various features and processes described above may be implemented independently of one another, or may be combined in various ways. No element or combinations of elements is necessary or indispensable for all embodiments. All suitable combinations and subcombinations of features of this disclosure are intended to fall within the scope of this disclosure.

What is claimed is:

1. An optical device comprising:
one or more cholesteric liquid crystal (CLC) layers each comprising a plurality of chiral structures, wherein each chiral structure comprises a plurality of liquid crystal molecules that extend in a layer depth direction and are successively rotated in a rotation direction, wherein arrangements of the liquid crystal molecules of the chiral structures vary periodically in a lateral direction perpendicular to the layer depth direction such that the one or more CLC layers are configured to Bragg-reflect incident light; and
one or more waveguides optically coupled to the one or more CLC layers and configured to receive Bragg-reflected light from the one or more CLC layers such that the Bragg-reflected light travels in the lateral direction under total internal reflection (TIR) in the one or more waveguides.

2. The optical device of claim 1, wherein the one or more CLC layers comprise a first CLC layer configured for a first maximum Bragg-reflection at a first off-axis angle of incidence and a second CLC layer configured for a second maximum Bragg-reflection at a second off-axis angle of incidence different from the first off-axis angle of incidence.

3. The optical device of claim 1, wherein the one or more CLC layers comprise a first CLC layer having a first FOV and a second CLC layer having a second FOV at least partly overlapping the first FOV, wherein the first and second FOVs provide a combined FOV exceeding 20°.

4. The optical device of claim 1, wherein different ones of the one or more CLC layers are stacked in the layer depth direction.

5. The optical device of claim 4, wherein different ones of the one or more CLC layers have liquid crystal molecules that extend in the layer depth direction at different helical pitches.

6. The optical device of claim 5, wherein respective helical pitches of the different ones of the one or more CLC layers decrease in the layer depth direction.

7. The optical device of claim 1, wherein the one or more CLC layers include a first CLC layer and a second CLC layer that are stacked over one another such that a first portion of incident light incident on the one or more CLC layers within a first FOV is reflected by the first CLC layer, and a second portion of the incident light incident on the one or more CLC layers within a second FOV is transmitted through the first CLC layer and reflected by the second CLC layer.

8. The optical device of claim 1, wherein different ones of the one or more CLC layers are disposed laterally adjacent in the lateral direction.

9. The optical device of claim 8, wherein respective helical pitches of the different ones of the one or more CLC layers decrease in the lateral direction.

10. The optical device of claim 1, wherein at least one of the one or more CLC layers has an average refractive index ($n_{LC}$) exceeding 1.35, wherein the $n_{LC}$ has a value that is an average of an ordinary refractive index (no) and an extraordinary refractive index ($n_e$).

11. The optical device of claim 1, wherein at least one of the one or more CLC layers has a birefringence (Δn) between about 0.05 and 0.70.

12. An optical device comprising:
a waveguide;
an incoupling element configured to incouple light that is incident on the incoupling element into a first side of the waveguide such that the incoupled light propagates in the waveguide in an in-plane direction of the waveguide by total internal reflection (TIR); and
an outcoupling element configured to outcouple, from the waveguide, at least a portion of the light that propagates in the waveguide;
wherein one or both of the incoupling element and the outcoupling element comprise one or more cholesteric liquid crystal (CLC) layers each comprising a plurality of chiral structures, wherein each chiral structure comprises a plurality of liquid crystal molecules that extend in a layer depth direction and are successively rotated in a rotation direction, and wherein arrangements of the liquid crystal molecules of the chiral structures vary periodically in a lateral direction perpendicular to the layer depth direction such that the one or more CLC layers are configured to Bragg-reflect light incident on the one or more CLC layers.

13. The optical device of claim 12, wherein the incoupling element comprises the one or more CLC layers, and wherein the waveguide is arranged to receive Bragg-reflected light from the one or more CLC layers of the incoupling element such that the Bragg-reflected light travels in the lateral direction under TIR in the waveguide.

14. The optical device of claim 12, wherein the outcoupling element comprises the one or more CLC layers, and wherein the outcoupling element is arranged such that at least a portion of the light traveling in the waveguide is outcoupled from the waveguide through Bragg reflection.

15. The optical device of claim 14, wherein the outcoupling element is configured to selectively Bragg-reflect light having one of right-handed circular polarization or left-handed circular polarization.

16. The optical device of claim 14, wherein the outcoupling element is configured to selectively Bragg-reflect light having a polarization direction that is the same direction as the rotation direction.

17. The optical device of claim 12, wherein different ones of the one or more CLC layers are stacked in the layer depth direction.

18. The optical device of claim 12, wherein different ones of the one or more CLC layers are disposed laterally adjacent in the lateral direction.

19. The optical device of claim 12, wherein the one or more CLC layers include a first CLC layer and a second CLC layer that are stacked over one another such that a first portion of incident light incident on the one or more CLC layers having a first wavelength is reflected by the first CLC layer, while a second portion of the incident light incident on the one or more CLC layers having a second wavelength different from the first wavelengths is transmitted through the first CLC layer and reflected by the second CLC layer.

20. The optical device of claim 12, wherein the outcoupling element and the incoupling element are formed on opposite sides of the waveguide.

* * * * *